(12) United States Patent
DeMeio et al.

(10) Patent No.: US 8,649,081 B1
(45) Date of Patent: Feb. 11, 2014

(54) PHOTOCHROMIC ARTICLE HAVING TWO AT LEAST PARTIALLY CROSSED PHOTOCHROMIC-DICHROIC LAYERS

(75) Inventors: Rachael L. DeMeio, Gibsonia, PA (US); David Park, Tuam (IE); Anil Kumar, Murrysville, PA (US); Truman Wilt, Clinton, PA (US); Peter C. Foller, San Francisco, CA (US); Jiping Shao, Sewickley, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

(21) Appl. No.: 13/617,621

(22) Filed: Sep. 14, 2012

(51) Int. Cl.
*G02F 1/03* (2006.01)

(52) U.S. Cl.
USPC .......................................................... 359/241

(58) Field of Classification Search
USPC .......................................................... 359/241
See application file for complete search history.

(56) References Cited

U.S. PATENT DOCUMENTS

| | | | |
|---|---|---|---|
| 6,245,399 B1 | 6/2001 | Sahouani et al. | |
| 6,316,570 B1 | 11/2001 | Bonde et al. | |
| 6,926,405 B2 | 8/2005 | Ambler et al. | |
| 7,256,921 B2 * | 8/2007 | Kumar et al. | 359/241 |
| 7,315,341 B2 | 1/2008 | Nimura et al. | |
| 7,504,054 B2 | 3/2009 | Pyles et al. | |
| 7,625,626 B2 | 12/2009 | Bear et al. | |
| 8,089,678 B2 | 1/2012 | Kumar et al. | |
| 2007/0291345 A1 | 12/2007 | Kumar et al. | |
| 2008/0143926 A1 | 6/2008 | Amimori et al. | |
| 2009/0135462 A1 | 5/2009 | Kumar et al. | |
| 2010/0075070 A1 | 3/2010 | Nagai et al. | |
| 2011/0234969 A1 | 9/2011 | Amimori et al. | |

FOREIGN PATENT DOCUMENTS

WO     0022463 A1    4/2000

* cited by examiner

*Primary Examiner* — James Jones
(74) *Attorney, Agent, or Firm* — Deborah M. Altman

(57) ABSTRACT

Photochromic-dichroic articles are provided, which include a substrate, a first photochromic-dichroic layer over the substrate, and a second photochromic-dichroic layer over the first photochromic-dichroic layer. The first photochromic-dichroic layer includes a first photochromic-dichroic compound that is laterally aligned within the first photochromic-dichroic layer, and which defines a first polarization axis of the first photochromic-dichroic layer. The second photochromic-dichroic layer includes a second photochromic-dichroic compound that is laterally aligned within the second photochromic-dichroic layer, and which defines a second polarization axis of the second photochromic-dichroic layer. The first polarization axis and the second polarization axis are oriented relative to each other at an angle of greater than 0° and less than or equal to 90°. The photochromic-dichroic articles can provide, for example, a combination of increased optical density and increased kinetics when exposed to a given amount of actinic radiation.

28 Claims, 4 Drawing Sheets

PHOTOCHROMIC ARTICLE HAVING TWO AT LEAST PARTIALLY CROSSED PHOTOCHROMIC-DICHROIC LAYERS

FIELD

The present invention relates to photochromic-dichroic articles that include a substrate, a first photochromic-dichroic layer over the substrate, and a second photochromic-dichroic layer over the first photochromic-dichroic layer, in which the polarization axes of the first and second photochromic-dichroic layers are oriented relative to each other at an angle of greater than 0° and less than or equal to 90°.

BACKGROUND

Conventional linearly polarizing elements, such as linearly polarizing lenses for sunglasses and linearly polarizing filters, are typically formed from unilaterally stretched polymer sheets, which can optionally contain a dichroic material, such as a dichroic dye. Consequently, conventional linearly polarizing elements are static elements having a single, linearly polarizing state. Accordingly, when a conventional linearly polarizing element is exposed to either randomly polarized radiation or reflected radiation of the appropriate wavelength, some percentage of the radiation transmitted through the element is linearly polarized.

In addition, conventional linearly polarizing elements are typically tinted. Typically, conventional linearly polarizing elements contain a static or fixed coloring agent and have an absorption spectrum that does not vary in response to actinic radiation. The color of the conventional linearly polarizing element will depend upon the static coloring agent used to form the element, and most commonly, is a neutral color (for example, brown, blue, or gray). Thus, while conventional linearly polarizing elements are useful in reducing reflected light glare, because of their static tint, they are typically not well suited for use under low-light conditions. Further, because conventional linearly polarizing elements have only a single, tinted linearly polarizing state, they are limited in their ability to store or display information.

Conventional photochromic elements, such as photochromic lenses that are formed using conventional thermally reversible photochromic materials are generally capable of converting from a first state, for example a "clear state," to a second state, for example a "colored state," in response to actinic radiation, and reverting back to the first state in response to thermal energy. Thus, conventional photochromic elements are generally well suited for use in both low-light and bright conditions. Conventional photochromic elements, however, that do not include linearly polarizing filters are generally not capable of linearly polarizing radiation. The absorption ratio of conventional photochromic elements, in either state, is generally less than two. Therefore, conventional photochromic elements are not capable of reducing reflected light glare to the same extent as conventional linearly polarizing elements. In addition, conventional photochromic elements have a limited ability to store or display information.

Photochromic-dichroic compounds and materials have been developed that provide both photochromic properties and dichroic properties, if properly and at least sufficiently aligned. When in a colored or darkened state, such as when exposed to actinic light, photochromic-dichroic compounds, however, typically have a larger percent transmittance than non-polarizing or conventional photochromic compounds at equivalent concentrations and sample thickness. While not intending to be bound by any theory, and based on the evidence at hand, it is believed that the increased percent transmittance of photochromic-dichroic materials in the darkened or colored state is due to the percent transmittance being an average of the two orthogonal plane polarized components of the polarized radiation. A photochromic-dichroic material will more strongly absorb one of the two orthogonal plane polarized components of the incident random radiation, resulting in one of the planes of transmitted polarized light (passing through and out of the sample) having a greater percent transmittance than the other orthogonal plane polarized component. The average of the two orthogonal plane polarized components typically results in an average percent transmittance of greater magnitude. In general, as the linearly polarizing efficiency, which can be quantified in terms of absorption ratio, of photochromic-dichroic compounds increases, the percent transmittance associated therewith also increases.

It would be desirable to develop new polarizing photochromic articles that include photochromic-dichroic compounds, and which provide a combination of linear polarizing properties, and reduced percent transmittance when in a colored or darkened state, such as when exposed to actinic light. It would be further desirable that such newly developed polarizing photochromic articles have a combination of increased optical density and increased kinetics, such as increased fade rates, when exposed to a given amount of actinic radiation.

SUMMARY

In accordance with the present invention, there is provided a photochromic-dichroic article that comprises, (a) a substrate having a first surface and a second surface. The photochromic-dichroic article also comprises, (b) a first photochromic-dichroic layer positioned over the first surface of the substrate. The first photochromic-dichroic layer comprises a first photochromic-dichroic compound, which is laterally aligned within the first photochromic-dichroic layer, and which defines a first polarization axis of the first photochromic-dichroic layer. The photochromic-dichroic article further comprises, (c) a second photochromic-dichroic layer positioned over the first photochromic-dichroic layer. The second photochromic-dichroic layer comprises a second photochromic-dichroic compound, which is laterally aligned within the second photochromic-dichroic layer, and which defines a second polarization axis of the second photochromic-dichroic layer. The first polarization axis of the first photochromic-dichroic layer and the second polarization axis of the second photochromic-dichroic layer are oriented relative to each other at an angle of greater than 0° and less than or equal to 90°.

In further accordance with the present invention, there is provided a photochromic-dichroic article as described above that further comprises a birefringent layer comprising a polymer, in which the birefringent layer is interposed between the first photochromic-dichroic layer and the second photochromic-dichroic layer.

BRIEF DESCRIPTION OF THE DRAWINGS

In FIGS. 1 through 4 like characters refer to the same structural features and components unless otherwise stated.

DETAILED DESCRIPTION

Figure 1:
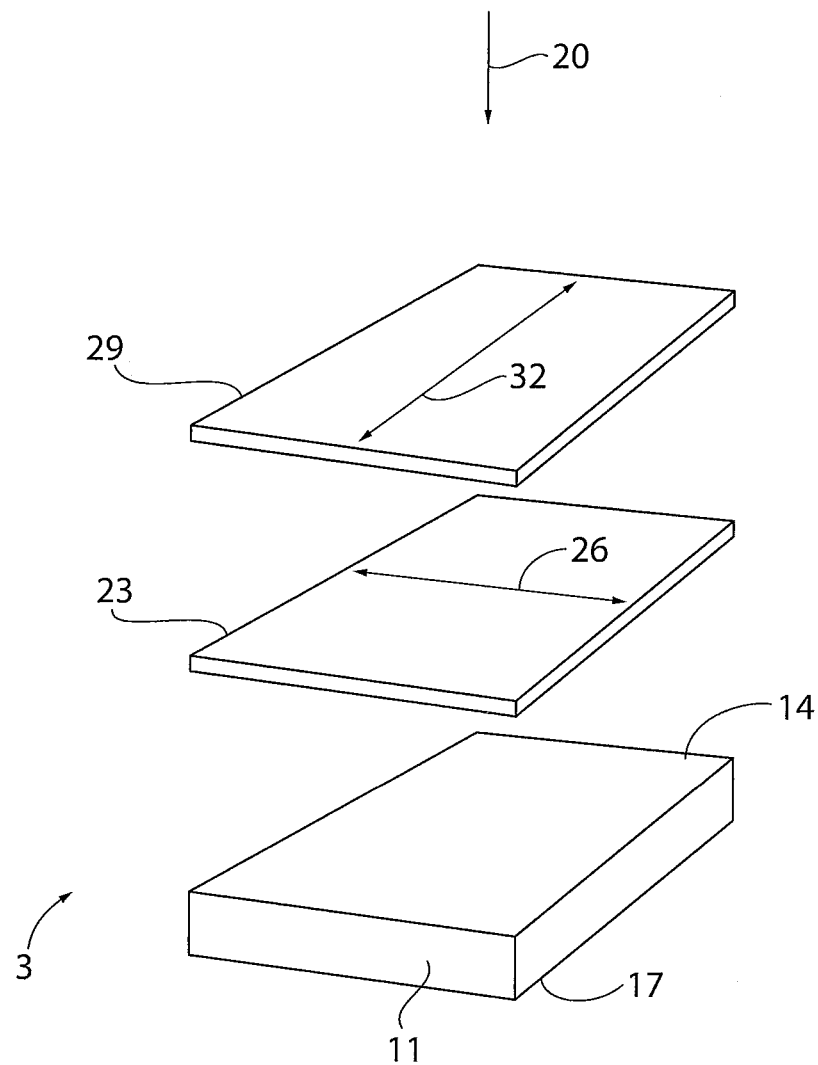
FIG. 1 is a representative exploded perspective view of a photochromic-dichroic article according to some embodiments of the present invention.

As used herein, the term "actinic radiation" and similar terms, such as "actinic light" means electromagnetic radiation that is capable of causing a response in a material, such as, but not limited to, transforming a photochromic material from one form or state to another as will be discussed in further detail herein.

As used herein, the term "photochromic" and related terms, such as "photochromic compound" means having an absorption spectrum for at least visible radiation that varies in response to absorption of at least actinic radiation. Further, as used herein the term "photochromic material" means any substance that is adapted to display photochromic properties (i.e. adapted to have an absorption spectrum for at least visible radiation that varies in response to absorption of at least actinic radiation) and which includes at least one photochromic compound.

As used herein, the term "photochromic compound" includes thermally reversible photochromic compounds and non-thermally reversible photochromic compounds. The term "thermally reversible photochromic compounds/materials" as used herein means compounds/materials capable of converting from a first state, for example a "clear state," to a second state, for example a "colored state," in response to actinic radiation, and reverting back to the first state in response to thermal energy. The term "non-thermally reversible photochromic compounds/materials" as used herein means compounds/materials capable of converting from a first state, for example a "clear state," to a second state, for example a "colored state," in response to actinic radiation, and reverting back to the first state in response to actinic radiation of substantially the same wavelength(s) as the absorption(s) of the colored state (e.g., discontinuing exposure to such actinic radiation).

As used herein the term "dichroic" means capable of absorbing one of two orthogonal plane polarized components of at least transmitted radiation more strongly than the other.

As used herein, the term "photochromic-dichroic" and similar terms, such as "photochromic-dichroic materials" and "photochromic-dichroic compounds" means materials and compounds that possess and/or provide both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other).

As used herein the term "absorption ratio" refers to the ratio of the absorbance of radiation linearly polarized in a first plane to the absorbance of the same wavelength radiation linearly polarized in a plane orthogonal to the first plane, in which the first plane is taken as the plane with the highest absorbance.

As used herein to modify the term "state," the terms "first" and "second" are not intended to refer to any particular order or chronology, but instead refer to two different conditions or properties. For purposes of non-limiting illustration, the first state and the second state of the photochromic-dichroic compound of a photochromic-dichroic layer can differ with respect to at least one optical property, such as but not limited to the absorption or linear polarization of visible and/or UV radiation. Thus, according to various non-limiting embodiments disclosed herein, the photochromic-dichroic compound of a photochromic-dichroic layer can have a different absorption spectrum in each of the first and second state. For example, while not limiting herein, the photochromic-dichroic compound of a photochromic-dichroic layer can be clear in the first state and colored in the second state. Alternatively, the photochromic-dichroic compound of a photochromic-dichroic layer can have a first color in the first state and a second color in the second state. Further, as discussed below in more detail, the photochromic-dichroic compound of a photochromic-dichroic layer can be non-linearly polarizing (or "non-polarizing") in the first state, and linearly polarizing in the second state.

As used herein the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "ophthalmic substrate" means lenses, partially formed lenses, and lens blanks.

As used herein the term "display" means the visible or machine-readable representation of information in words, numbers, symbols, designs or drawings. Non-limiting examples of display articles, elements and devices include screens, monitors, and security elements, such as security marks.

As used herein the term "window" means an aperture adapted to permit the transmission of radiation therethrough. Non-limiting examples of windows include automotive and aircraft transparencies, filters, shutters, and optical switches.

As used herein the term "mirror" means a surface that specularly reflects a large or substantial fraction of incident light.

As used herein the term "liquid crystal cell" refers to a structure containing a liquid crystal material that is capable of being ordered. Active liquid crystal cells are cells in which the liquid crystal material is capable of being reversibly and controllably switched or converted between ordered and disordered states, or between two ordered states by the application of an external force, such as electric or magnetic fields. Passive liquid crystal cells are cells in which the liquid crystal material maintains an ordered state. A non-limiting example of an active liquid crystal cell element or device is a liquid crystal display.

As used herein the term "coating" means a supported film derived from a liquid or solid particulate flowable composition, which may or may not have a uniform thickness, and specifically excludes polymeric sheets. For purposes of non-limiting illustration, an example of solid particulate flowable composition is a powder coating composition. The first and second photochromic-dichroic layers and optional further layers, such as an optional primer layer, and an optional topcoat layer, of the photochromic-dichroic articles of the present invention can, in some embodiments, each independently be a coating or formed from a coating composition.

As used herein the term "sheet" means a pre-formed film having a generally uniform thickness and capable of self-support.

As used herein the term "connected to" means in direct contact with an object or indirect contact with an object through one or more other structures or materials, at least one of which is in direct contact with the object. For purposes of non-limiting illustration, the first photochromic-dichroic layer, for example, can be in direct contact (e.g., abutting contact) with at least a portion of the substrate or it can be in indirect contact with at least a portion of the substrate through one or more other interposed structures or materials, such as a can be in direct contact (e.g., abutting contact) with at least a portion of the substrate or it can be in indirect contact with at least a portion of the substrate through one or more other interposed structures or materials, such as a primer layer and/or a monomolecular layer of a coupling or adhesive agent. For example, although not limiting herein, the first photochromic-dichroic layer can be in contact with one or more other interposed coatings, polymer sheets or combinations thereof, at least one of which is in direct contact with at least a portion of the substrate.

As used herein, the term "photosensitive material" means materials that physically or chemically respond to electromagnetic radiation, including, but not limited to, phosphorescent materials and fluorescent materials.

As used herein, the term "non-photosensitive materials" means materials that do not physically or chemically respond to electromagnetic radiation, including, but not limited to, static dyes.

As used herein, molecular weight values of polymers, such as weight average molecular weights (Mw), number average molecular weights (Mn), and z-average molecular weights (Mz) are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers, including but not limited to, comb graft polymers, star graft polymers, and dendritic graft polymers.

As used herein, the term "(meth)acrylate" and similar terms, such as "(meth)acrylic acid ester" means methacrylates and/or acrylates. As used herein, the term "(meth)acrylic acid" means methacrylic acid and/or acrylic acid.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein and in the claims, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

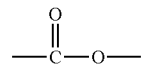

or equivalently —C(O)O—, is inclusive of the right-to-left representation thereof,

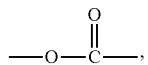

or equivalently —O(O)C— or —OC(O)—.

As used herein, the articles "a," "an," and "the" include plural referents unless otherwise expressly and unequivocally limited to one referent.

As used herein, the term "a first photochromic-dichroic compound" means at least one first photochromic-dichroic compound. When two or more first photochromic-dichroic compounds are present, and in accordance with some embodiments, they together can have and provide a (or an average) first unactivated state peak absorbance wavelength, a (or an average) first unactivated state absorbance of greater than 0 over a particular wavelength range, a (or an average) first unactivated state terminal minimum absorbance wavelength, and a (or an average) first unactivated state initial minimum absorbance wavelength.

As used herein, the term "a second photochromic-dichroic compound" means at least one second photochromic-dichroic compound. When two or more second photochromic-dichroic compounds are present, and in accordance with some embodiments, they together can have and provide a (or an average) second unactivated state peak absorbance, a (or an average) second unactivated state absorbance wavelength of greater than 0 over a particular wavelength range, a (or an average) second unactivated state terminal minimum absorbance wavelength, and a (or an average) second unactivated state initial minimum absorbance wavelength.

As used herein, the term "unactivated state" with regard to photochromic compounds, such as the first photochromic-dichroic compound and the second photochromic-dichroic compound, means the photochromic compound has been exposed to actinic radiation having sufficient energy to result in the photochromic compound having or producing: (i) measurable absorbance at wavelengths of greater than or equal to 330 nm and less than or equal to 450 nm, such as less than or equal to 430 nm or less than or equal to 410 nm; and (ii) minimal or substantially no measurable absorbance at wavelengths of greater than 450 nm.

As used herein, the term "activated state" with regard to photochromic compounds, such as the first photochromic-dichroic compound and the second photochromic-dichroic compound, and photochromic-dichroic articles, means the photochromic compound and/or photochromic article has been exposed to actinic radiation having sufficient energy to result in the photochromic compound and/or photochromic article having or producing: (i) measurable absorbance at wavelengths of greater than or equal to 330 nm and less than or equal to 450 nm, such as less than or equal to 430 nm or less than or equal to 410 nm; and (ii) measurable absorbance at wavelengths of greater than 450 nm.

As used herein, the term "a first unactivated state absorbance of greater than 0" over a certain wavelength range, such as "over all wavelengths from 340 nm to 380 nm" means the first photochromic-dichroic compound has an unactivated state absorbance of greater than 0 over a certain wavelength range, such as at all wavelengths from 340 nm to 380 nm.

As used herein, the term "a first unactivated state peak absorbance wavelength" means the wavelength at which the first photochromic-dichroic compound (of the first photochromic-dichroic layer), in an unactivated state, has a peak (or maximum) absorbance. The first unactivated state peak absorbance wavelength typically resides between 340 nm and 380 nm.

As used herein, the term "a first unactivated state terminal minimum absorbance wavelength" means the wavelength at which the first photochromic-dichroic compound (of the first photochromic-dichroic layer), in an unactivated state, has a terminal (or upper) minimum absorbance. The first unactivated state terminal minimum absorbance wavelength is at higher wavelength than the first unactivated state peak absorbance wavelength.

As used herein, the term "a first unactivated state initial minimum absorbance wavelength" means the wavelength at which the first photochromic-dichroic compound (of the first photochromic-dichroic layer), in an unactivated state, has an initial (or lower) minimum absorbance. The first unactivated state minimum absorbance wavelength is at lower wavelength than the first unactivated state peak absorbance wavelength and the first unactivated state terminal minimum absorbance wavelength.

As used herein, the term "a second unactivated state absorbance of greater than 0" over a certain wavelength range, such as "over at least a portion of wavelengths from 340 nm to 380 nm" means the second photochromic-dichroic compound has an unactivated state absorbance of greater than 0 over a certain wavelength range, such as over at least a portion of wavelengths from 340 nm to 380 nm, such as from 340 nm to 370 nm, or from 350 nm to 380 nm, or from 340 nm to 380 nm.

As used herein, the term "over at least a portion of wavelengths from x nm to y nm" with regard to an unactivated state absorbance of greater than 0, means over at least a portion of consecutive wavelengths within the recited range, inclusive of the recited upper and lower wavelength values.

As used herein, the term "a second unactivated state peak absorbance wavelength" means the wavelength at which the second photochromic-dichroic compound (of the second photochromic-dichroic layer), in an unactivated state, has a peak (or maximum) absorbance. The second unactivated state peak absorbance wavelength typically resides between 340 nm and 380 nm.

As used herein, the term "a second unactivated state terminal minimum absorbance wavelength" means the wavelength at which the second photochromic-dichroic compound (of the second photochromic-dichroic layer), in an unactivated state, has a terminal (or upper) minimum absorbance. The second unactivated state terminal minimum absorbance wavelength is at higher wavelength than the second unactivated state peak absorbance wavelength.

As used herein, the term "a second unactivated state initial minimum absorbance wavelength" means the wavelength at which the second photochromic-dichroic compound (of the second photochromic-dichroic layer), in an unactivated state, has an initial (or lower) minimum absorbance. The second unactivated state minimum absorbance wavelength is at lower wavelength than the second unactivated state peak absorbance wavelength and the second unactivated state terminal minimum absorbance wavelength.

The unactivated state initial minimum absorbance wavelength values, such as the first and/or second unactivated state initial minimum absorbance wavelength values, can each be affected by the analytical method and equipment employed, and the substrate and/or the matrix, such as the coating matrix, in which the particular photochromic compound resides (which is referred herein as a "USIMAWV affect"). The USIMAWV affect can be more pronounced when the unactivated state initial minimum absorbance wavelength value is less than 360 nm. The USIMAWV affect can be additive or subtractive, resulting in higher or lower unactivated state initial minimum absorbance wavelength values. Alternatively or additionally, the USIMAWV affect can result in unactivated state initial minimum absorbance wavelength values having negative absorbance values. Still further, the USIMAWV affect can result in positive and/or negative absorbance spikes, in particular at wavelength values less than 360 nm. While not intending to be bound by any theory, it is believed that, in the case of organic polymer substrates and organic polymer coatings, the USIMAWV affect is due, at least in part, to the presence of aromatic rings in the substrate and/or the coating matrix, coupled with instrument reference subtraction. With some embodiments, when the substrate is quartz, the USIMAWV affect can be minimized. When substrates and coatings composed of organic polymer materials, and instrument reference subtraction are used, it is believed that the first and second unactivated state initial minimum absorbance wavelength values (such as 71 and 80 of FIG. 3) as described for purposes of non-limiting illustration and in further detail herein with reference to FIG. 3, can each be subject to the USIMAWV affect.

As used herein, and unless otherwise indicated, "percent transmittance" can be determined using an art-recognized instrument, such as an ULTRASCAN PRO spectrometer obtained commercially from HunterLab, in accordance with instructions provided in the spectrometer user manual.

As used herein the term "linearly polarize" means to confine the vibrations of the electric vector of electromagnetic waves, such as light waves, to one direction or plane.

Other than in the operating examples, or where otherwise indicated, all numbers expressing quantities of ingredients, reaction conditions, and so forth used in the specification and claims are to be understood as modified in all instances by the term "about."

As used herein, spatial or directional terms, such as "left", "right", "inner", "outer", "above", "below", and the like, relate to the invention as it is depicted in the drawing figures. However, it is to be understood that the invention can assume various alternative orientations and, accordingly, such terms are not to be considered as limiting.

As used herein, the terms "formed over," "deposited over," "provided over," "applied over," "residing over," or "positioned over," mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

The photochromic-dichroic articles of the present invention include a substrate. Substrates from which the substrate of the photochromic-dichroic articles of the present invention can be selected include, but are not limited to, substrates formed from organic materials, inorganic materials, or combinations thereof (for example, composite materials). Non-limiting examples of substrates that can be used in accordance with various non-limiting embodiments disclosed herein are described in more detail below.

Non-limiting examples of organic materials that can be used to form the substrate of the photochromic-dichroic articles of the present invention, include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly (ethylene glycol)bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

The substrate can, with some embodiments, be an ophthalmic substrate. Non-limiting examples of organic materials suitable for use in forming ophthalmic substrates include, but are not limited to, the art-recognized polymers that are useful as ophthalmic substrates, such as organic optical resins that are used to prepare optically clear castings for optical applications, such as ophthalmic lenses.

Other non-limiting examples of organic materials suitable for use in forming the substrate of the photochromic-dichroic articles of the present invention include both synthetic and natural organic materials, including without limitation: opaque or translucent polymeric materials, natural and synthetic textiles, and cellulosic materials such as, paper and wood.

Non-limiting examples of inorganic materials suitable for use in forming the substrate of the photochromic-dichroic articles of the present invention include glasses, minerals, ceramics, and metals. For example, in one non-limiting embodiment the substrate can include glass. In other non-limiting embodiments, the substrate can have a reflective surface, for example, a polished ceramic substrate, metal substrate, or mineral substrate. In other non-limiting embodiments, a reflective coating or layer can be deposited or otherwise applied to a surface of an inorganic or an organic substrate to make it reflective or to enhance its reflectivity.

Further, according to certain non-limiting embodiments disclosed herein, the substrate can have a protective coating, such as, but not limited to, an abrasion-resistant coating, such as a "hard coat," on its exterior surfaces. For example, commercially available thermoplastic polycarbonate ophthalmic lens substrates are often sold with an abrasion-resistant coating already applied to its exterior surfaces because these surfaces tend to be readily scratched, abraded or scuffed. An example of such a lens substrate is the GENTEX™ polycarbonate lens (available from Gentex Optics). Therefore, as used herein the term "substrate" includes a substrate having a protective coating, such as but not limited to an abrasion-resistant coating, on its surface(s).

Still further, the substrate of the photochromic-dichroic articles of the present invention can be selected from untinted (or non-tinted) substrates, tinted substrates, linearly polarizing substrates, circularly polarizing substrates, elliptically polarizing substrates, photochromic substrates, or tinted-photochromic substrates. As used herein with reference to substrates the term "untinted" means substrates that are essentially free of coloring agent additions (such as, but not limited to, conventional dyes) and have an absorption spectrum for visible radiation that does not vary significantly in response to actinic radiation. Further, with reference to substrates the term "tinted" means substrates that have a coloring agent addition (such as, but not limited to, conventional dyes) and an absorption spectrum for visible radiation that does not vary significantly in response to actinic radiation.

As used herein the term "linearly polarizing" with regard to the substrate means substrates that are adapted to linearly polarize radiation. As used herein the term "circularly polarizing" with regard to the substrate means substrates that are adapted to circularly polarize radiation. As used herein the term "elliptically polarizing" with regard to the substrate means substrates that are adapted to elliptically polarize radiation. As used herein with the term "photochromic" with regard to the substrate means substrates having an absorption spectrum for visible radiation that varies in response to at least actinic radiation. Further, as used herein with regard to the substrate, the term "tinted-photochromic" means substrates containing a coloring agent addition as well as a photochromic material, and having an absorption spectrum for visible radiation that varies in response to at least actinic radiation. Thus, for example and without limitation, a tinted-photochromic substrate can have a first color characteristic of the coloring agent and a second color characteristic of the combination of the coloring agent the photochromic material when exposed to actinic radiation.

With reference to FIG. 1, and for purposes of non-limiting illustration, a photochromic-dichroic article 3 according to the present invention is depicted. Photochromic-dichroic article 3 includes a substrate 11 having a first surface 14 and a second surface 17, in which the first 14 and second 17 surfaces are opposed to each other. First surface 14 of substrate 11, with some embodiments, faces incident actinic radiation depicted by arrow 20. Photochromic-dichroic article 3 further includes a first photochromic-dichroic layer 23 positioned over first surface 14 of substrate 11. With some embodiments first photochromic-dichroic layer 23 abuts first surface 14. In accordance with additional embodiments, one or more additional layers, such as a primer layer (not shown) and/or a first alignment layer (not shown), are interposed between first photochromic-dichroic layer 23 and first surface 14 of substrate 11.

The first photochromic-dichroic layer includes at least one first photochromic-dichroic compound. The first photochromic-dichroic compound is laterally aligned within the first photochromic-dichroic layer. By laterally aligned means that the first photochromic-dichroic compound is aligned laterally across at least a portion of the width or length of the first photochromic-dichroic layer. The first photochromic-dichroic compound can be laterally aligned along the upper and/or lower surfaces of the first photochromic-dichroic layer, within at least a portion of the interior of the first photochromic-dichroic layer, or any combination thereof. Lateral alignment of the first photochromic-dichroic compound within the first photochromic-dichroic layer serves to define a first polarization axis of the first photochromic-dichroic layer. With non-limiting reference to FIG. 1, first photochromic-dichroic layer 23 has a first polarization axis as depicted by double-headed arrow 26.

Photochromic-dichroic article 3 further includes a second photochromic-dichroic layer 29 that is positioned over first photochromic-dichroic layer 23. With some embodiments second photochromic-dichroic layer 29 abuts first photochromic-dichroic layer 23. In accordance with additional embodiments, one or more additional layers, such as a second alignment layer (not shown), are interposed between second photochromic-dichroic layer 29 and first photochromic-dichroic layer 23.

The second photochromic-dichroic layer includes at least one second photochromic-dichroic compound. The second photochromic-dichroic compound is laterally aligned within the second photochromic-dichroic layer. By laterally aligned means that the second photochromic-dichroic compound is aligned laterally across at least a portion of the width or length of the second photochromic-dichroic layer. The second photochromic-dichroic compound can be laterally aligned along the upper and/or lower surfaces of the second photochromic-dichroic layer, within at least a portion of the interior of the second photochromic-dichroic layer, or any combination thereof. Lateral alignment of the second photochromic-dichroic compound within the second photochromic-dichroic layer serves to define a second polarization axis of the second photochromic-dichroic layer. With non-limiting reference to FIG. 1, second photochromic-dichroic layer 29 has a second polarization axis as depicted by double-headed arrow 32.

With the photochromic-dichroic articles of the present invention, the first polarization axis of the first photochromic-dichroic layer and the second polarization axis of the second photochromic-dichroic layer are oriented relative to each other at an angle of greater than 0° and less than or equal to 90°, such as from 0.1° to 90°, or from 1° to 90°, or from 10° to 90°, or from 25° to 90°, or from 45° to 90°, or from 60° to 90°, inclusive of the recited values. With some embodiments, when the first and second polarization axes are oriented relative to each other at an angle of 90°, the photochromic-dichroic articles of the present invention have a minimum level of transmittance of incident actinic radiation, provided the first and second photochromic-dichroic compounds undergo both photochromic activation (e.g., being converted to a colored state) and dichroic activation when exposed to incident actinic radiation, such as when exposed to direct sunlight.

Depending on the wavelength or range of wavelengths, and/or energy (or strength) of incident electromagnetic energy, the photochromic-dichroic articles of the present invention can provide a variety of photochromic and/or dichroic responses, resulting in a variety of observable colors, color intensities, polarization effects, and/or at least partially crossed polarization effects. The second photochromic-dichroic compound and the underlying first photochromic-dichroic compound of the photochromic-dichroic articles of the present invention can each independently undergo any combination of photochromic activation (e.g., conversion to a colored state) and/or dichroic activation (resulting in at least partial linear polarization of incident electromagnetic radiation). With some embodiments, if the underlying first photochromic-dichroic compound undergoes photochromic or dichroic activation, the overlying second photochromic-dichroic compound undergoes photochromic and/or dichroic activation.

With some embodiments, the second photochromic-dichroic compound undergoes photochromic activation (e.g., is converted to a colored state) and dichroic activation, while the underlying first photochromic-dichroic compound undergoes photochromic activation and dichroic activation, such as when the photochromic-dichroic article is exposed to direct sunlight. With some embodiments, the second photochromic-dichroic compound undergoes photochromic activation (e.g., is converted to a colored state) and/or dichroic activation, while the underlying first photochromic-dichroic compound undergoes substantially no photochromic activation and substantially no dichroic activation, when the photochromic-dichroic article is exposed to actinic radiation having a limited range of wavelengths and/or reduced energy, such as when a glass panel, such as an automotive windshield or window, is interposed between the source of actinic radiation and the photochromic-dichroic article. With some further embodiments, the second photochromic-dichroic compound undergoes substantially no photochromic activation and substantially no dichroic activation, and the underlying first photochromic-dichroic compound undergoes substantially no photochromic activation and substantially no dichroic activation, such as when the photochromic-dichroic article is exposed to ambient indoor light, such as fluorescent light.

The first photochromic-dichroic layer and the second photochromic-dichroic layer can, with some embodiments of the photochromic-dichroic articles of the present invention, each independently be non-polarizing in a first state (that is, the layer will not confine the vibrations of the electric vector of light waves to one direction), and be linearly polarizing in a second state with regard to transmitted radiation. As used herein the term "transmitted radiation" refers to radiation that is passed through at least a portion of an object. Although not limiting herein, the transmitted radiation can be ultraviolet radiation, visible radiation, infrared radiation, or a combination thereof. Thus, according to various non-limiting embodiments disclosed herein, the first photochromic-dichroic layer and the second photochromic-dichroic layer can each independently be non-polarizing in the first state and linearly polarizing in the second state thereby transmitting linearly polarized ultraviolet radiation, transmitting linearly polarized visible radiation, or a combination thereof in the second state.

According to still other non-limiting embodiments, the first photochromic-dichroic layer and the second photochromic-dichroic layer can each independently have a first absorption spectrum in the first state, a second absorption spectrum in the second state, and can be linearly polarizing in both the first and second states.

With some embodiments, the first photochromic-dichroic layer and the second photochromic-dichroic layer can each independently have an average absorption ratio of at least 1.5 in at least one state. With some further embodiments, the first photochromic-dichroic layer and the second photochromic-dichroic layer can each independently have an average absorption ratio ranging from at least 1.5 to 50 (or greater) in at least one state. The term "absorption ratio" refers to the ratio of the absorbance of radiation linearly polarized in a first plane to the absorbance of radiation linearly polarized in a plane orthogonal to the first plane, in which the first plane is taken as the plane with the highest absorbance. Thus, the absorption ratio (and the average absorption ratio which is described below) is an indication of how strongly one of two orthogonal plane polarized components of radiation is absorbed by an object or material.

The average absorption ratio of a photochromic-dichroic layer that includes a photochromic-dichroic compound can be determined as set forth below. For example, to determine the average absorption ratio of a photochromic-dichroic layer that includes a photochromic-dichroic compound, a substrate having a layer is positioned on an optical bench and the layer is placed in a linearly polarizing state by activation of the photochromic-dichroic compound. Activation is achieved by exposing the layer to UV radiation for a time sufficient to reach a saturated or near saturated state (that is, a state wherein the absorption properties of the layer do not substantially change over the interval of time during which the measurements are made). Absorption measurements are taken over a period of time (typically 10 to 300 seconds) at 3 second intervals for light that is linearly polarized in a plane perpendicular to the optical bench (referred to as the 0° polarization plane or direction) and light that is linearly polarized in a plane that is parallel to the optical bench (referred to as the 90° polarization plane or direction) in the following sequence: 0°, 90°, 90°, 0° etc. The absorbance of the linearly polarized light by the layer is measured at each time interval for all of the wavelengths tested and the unactivated absorbance (i.e., the absorbance of the coating in an unactivated state) over the same range of wavelengths is subtracted to obtain absorption spectra for the layer in an activated state in each of the 0° and 90° polarization planes to obtain an average difference absorption spectrum in each polarization plane for the coating in the saturated or near-saturated state.

Figure 4:
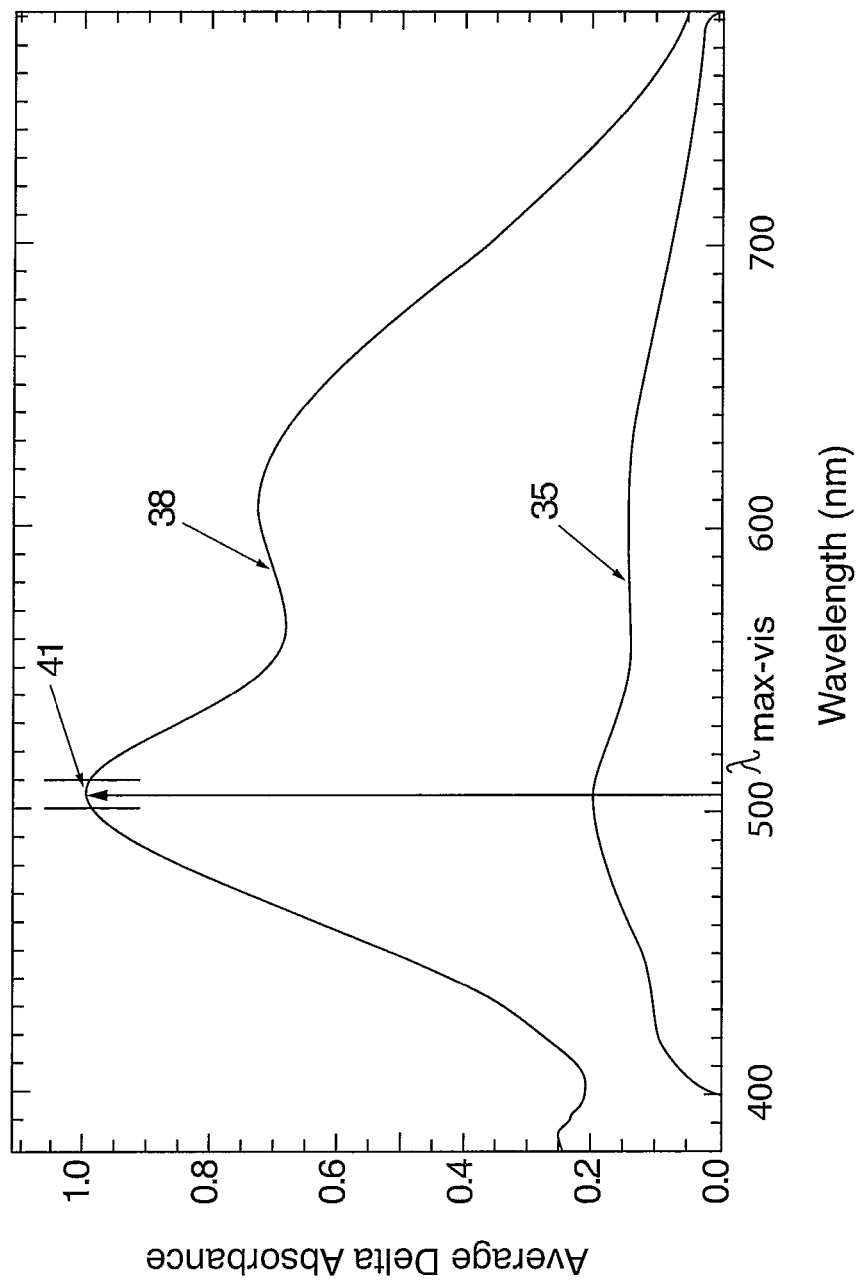
FIG. 4 is a graphical representation of average delta absorbance as a function of wavelength (over a visible wavelength region after activation with actinic radiation), and depicts two average difference absorption spectra obtained in two orthogonal planes for a photochromic-dichroic layer that includes a photochromic-dichroic compound that can be included in the first or second photochromic-dichroic layers of the photochromic-dichroic articles in accordance with some embodiments of the present invention.

For example, with reference to FIG. 4, there is shown the average difference absorption spectrum (generally indicated 38) in one polarization plane that was obtained for a photochromic-dichroic layer according to one non-limiting embodiment disclosed herein. The average absorption spectrum (generally indicated 35) is the average difference absorption spectrum obtained for the same photochromic-dichroic layer in the orthogonal polarization plane.

Based on the average difference absorption spectra obtained for the photochromic-dichroic layer, the average absorption ratio for the photochromic-dichroic layer is obtained as follows. The absorption ratio of the photochromic-dichroic layer at each wavelength in a predetermined range of wavelengths corresponding to $\lambda_{max-vis}+/-5$ nanometers (generally indicated as 41 in FIG. 4), wherein $\lambda_{max-vis}$ is the wavelength at which the coating had the highest average absorbance in any plane, is calculated according to the following equation (Eq. 1):

$$AR_{\lambda_i} = Ab^1_{\lambda_i}/Ab^2_{\lambda_i} \qquad \text{Eq.1}$$

With reference to equation Eq. 1, $AR_{\lambda_i}$ is the absorption ratio at wavelength $\lambda_i$, $Ab^1_{\lambda_i}$ is the average absorption at wavelength $\lambda_i$ in the polarization direction (i.e., 0° or 90°) having the higher absorbance, and $Ab^2_{\lambda_i}$ is the average absorption at wavelength $\lambda_i$ in the remaining polarization direction. As previously discussed, the "absorption ratio" refers to the ratio of the absorbance of radiation linearly polarized in a first plane to the absorbance of the same wavelength radiation linearly polarized in a plane orthogonal to the first plane, wherein the first plane is taken as the plane with the highest absorbance.

The average absorption ratio ("AR") for the photochromic-dichroic layer is then calculated by averaging the individual absorption ratios over the predetermined range of wavelengths (i.e., $\lambda_{max-vis}+/-5$ nanometers) according to the following equation (Eq. 2):

$$AR = (\Sigma AR_{\lambda_i})n_i \qquad \text{Eq. 2}$$

With reference to equation Eq. 2, AR is average absorption ratio for the coating, $AR_{\lambda_i}$ are the individual absorption ratios (as determined above in Eq. 1) for each wavelength within the predetermined range of wavelengths, and $n_i$ is the number of individual absorption ratios averaged. A more detailed description of this method of determining the average absorption ratio is provided in the Examples of U.S. Pat. No. 7,256,921 at column 102, line 38 through column 103, line 15, the disclosure of which is specifically incorporated herein by reference.

With some embodiments, the first photochromic-dichroic compound of the first photochromic-dichroic layer and the second photochromic-dichroic compound of the second photochromic-dichroic layer can each independently be at least partially aligned. As previously discussed, the term "photochromic-dichroic" means displaying both photochromic and dichroic (i.e., linearly polarizing) properties under certain conditions, which properties are at least detectable by instrumentation. Accordingly, "photochromic-dichroic compounds" are compounds displaying both photochromic and dichroic (i.e., linearly polarizing) properties under certain conditions, which properties are at least detectable by instrumentation. Thus, photochromic-dichroic compounds have an absorption spectrum for at least visible radiation that varies in response to at least actinic radiation and are capable of absorbing one of two orthogonal plane polarized components of at least transmitted radiation more strongly than the other. Additionally, as with conventional photochromic compounds discussed herein, the first and second photochromic-dichroic compounds disclosed herein can each independently be thermally reversible. That is, the first and second photochromic-dichroic compounds can each independently switch from a first state to a second state in response to actinic radiation and revert back to the first state in response to thermal energy. As used herein with some embodiments, the term "compound" means a substance formed by the union of two or more elements, components, ingredients, or parts and includes, without limitation, molecules and macromolecules (for example polymers and oligomers) formed by the union of two or more elements, components, ingredients, or parts.

For example, the first and second photochromic-dichroic layers can each independently have a first state having a first absorption spectrum, a second state having a second absorption spectrum that is different from the first absorption spectrum, and can be adapted to switch from the first state to the second state in response to at least actinic radiation and to revert back to the first state in response to thermal energy. Further, the first and second photochromic-dichroic compounds can each independently be dichroic (i.e., linearly polarizing) in one or both of the first state and the second state. For example, although not required, the first and second photochromic-dichroic compounds can each independently be linearly polarizing in an activated state and non-polarizing in the bleached or faded state (the not activated or unactivated state). As used herein, the term "activated state" refers to a photochromic-dichroic compound when exposed to sufficient actinic radiation to cause at least a portion of the photochromic-dichroic compound to switch from a first state to a second state. Further, although not required, the first and second photochromic-dichroic compounds can each independently be dichroic in both the first and second states. While not limiting herein, for example, the first and second photochromic-dichroic compounds can each independently linearly polarize visible radiation in both the activated state and the bleached state. Further, the first and second photochromic-dichroic compounds can each independently linearly polarize visible radiation in an activated state, and can linearly polarize UV radiation in the bleached state.

Although not required, according to various non-limiting embodiments disclosed herein, the first and second photochromic-dichroic compounds, of the respective first and second photochromic-dichroic layers, can each independently have an average absorption ratio of at least 1.5 in an activated state as determined according to the CELL METHOD. According to other non-limiting embodiments disclosed herein, the first and second photochromic-dichroic compounds can each independently have an average absorption ratio greater than 2.3 in an activated state as determined according to the CELL METHOD. According to still other non-limiting embodiments, the at least partially aligned first and second photochromic-dichroic compounds, of the respective first and second photochromic-dichroic layers, can each independently have an average absorption ratio ranging from 1.5 to 50 in an activated state as determined according to the CELL METHOD. In accordance with other non-limiting embodiments, the at least partially aligned first and second photochromic-dichroic compounds, of the respective first and second photochromic-dichroic layers, can each independently have an average absorption ratio ranging from 4 to 20, or an average absorption ratio ranging from 3 to 30, or an average absorption ratio ranging from 2.5 to 50 in an activated state as determined according to the CELL METHOD. More typically, however, the average absorption ratio of the at least partially aligned first and second photochromic-dichroic compounds can each independently be any average absorption ratio that is sufficient to impart the desired properties to the photochromic-dichroic articles of the present invention. Non-limiting examples of suitable photochromic-dichroic compounds from which the first and second photochromic-dichroic compounds can each independently be selected, with some embodiments, are described in detail herein below.

The CELL METHOD for determining the average absorption ratio of the a photochromic-dichroic compound (such as the first and second photochromic compounds) is essentially the same as the method used to determine the average absorption ratio of a photochromic-dichroic layer containing such a photochromic-dichroic compound, except that, instead of measuring the absorbance of a coated substrate, a cell assembly containing an aligned liquid crystal material and the particular photochromic-dichroic compound is tested.

With some embodiments, and for purposes of non-limiting illustration, the cell assembly can include two opposing glass substrates that are spaced apart by 20 microns+/−1 micron. The substrates are sealed along two opposite edges to form a cell. The inner surface of each of the glass substrates is coated with a polyimide coating, the surface of which has been at least partially ordered by rubbing. Alignment of the photochromic-dichroic compound is achieved by introducing the photochromic-dichroic compound and the liquid crystal medium into the cell assembly, and allowing the liquid crystal medium to align with the rubbed polyimide surface. Once the liquid crystal medium and the photochromic-dichroic compound are aligned, the cell assembly is placed on an optical bench (which is described in detail in the Examples) and the average absorption ratio is determined in the manner previously described for the coated substrates, except that the unactivated absorbance of the cell assembly is subtracted from the activated absorbance to obtain the average difference absorption spectra.

While dichroic compounds are capable of preferentially absorbing one of two orthogonal components of plane polarized light, it is generally necessary to suitably position or arrange the molecules of a dichroic compound in order to achieve a net linear polarization effect. Similarly, it is generally necessary to suitably position or arrange the molecules of a photochromic-dichroic compound to achieve a net linear polarization effect. That is, it is generally necessary to align the molecules of a photochromic-dichroic compound such that the long axis of the molecules, of the photochromic-dichroic compound in an activated state, are generally parallel to each other. As such, and in accordance with various non-limiting embodiments disclosed herein, the first and second photochromic-dichroic compounds are each independently at least partially aligned. Further, if the activated state of a photochromic-dichroic compound corresponds to a dichroic state of the material in which it resides, the photochromic-dichroic compound can be at least partially aligned such that the long axis of the molecules of the photochromic-dichroic compound in the activated state are aligned. As used herein the term "align" means to bring into suitable arrangement or position by interaction with another material, compound or structure.

Further, although not limiting herein, the first photochromic-dichroic layer can include a plurality of first photochromic-dichroic compounds, and/or the second photochromic-dichroic layer can include a plurality of second photochromic-dichroic compounds. Although not limiting herein, when two or more photochromic-dichroic compounds are used in combination, the photochromic-dichroic compounds can be chosen to complement one another so as to produce a desired color or hue. For example, mixtures photochromic-dichroic compounds can be used according to certain non-limiting embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors. Additionally or alternatively, each photochromic-dichroic layer, of the photochromic-dichroic articles of the present invention, can each independently include mixtures of photochromic-dichroic compounds having complementary linear polarization states. For example, the photochromic-dichroic compounds, of a particular photochromic-dichroic layer, can be chosen to have complementary linear polarization states over a desired range of wavelengths so as to provide a photochromic-dichroic article that is capable of polarizing light over the desired range of wavelengths. Still further, mixtures of complementary photochromic-dichroic compounds having essentially the same polarization states at the same wavelengths can be chosen to reinforce or enhance the overall linear polarization achieved. For example, according to some non-limiting embodiments, each photochromic-dichroic layer, of the photochromic-dichroic articles of the present invention, can independently include at least two at least partially aligned photochromic-dichroic compounds, in which each of the at least partially aligned photochromic-dichroic compounds have: complementary colors; and/or complementary linear polarization states.

The first and second photochromic-dichroic layers can each independently further include at least one additive that can facilitate one or more of the processing, the properties, or the performance of such layer. Non-limiting examples of such additives include dyes, alignment promoters, horizontal alignment agents, kinetic enhancing additives, photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, and adhesion promoters (such as hexanediol diacrylate and coupling agents).

Examples of dyes that can be present in the first and/or second photochromic-dichroic layers include, but are not limited to, organic dyes that are capable of imparting a desired color or other optical property to the first and/or second photochromic-dichroic layer.

As used herein, the term "alignment promoter" means an additive that can facilitate at least one of the rate and uniformity of the alignment of a material to which it is added. Non-limiting examples of alignment promoters that can be present in the first and/or second photochromic-dichroic layers include, but are not limited to, those described in U.S. Pat. No. 6,338,808 and U.S. Patent Publication No. 2002/0039627, which are hereby specifically incorporated by reference herein.

Horizontal alignment (or orientation) agents that can be used with some embodiments of the present invention assist in aligning the longitudinal axis of a photochromic-dichroic compound substantially parallel to a horizontal plane of the photochromic-dichroic layer. Examples of horizontal alignment agents that can be used with some embodiments of the present invention include, but are not limited to, those disclosed at column 13, line 58 through column 23, line 2 of U.S. Pat. No. 7,315,341 B2, which disclosure is incorporated herein by reference.

Non-limiting examples of kinetic enhancing additives that can be present in the various layers of the photochromic-dichroic article of the present invention, such as the first and/or second photochromic-dichroic layers, include epoxy-containing compounds, organic polyols, and/or plasticizers. More specific examples of such kinetic enhancing additives are disclosed in U.S. Pat. No. 6,433,043 and U.S. Patent Publication No. 2003/0045612, which are hereby specifically incorporated by reference herein.

Non-limiting examples of photoinitiators that can be present in the various layers of the photochromic-dichroic article of the present invention, such as the first and/or second photochromic-dichroic layer, include, but are not limited to, cleavage-type photoinitiators and abstraction-type photoinitiators. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator that can be present in one or more of the layers of the photochromic-dichroic article of the present invention, such as the first and/or second photochromic-dichroic layer, is a visible light photoinitiator. Non-limiting examples of suitable visible light photoinitiators are disclosed at column 12, line 11 to column 13, line 21 of U.S. Pat. No. 6,602,603, which is specifically incorporated by reference herein.

Examples of thermal initiators include, but are not limited to, organic peroxy compounds and azobis(organonitrile) compounds. Examples of organic peroxy compounds that are useful as thermal initiators include, but are not limited to, peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. In one non-limiting embodiment the thermal initiators used are those that do not discolor the resulting polymerizate. Examples of azobis(organonitrile) compounds that can be used as thermal initiators include, but are not limited to, azobis(isobutyronitrile), azobis(2,4-dimethylvaleronitrile) or a mixture thereof.

Examples of polymerization inhibitors include, but are not limited to: nitrobenzene, 1,3,5,-trinitrobenzene, p-benzoquinone, chloranil, DPPH, $FeCl_3$, $CuCl_2$, oxygen, sulfur, aniline, phenol, p-dihydroxybenzene, 1,2,3-trihydroxybenzene, and 2,4,6-trimethylphenol.

Examples of solvents that can be present in forming the various layers of the photochromic-dichroic articles of the present invention, such as the first and/or second photochromic-dichroic layer, include, but are not limited to, those that will dissolve solid components of the coating, that are compatible with the coating and the elements and substrates, and/or can ensure uniform coverage of the exterior surface(s) to which the coating is applied. Examples of solvents include, but are not limited to, the following: propylene glycol monomethyl ether acetate and their derivates (sold as DOWANOL® industrial solvents), acetone, amyl propionate, anisole, benzene, butyl acetate, cyclohexane, dialkyl ethers of ethylene glycol, e.g., diethylene glycol dimethyl ether and their derivates (sold as CELLOSOLVE® industrial solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydrofuran, toluene, xylene, 2-methoxyethyl ether, 3-propylene glycol methyl ether, and mixtures thereof.

In another non-limiting embodiment, the first and second photochromic-dichroic layers can each independently include at least one conventional dichroic compound. Examples of suitable conventional dichroic compounds include, but are not limited to, azomethines, indigoids, thio-indigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, iodine and iodides. In another non-limiting embodiment, the dichroic material can include at least one reactive functional group that is capable of forming at least one covalent bond with another materials. With some embodiments, the dichroic material can be a polymerizable dichroic compound. Correspondingly, the dichroic material can include at least one group that is capable of being polymerized (i.e., a "polymerizable group"). For example, although not limiting herein, in one non-limiting embodiment the dichroic compound can have at least one alkoxy, polyalkoxy, alkyl, or polyalkyl substituent terminated with at least one polymerizable group.

If present and in accordance with some embodiments, one or more conventional dichroic compounds can independently be present, in the first and/or second photochromic-dichroic layers, in an amount of at least 0.001 percent by weight and less than or equal to 10 (or 10.0) percent by weight, such as from 0.01 percent by weight to 4 (or 4.0) percent by weight, or from 0.1 percent by weight to 1 (or 1.0) percent by weight, in which the percent weights are in each case based on total weight of the respective first or second photochromic-dichroic layer.

With some embodiments, the first and second photochromic-dichroic layers can each independently include at least one conventional photochromic compound. As used herein, the term "conventional photochromic compound" includes both thermally reversible and non-thermally reversible (such as actinic light reversible, such as photo-reversible) photochromic compounds. Generally, although not limiting herein, when two or more conventional photochromic materials are used in combination with each other or with a photochromic-dichroic compound, the various materials can be chosen to complement one another to produce a desired color or hue. For example, mixtures of photochromic compounds can be used according to certain non-limiting embodiments disclosed herein to attain certain activated colors, such as a near neutral gray or near neutral brown. See, for example, U.S. Pat. No. 5,645,767, column 12, line 66 to column 13, line 19, the disclosure of which is specifically incorporated by reference herein, which describes the parameters that define neutral gray and brown colors.

If present and in accordance with some embodiments, one or more conventional photochromic compounds can independently be present, in the first and/or second photochromic-dichroic layers, in an amount of at least 0.001 percent by weight and less than or equal to 5 (or 5.0) percent by weight, such as from 0.01 percent by weight to 4 (or 4.0) percent by weight, or from 0.1 percent by weight to 1 (or 1.0) percent by weight, in which the percent weights are in each case based on total weight of the respective first or second photochromic-dichroic layer.

In accordance with some embodiments, the first and second photochromic-dichroic layer are each independently free of conventional photochromic compounds.

The first photochromic-dichroic layer can include one or more suitable first photochromic-dichroic compounds, and the second photochromic-dichroic layer can include one or more suitable second photochromic-dichroic compounds. Examples of photochromic-dichroic compounds from which the first and second photochromic-dichroic compounds can each be independently selected include, but are not limited to, the following:

(PCDC-1) 3-phenyl-3-(4-(4-(3-piperidin-4-yl-propyl)piperidino)phenyl)-13,13-dimethyl-3H,13-indeno[2',3':3,4]naphtho[1,2-b]pyran;

(PCDC-2) 3-phenyl-3-(4-(4-(3-(1-(2-hydroxyethyl)piperidin-4-yl)propyl)piperidino)phenyl)-13,13-dimethyl-3H,13H-indeno[2',3':3,4]naphtho[1,2-b]pyran;

(PCDC-3) 3-phenyl-3-(4-(4-(4-butyl-phenylcarbamoyl)-piperidin-1-yl)phenyl)-13,13-dimethyl-6-methoxy-7-(4-phenyl-piperazin-1-yl)-3H,13H-indeno[2',3':3,4]naphtho[1,2-b]pyran;

(PCDC-4) 3-phenyl-3-(4-([1,4']bipiperidinyl-1'-yl)phenyl)-13,13-dimethyl-6-methoxy-7-([1,4']bipiperidinyl-1'-yl)-3H,13H-indeno[2',3':3,4]naphtho[1,2-b]pyran;

(PCDC-5) 3-phenyl-3-(4-(4-phenyl-piperazin-1-yl)phenyl)-13,13-dimethyl-6-methoxy-7-(4-(4-hexylbenzoyloxy)-piperidin-1-yl)-3H,13H-indeno[2',3':3,4]naphtho[1,2-b]pyran;

(PCDC-6) 3-phenyl-3-(4-(4-phenyl-piperazin-1-yl)phenyl)-13,13-dimethyl-6-methoxy-7-(4-(4'-octyloxy-biphenyl-4-carbonyloxy)-piperidin-1-yl)-3H,13H-indeno[2',3':3,4]naphtho[1,2-b]pyran;

(PCDC-7) 3-phenyl-3-(4-(4-phenyl-piperazin-1-yl)phenyl)-13,13-dimethyl-6-methoxy-7-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-3H,13H-indeno[2',3':3,4]naphtho[1,2-b]pyran;

(PCDC-8) 3-phenyl-3-(4-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-phenyl)-13,13-dimethyl-6-methoxy-7-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-3H,13H-indeno[2',3':3,4]naphtho[1,2-b]pyran;

(PCDC-9) 3-phenyl-3-(4-(4-phenylpiperazin-1-yl)phenyl)-13,13-dimethyl-6-methoxy-7-(4-(4-(4'-octyloxy-biphenyl-4-carbonyloxy)phenyl)piperazin-1-yl)-3H,13H-indeno[2',3':3,4]naphtho[1,2-b]pyran;

(PCDC-10) 3-phenyl-3-(4-(4-phenyl-piperazin-1-yl)phenyl)-13,13-dimethyl-6-methoxy-7-(4-(4-(4-hexyloxyphenylcarbonyloxy)phenyl)piperazin-1-yl)-3H,13H-indeno[2',3':3,4]naphtho[1,2-b]pyran;

(PCDC-11) 3-phenyl-3-(4-(4-phenyl-piperazin-1-yl)phenyl)-13,13-dimethyl-6-methoxy-7-(4-(4-(4-(2-fluorobenzoyloxy)benzoyloxy)phenyl)piperazin-1-yl)-3H,13H-indeno[2',3':3,4]naphtho[1,2-b]pyran;

(PCDC-12) 3-phenyl-3-(4-(pyrrolidin-1-yl)phenyl)-13-hydroxy-13-ethyl-6-methoxy-7-(4-(4-(4-hexylbenzoyloxy)phenyl)piperazin-1-yl)-3H,13H-indeno[2',3':3,4]naphtho[1,2-b]pyran;

(PCDC-13) 3-phenyl-3-(4-(pyrrolidin-1-yl)phenyl)-13,13-dimethyl-6-methoxy-7-(4-(4-hexylbenzoyloxy)benzoyloxy)-3H,13H-indeno[2',3':3,4]naphtho[1,2-b]pyran;

(PCDC-14) 3-phenyl-3-(4-(pyrrolidin-1-yl)phenyl)-13,13-dimethyl-6-methoxy-7-(4-(4-(4-hexylbenzoyloxy)benzoyloxy)benzoyloxy)-3H,13H-indeno[2',3':3,4]naphtho[1,2-b]pyran;

(PCDC-15) 3-phenyl-3-(4-(4-methoxyphenyl)-piperazin-1-yl))phenyl)-13,13-dimethyl-6-methoxy-7-(4-(4-(3-phenylprop-2-ynoyloxy)phenyl)piperazin-1-yl)-3H,13H-indeno[2',3':3,4]naphtho[1,2-b]pyran;

(PCDC-16) 3-(4-methoxyphenyl)-3-(4-(4-methoxyphenyl)piperazin-1-yl)phenyl)-13-ethyl-13-hydroxy-6-methoxy-7-(4-(4-(4-hexylbenzoyloxy)phenyl)piperazin-1-yl)-3H,13H-indeno[2',3':3,4]naphtho[1,2-b]pyran;

(PCDC-17) 3-phenyl-3-{4-(pyrrolidin-1-yl)phenyl)-13-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxy]-13-ethyl-6-methoxy-7-(4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperadin-1-yl)-3H,13H-indeno[2',3':3,4]naphtho[1,2-b]pyran;

(PCDC-18) 3-phenyl-3-(4-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-phenyl)-13-ethyl-13-hydroxy-6-methoxy-7-{4-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy]-piperidin-1-yl}-)-3H,13H-indeno[2',3':3,4]naphtho[1,2-b]pyran;

(PCDC-19) 3-phenyl-3-{4-(pyrrolidin-1-yl)phenyl)-13,13-dimethyl-6-methoxy-7-(4-(4-(4-(3-phenyl-3-{4-(pyrrolidin-1-yl)phenyl}-13,13-dimethyl-6-methoxy-indeno[2',3':3,4]naphtho[1,2-b]pyran-7-yl)-piperadin-1-yl)oxycarbonyl)phenyl)phenyl)cabonyloxy)-3H,13H-indeno[2',3':3,4]naphtho[1,2-b]pyran;

(PCDC-20) 3-{2-methylphenyl}-3-phenyl-5-(4-(4'-(trans-4-pentylcyclohexyl)-[1,1'-biphenyl]-4-ylcarboxamido)phenyl)-3H-naphtho[2,1-b]pyran;

(PCDC-21) 3-{4-[4-(4-methoxy-phenyl)-piperazin-1-yl]-phenyl}-3-phenyl-7-(4-(4'-(trans-4-pentylcyclohexyl)-[1,1'-biphenyl]-4-ylcarboxamido)phenyl)-3H-naphtho[2,1-b]pyran;

(PCDC-22) 3-{4-[4-(4-methoxy-phenyl)-piperazin-1-yl]-phenyl}-3-phenyl-7-(4-phenyl-(phen-1-oxy)carbonyl)-3H-naphtho[2,1-b]pyran;

(PCDC-23) 3-{-4-[4-(4-methoxy-phenyl)-piperazin-1-yl]-phenyl}-3-phenyl-7-(N-(4-((4-dimethylamino)phenyl)diazenyl)phenyl)carbamoyl-3H-naphtho[2,1-b]pyran;

(PCDC-24) 2-phenyl-2-{4-[4-(4-methoxy-phenyl)-piperazin-1-yl]-phenyl}-benzofuro[3',2':7,8]benzo[b]pyran;

(PCDC-25) 2-phenyl-2-{4-[4-(4-methoxy-phenyl)-piperazin-1-yl]-phenyl}-7-(4-(4'-(trans-4-pentylcyclohexyl)-[1,1'-biphenyl]-4-ylcarboxamido)phenyl)-benzothieno[3',2':7,8]benzo[b]pyran;

(PCDC-26) 7-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}-2-phenyl-2-(4-pyrrolidin-1-yl-phenyl)-6-methoxycarbonyl-2H-benzo[b]pyran;

(PCDC-27) 2-phenyl-2-{4-[4-(4-methoxy-phenyl)-piperazin-1-yl]-phenyl}-9-hydroxy-8-methoxycarbonyl-2H-naphtho[1,2-b]pyran;

(PCDC-28) 2-phenyl-2-{4-[4-(4-methoxy-phenyl)-piperazin-1-yl]-phenyl}-9-hydroxy-8-(N-(4-butyl-phenyl))carbamoyl-2H-naphtho[1,2-b]pyran;

(PCDC-29) 2-phenyl-2-{4-[4-(4-methoxy-phenyl)-piperazin-1-yl]-phenyl}-9-hydroxy-8-(4-(4'-(trans-4-pentylcyclohexyl)-[1,1'-biphenyl]-4-ylcarboxamido)phenyl)-2H-naphtho[1,2-b]pyran;

(PCDC-30) 1,3,3-trimethyl-6'-(4-ethoxycarbonyl)-piperidin-1-yl)-spiro[indoline-2,3'-3H-naphtho[2,1-b][1,4]oxazine];

(PCDC-31) 1,3,3-trimethyl-6'-(4-[N-(4-butylphenyl)carbamoyl]-piperidin-1-yl)-spiro[indoline-2,3'-3H-naphtho[2,1-b][1,4]oxazine];

(PCDC-32) 1,3,3-trimethyl-6'-(4-(4-methoxyphenyl)piperazin-1-yl)-spiro[indoline-2,3'-3H-naphtho[2,1-b][1,4]oxazine];

(PCDC-33) 1,3,3-trimethyl-6'-(4-(4'-(trans-4-pentylcyclohexyl)-[1,1'-biphenyl]-4-ylcarboxamido)phenyl)-spiro[indoline-2,3'-3H-naphtho[2,1-b][1,4]oxazine];

(PCDC-34) 1,3,3,5,6-pentamethyl-7'-(4-(4'-(trans-4-pentylcyclohexyl)-[1,1'-biphenyl]-4-ylcarboxamido)phenyl))-spiro[indoline-2,3'-3H-naphtho[2,1-b][1,4]oxazine];

(PCDC-35) 1,3-diethyl-3-methyl-5-methoxy-6'-(4-(4'-Hexyloxy-biphenyl-4-carbonyloxy)-piperidin-1-yl)-spiro[indoline-2,3'-3H-naphtho[2,1-b][1,4]oxazine];

(PCDC-36) 1,3-diethyl-3-methyl-5-[4-(4-pentadecafluoroheptyloxy-phenylcarbamoyl)-benzyloxy]-6'-(4-(4'-hexyloxy-biphenyl-4-carbonyloxy)-piperidin-1-yl)-spiro[indoline-2,3'-3H-naphtho[2,1-b][1,4]oxazine];

(PCDC-37) 2-phenyl-2-{4-[4-(4-methoxy-phenyl)-piperazin-1-yl]-phenyl}-5-carbomethoxy-8-(N-(4-phenyl)phenyl)carbamoyl-2H-naphtho[1,2-b]pyran;

(PCDC-38) 2-phenyl-2-{4-[4-(4-methoxy-phenyl)-piperazin-1-yl]-phenyl}-5-carbomethoxy-8-(N-(4-phenyl)phenyl)carbamoyl-2H-fluoantheno[1,2-b]pyran;

(PCDC-39) 2-phenyl-2-{4-[4-(4-methoxy-phenyl)-piperazin-1-yl]-phenyl}-5-carbomethoxy-11-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl)-2H-fluoantheno[1,2-b]pyran;

(PCDC-40) 1-(4-carboxybutyl)-6-(4-(4-propylphenyl)carbonyloxy)phenyl)-3,3-dimethyl-6'-(4-ethoxycarbonyl)-piperidin-1-yl)-spiro[(1,2-dihydro-9H-dioxolano[4',5':6,7]indoline-2,3'-3H-naphtho[2,1-b][1,4]oxazine];

(PCDC-41) 1-(4-carboxybutyl)-6-(4-(4-propylphenyl)carbonyloxy)phenyl)-3,3-dimethyl-7'-(4-ethoxycarbonyl)-piperidin-1-yl)-spiro[(1,2-dihydro-9H-dioxolano[4',5':6,7]indoline-2,3'-3H-naphtho[1,2-b][1,4]oxazine];

(PCDC-42) 1,3-diethyl-3-methyl-5-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl)-6'-(4-(4'-hexyloxy-biphenyl-4-carbonyloxy)-piperidin-1-yl)-spiro[indoline-2,3'-3H-naphtho[2,1-b][1,4]oxazine];

(PCDC-43) 1-butyl-3-ethyl-3-methyl-5-methoxy-7'-(4-(4'-Hexyloxy-biphenyl-4-carbonyloxy)-piperidin-1-yl)-spiro[indoline-2,3'-3H-naphtho[1,2-b][1,4]oxazine];

(PCDC-44) 2-phenyl-2-{4-[4-(4-methoxy-phenyl)-piperazin-1-yl]-phenyl}-5-methoxycarbonyl-6-methyl-2H-9-(4-(4-propylphenyl)carbonyloxy)phenyl)-(1,2-dihydro-9H-dioxolano[4',5':6,7]) naphtho[1,2-b]pyran;

(PCDC-45) 3-(4-methoxyphenyl)-3-(4-(4-methoxyphenyl)piperazin-1-yl)phenyl)-13-ethyl-13-hydroxy-6-methoxy-7-(4-(4-propylphenyl)carbonyloxy)phenyl)-3H,13H-[1,2-dihydro-9H-dioxolano[4'',5'':6,7][indeno[2',3':3,4]]naphtho[1,2-b]pyran;

(PCDC-46) 3-phenyl-3-(4-(4-methoxyphenyl)piperazin-1-yl)phenyl)-13-ethyl-13-hydroxy-6-methoxy-7-(4-(4-hexylphenyl)carbonyloxy)phenyl)-3H,13H-[1,2-dihydro-9H-dioxolano[4'',5'':5,6][indeno[2',3':3,4]]naphtho[1,2-b]pyran;

(PCDC-47) 4-(4-((4-cyclohexylidene-1-ethyl-2,5-dioxopyrrolin-3-ylidene)ethyl)-2-thienyl)phenyl-(4-propyl)benzoate;

(PCDC-48) 4-(4-((4-adamantan-2-ylidene-1-(4-(4-hexylphenyl)carbonyloxy)phenyl)-2,5-dioxopyrrolin-3-ylidene)ethyl)-2-thienyl)phenyl-(4-propyl)benzoate;

(PCDC-49) 4-(4-((4-adamantan-2-ylidene-2,5-dioxo-1-(4-(4-(4-propylphenyl)piperazinyl)phenyl)pyrrolin-3-ylidene)ethyl)-2-thienyl)phenyl(4-propyl)benzoate;

(PCDC-50) 4-(4-((4-adamantan-2-ylidene-2,5-dioxo-1-(4-(4-(4-propylphenyl)piperazinyl)phenyl)pyrrolin-3-ylidene)ethyl)-1-methylpyrrol-2-yl)phenyl(4-propyl)benzoate;

(PCDC-51) 4-(4-((4-adamantan-2-ylidene-2,5-dioxo-1-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl)pyrrolin-3-ylidene)ethyl)-1-methylpyrrol-2-yl)phenyl(4-propyl)benzoate;

(PCDC-52) 4-(4-methyl-5,7-dioxo-6-(4-(4-(4-propylphenyl)piperazinyl)phenyl)spiro[8,7a-dihydrothiapheno[4,5-f]isoindole-8,2'-adamentane]-2-yl)phenyl(4-propyl)phenyl benzoate;

(PCDC-53) N-(4-{17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyloxy}phenyl-6,7-dihydro-4-methyl-2-phenylspiro(5,6-benzo[b]thiophenedicarboxylmide-7,2-tricyclo[3.3.1.1]decane);

(PCDC-54) N-cyanomethyl-6,7-dihydro-2-(4-(4-(4-propylphenyl)piperazinyl)phenyl)-4-methylspiro(5,6-benzo[b]thiophenedicarboxylmide-7,2-tricyclo[3.3.1.1]decane);

(PCDC-55) N-phenylethyl-6,7-dihydro-2-(4-(4-(4-hexylbenzoyloxy)phenyl)piperazin-1-yl)phenyl-4-methylspiro(5,6-benzo[b]thiophenedicarboxylmide-7,2-tricyclo[3.3.1.1]decane);

(PCDC-56) N-phenylethyl-6,7-dihydro-2-(4-(4-(4-hexylbenzoyloxy)phenyl)piperazin-1-yl)phenyl-4-cyclopropylspiro(5,6-benzo[b]thiophenedicarboxylmide-7,2-tricyclo[3.3.1.1]decane);

(PCDC-57) N-phenylethyl-6,7-dihydro-2-(4-(4-(4-hexylbenzoyloxy)phenyl)piperazin-1-yl)phenyl-4-cyclopropyl spiro(5,6-benzo[b]furodicarboxylmide-7,2-tricyclo[3.3.1.1]decane);

(PCDC-58) N-cyanomethyl-6,7-dihydro-4-(4-(4-(4-hexylbenzoyloxy)phenyl)piperazin-1-yl)phenyl-2-phenylspiro(5,6-benzo[b]thiophenedicarboxylmide-7,2-tricyclo[3.3.1.1]decane);

(PCDC-59) N-[17-(1,5-dimethyl-hexyl)-10,13-dimethyl-2,3,4,7,8,9,10,11,12,13,14,15,16,17-tetradecahydro-1H-cyclopenta[a]phenanthren-3-yloxycarbonyl-6,7-dihydro-2-(4-methoxyphenyl)phenyl-4-methylspiro(5,6-benzo[b]thiophenedicarboxylmide-7,2-tricyclo[3.3.1.1]decane);

(PCDC-60) N-cyanomethyl-2-(4-(6-(4-butylphenyl)carbonyloxy-(4,8-dioxabicyclo[3.3.0]oct-2-yl))oxycarbonyl)phenyl-6,7-dihydro-4-cyclopropylspiro(5,6-benzo[b]thiophenedicarboxylmide-7,2-tricyclo[3.3.1.1]decane);

(PCDC-61) 6,7-dihydro-N-methoxycarbonylmethyl-4-(4-(6-(4-butylphenyl)carbonyloxy-(4,8-dioxabicyclo[3.3.0]oct-2-yl))oxycarbonyl)phenyl-2-phenylspiro(5,6-benzo[b]thiophenedicarboxylmide-7,2-tricyclo[3.3.1.1]decane); and (PCDC-62) 3-phenyl-3-(4-pyrrolidinylphenyl)-13,13-dimethyl-6-methoxy-7-(4-(4-(4-(4-(6-(4-(4-(4-onylphenylcabonyloxy)phenyl)oxycarbonyl)phenoxy)hexyloxy)phenyl)piperazin-1-yl)indeno[2',3':3,4]naphtho[1,2-b]pyran.

With some further embodiments, the first and second photochromic-dichroic compounds of the photochromic-dichroic articles of the present invention, can each independently be chosen from the following:

(PCDC-a1) 3,3-Bis(4-methoxyphenyl)-10-[4-(4-(trans-4-pentylcyclohexyl)benzamido)phenyl]-13,13-dimethyl-12-bromo-3,13-dihydro-indeno[2',3':3,4]naphtho[1,2-b]pyran;

(PCDC-a2) 3,3-Bis(4-methoxyphenyl)-10-[4-((4-(trans-4-pentylcyclohexyl)phenoxy)carbonyl)phenyl]-6,13,13-trimethyl-3,13-dihydro-indeno[2',3':3,4]naphtho[1,2-b]pyran;

(PCDC-a3) 3-(4-Fluorophenyl)-3-(4-piperidinophenyl)-10-[4-(4-(4-(trans-4-pentylcyclohexyl)phenyl)benzamido)phenyl]-6-trifluoromethyl-11,13,13-trimethyl-3,13-dihydro-indeno[2',3':3,4]naphtho[1,2-b]pyran;

(PCDC-a4) 3,3-Bis(4-methoxyphenyl)-10-[4-(4-(trans-4-pentylcyclohexyl)benzamido)phenyl]-5,7-difluoro-13,13-dimethyl-3,13-dihydro-indeno[2',3':3,4]naphtho[1,2-b]pyran;

(PCDC-a5) 3-(4-Methoxyphenyl)-3-(4-piperidinophenyl)-10-[4-(4-(4-(trans-4-pentylcyclohexyl)phenyl)benzamido) phenyl]-5,7-difluoro-13,13-dimethyl-3,13-dihydro-indeno[2',3':3,4]naphtho[1,2-b]pyran;

(PCDC-a6) 3-(4-Methoxyphenyl)-3-(4-morpholinophenyl)-10-[4-(4-(4-(trans-4-pentylcyclohexyl)phenyl)benzamido)phenyl]-5,7-difluoro-13,13-dimethyl-3,13-dihydro-indeno[2',3':3,4]naphtho[1,2-b]pyran;

(PCDC-a7) 3-(4-Fluorophenyl)-3-(4-piperidinophenyl)-10-[4-((4-(trans-4-pentylcyclohexyl)phenoxy)carbonyl)phenyl]-12-bromo-5,7-difluoro-13,13-dimethyl-3,13-dihydro-indeno[2',3':3,4]naphtho[1,2-b]pyran;

(PCDC-a8) 3-Phenyl-3-(4-piperidinophenyl)-10-[4-(4-(4-(trans-4-pentylcyclohexyl)phenyl)benzamido)phenyl]-12-bromo-5,7-difluoro-13,13-dimethyl-3,13-dihydro-indeno[2',3':3,4]naphtho[1,2-b]pyran;

(PCDC-a9) 3-Phenyl-3-(4-piperidinophenyl)-10-[4-((4-(trans-4-pentylcyclohexyl)phenoxy)carbonyl)phenyl]-12-bromo-5,7-difluoro-13,13-dimethyl-3,13-dihydro-indeno[2',3':3,4]naphtho[1,2-b]pyran;

(PCDC-a10) 3-(4-Fluorophenyl)-3-(4-piperidinophenyl)-10-[4-(4-(4-(trans-4-pentylcyclohexyl)phenyl)benzamido)phenyl]-12-bromo-13,13-dimethyl-3,13-dihydro-indeno[2',3':3,4]naphtho[1,2-b]pyran;

(PCDC-a11) 3,3-Bis(4-methoxydinophenyl)-10-[4-(4-(4-(trans-4-pentylcyclohexyl)phenyl)benzamido)phenyl]-12-bromo-6,7-dimethoxy-11,13,13-trimethyl-3,13-dihydro-indeno[2',3':3,4]naphtho[1,2-b]pyran;

(PCDC-a12) 3,3-Bis(4-methoxyphenyl)-10-[4-(4-(4-(trans-4-pentylcyclohexyl)phenyl)benzamido) phenyl]-6-trifluoromethyl-12-bromo-13,13-dimethyl-3,13-dihydro-indeno[2',3':3,4]naphtho[1,2-b]pyran;

(PCDC-a13) 3,3-Bis(4-methoxyphenyl)-10,12-bis[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a14) 3,3-Bis(4-methoxyphenyl)-10-[4-(4-(4-(trans-4-pentylcyclohexyl)phenyl)benzamido)phenyl]-5,7-difluoro-13,13-dimethyl-3,13-dihydro-indeno[2',3':3,4]naphtho[1,2-b]pyran;

(PCDC-a15) 3,3-Bis(4-methoxyphenyl)-10-[4-(4-(4-(trans-4-pentylcyclohexyl)phenyl)benzamido) phenyl]-6-trifluoromethyl-13,13-dimethyl-3,13-dihydro-indeno[2',3':3,4]naphtho[1,2-b]pyran;

(PCDC-a16) 3,3-Bis(4-methoxyphenyl)-10-[4-(4-(4-(trans-4-pentylcyclohexyl)phenyl)benzamido)phenyl]-5,7-difluoro-12-bromo-13,13-dimethyl-3,13-dihydro-indeno[2',3':3,4]naphtho[1,2-b]pyran;

(PCDC-a17) 3-(4-Fluorophenyl)-3-(4-morpholinophenyl)-10-[4-(4-(4-(trans-4-pentylcyclohexyl)phenyl)benzamido)phenyl]-6-trifluoromethyl-13-methyl-13-butyl-3,13-dihydro-indeno[2',3':3,4]naphtho[1,2-b]pyran;

(PCDC-a18) 3-(4-Fluorophenyl)-3-(4-morpholinophenyl)-10-[4-(4-(4-(trans-4-pentylcyclohexyl)phenyl)benzamido)phenyl]-5,7-difluoro-12-bromo-13,13-dimethyl-3,13-dihydro-indeno[2',3':3,4]naphtho[1,2-b]pyran;

(PCDC-a19) 3-Phenyl-3-(4-methoxyphenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a20) 3-Phenyl-3-(4-morpholinophenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a21) 3,3-Bis(4-fluorophenyl)-10-[4-(4-(4-(trans-4-pentylcyclohexyl)phenyl)benzamido)phenyl]-6-trifluoromethyl-12-bromo-13,13-dimethyl-3,13-dihydro-indeno[2',3':3,4]naphtho[1,2-b]pyran;

(PCDC-a22) 3,3-Bis(4-fluorophenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a23) 3-(4-Methoxyphenyl)-3-(4-butoxyphenyl)-10-[4-(4-(4-(trans-4-pentylcyclohexyl)phenyl)benzamido)phenyl]-6-trifluoromethyl-13,13-dimethyl-3,13-dihydro-indeno[2',3':3,4]naphtho[1,2-b]pyran;

(PCDC-a24) 3-(4-Fluorophenyl)-13,13-dimethyl-3-(4-morpholinophenyl)-10-(4-(4'-(trans-4-pentylcyclohexyl)-[1,1'-biphenyl]-4-ylcarboxamido)phenyl)-6-(trifluoromethyl)-3,13-dihydro-indeno[2',3':3,4]naphtho[1,2-b]pyran;

(PCDC-a25) 3-(4-Butoxyphenyl)-3-(4-fluorophenyl)-13,13-dimethyl-10-(4-(4'-(trans-4-pentylcyclohexyl)-[1,1'-biphenyl]-4-ylcarboxamido)phenyl)-6-(trifluoromethyl)-3,13-dihydro-indeno[2',3':3,4]naphtho[1,2-b]pyran;

(PCDC-a26) 3-(4-(4-(4-Methoxyphenyl)piperazin-1-yl)phenyl)-13,13-dimethyl-10-(4-(4'-(trans-4-pentylcyclohexyl)-[1,1'-biphenyl]-4-ylcarboxamido)phenyl)-3-phenyl-6-(trifluoromethyl)-3,13-dihydro-indeno[2',3':3,4]naphtho[1,2-b]pyran;

(PCDC-a27) 3-(4-Butoxyphenyl)-3-(4-fluorophenyl)-13,13-dimethyl-10-(4-((((trans,trans-4'-pentyl-[1,1'-bi(cyclohexan)]-4-yl)oxy)carbonyl)phenyl)-6-(trifluoromethyl)-3,13-dihydro-indeno[2',3':3,4]naphtho[1,2-b]pyran;

(PCDC-a28) 3-(4-Fluorophenyl)-13-hydroxy-13-methyl-10-(4-(4'-(trans-4-pentylcyclohexyl)-[1,1'-biphenyl]-4-ylcarboxamido)phenyl)-3-(4-butoxyphenyl)-6-(trifluoromethyl)-3,13-dihydro indeno[2',3':3,4]naphtho[1,2-b]pyran;

(PCDC-a29) 3-(4-Methoxyphenyl)-13,13-dimethyl-10-(4-(4'-(trans-4-pentylcyclohexyl)-[1,1'-biphenyl]-4-ylcarboxamido)phenyl)-3-(4-(trifluoromethoxy)phenyl)-6-(trifluoromethyl)-3,13-dihydro-indeno[2',3':3,4]naphtho[1,2-b]pyran;

(PCDC-a30) 3,3-Bis(4-hydroxyphenyl)-10-[4-(4-(4-(trans-4-pentylcyclohexyl)phenyl)benzamido) phenyl]-6-trifluoromethyl-13,13-dimethyl-3,13-dihydro-indeno[2',3':3,4]naphtho[1,2-b]pyran;

(PCDC-a31) 3-(4-morpholinophenyl)-3-phenyl-13,13-dimethyl-10-(4-(4'-(trans-4-pentylcyclohexyl)-[1,1'-biphenyl]-4-ylcarboxamido)phenyl)-6-(trifluoromethyl)-3,13-dihydro-indeno[2',3':3,4]naphtho[1,2-b]pyran;

(PCDC-a32) 3-(4-morpholinophenyl)-3-(4-fluorophenyl)-13,13-dimethyl-10-(4-(4'-(trans-4-pentylcyclohexyl)-[1,1'-biphenyl]-4-ylcarboxamido)phenyl)-6-(trifluoromethyl)-3,13-dihydro-indeno[2',3':3,4]naphtho[1,2-b]pyran;

(PCDC-a40) 12-Bromo-3-(4-butoxyphenyl)-3-(4-fluorophenyl)-13,13-dimethyl-10-(4-(((4'-(trans-4-pentylcyclohexyl)-[1,1'-biphenyl]-4-carbonyl)oxy)benzamido)-6-(trifluoromethyl)-3,13-dihydro-indeno[2',3':3,4]naphtho[1,2-b]pyran;

(PCDC-a41) 3-(4-Butoxyphenyl)-5,7-dichloro-11-methoxy-3-(4-methoxyphenyl)-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

(PCDC-a42) 3-(4-Butoxyphenyl)-3-(4-fluorophenyl)-13,13-dimethyl-10-(4-((4'-(trans-4-pentylcyclohexyl)-[1,1'-biphenyl]-4-carbonyl)oxy)benzamido)-6-(trifluoromethyl)-3,13-dihydro-indeno[2',3':3,4]naphtho[1,2-b]pyran;

(PCDC-a43) 5,7-Dichloro-3,3-bis(4-hydroxyphenyl)-11-methoxy-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

(PCDC-a44) 6,8-Dichloro-3,3-bis(4-hydroxyphenyl)-11-methoxy-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

(PCDC-a45) 3-(4-Butoxyphenyl)-5,8-difluoro-3-(4-fluorophenyl)-13,13-dimethyl-10-(4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

(PCDC-a46) 3-(4-Butoxyphenyl)-3-(4-fluorophenyl)-13,13-dimethyl-10-(4-(4'-(trans-4-pentylcyclohexyl)-[1,1'-biphenyl]-4-carbonyl)piperazin-1-yl)-6-(trifluoromethyl)-3,13-dihydro-indeno[2',3':3,4]naphtho[1,2-b]pyran;

(PCDC-a47) 3-(4-Morpholinophenyl)-3-(4-methoxyphenyl)-10,7-bis[4-(4-(4-(trans-4-pentylcyclohexyl)phenyl)benzamido)phenyl]-5-fluoro-13,13-dimethyl-3,13-dihydro-indeno[2',3':3,4]naphtho[1,2-b]pyran;

(PCDC-a48) 3-(4-Morpholinophenyl)-3-(4-methoxyphenyl)-10-[4-(4-(4-(trans-4-pentylcyclohexyl)phenyl)benzamido)-2-(trifluoromethyl)phenyl]-13,13-dimethyl-3,13-dihydro-indeno[2',3':3,4]naphtho[1,2-b]pyran;

(PCDC-a49) 3,3-Bis(4-methoxyphenyl)-10-[4-(4-(4-(trans-4-pentylcyclohexyl)phenyl)benzamido)-2-(trifluoromethyl)phenyl]-13,13-dimethyl-3,13-dihydro-indeno[2',3':3,4]naphtho[1,2-b]pyran;

(PCDC-a50) 3-(4-Morpholinophenyl)-3-(4-methoxyphenyl)-10-[4-(4-(4-(trans-4-pentylcyclohexyl)phenyl)benzamido)-2-(trifluoromethyl)phenyl]-13,13-dimethyl-3,13-dihydro-indeno[2',3':3,4]naphtho[1,2-b]pyran;

(PCDC-a51) 3,3-Bis(4-methoxyphenyl)-13,13-dimethyl-10-(2-methyl-4-(trans-4-((trans-4-pentylcyclohexyl)biphenyl-4-yloxy)carbonyl)cyclohexanecarboxamido)phenyl)-3,13-dihydro-indeno[2',3':3,4]naphtho[1,2-b]pyran;

(PCDC-a52) 3-(4-(4-(4-Butylphenyl)piperazin-1-yl)phenyl)-3-(4-methoxyphenyl)-13,13-dimethyl-10-(4-(4'-(trans-4-pentylcyclohexyl)biphenyl-4-ylcarboxamido)-2-(trifluoromethyl)phenyl)-3,13-dihydro-indeno[2',3':3,4]naphtho[1,2-b]pyran;

(PCDC-a53) 3-(4-(4-(4-Butylphenyl)piperazin-1-yl)phenyl)-3-(4-methoxyphenyl)-13,13-dimethyl-10-(2-methyl-4-(4'-(trans-4-pentylcyclohexyl)biphenyl-4-ylcarboxamido)phenyl)-7-(4-(4-(trans-4-pentylcyclohexyl)benzamido)phenyl)-3,13-dihydro-indeno[2',3':3,4]naphtho[1,2-b]pyran;

(PCDC-a54) 3-(4-Methoxyphenyl)-13,13-dimethyl-7,10-bis(4-(4'-(trans-4-pentylcyclohexyl)biphenyl-4-ylcarboxamido)phenyl)-3-phenyl-3,13-dihydro-indeno[2',3':3,4]naphtho[1,2-b]pyran;

(PCDC-a55) 3-p-Tolyl-3-(4-methoxyphenyl)-6-methoxy-13,13-dimethyl-7-(4'-(trans,trans-4'-pentylbi(cyclohexane-4-)carbonyloxy)biphenylcarbonyloxy)-10-(4-(4'-

(trans-4-pentylcyclohexyl)biphenyl-4-ylcarboxamido)phenyl)-3,13-dihydro-indeno[2',3':3,4]naphtho[1,2-b]pyran;

(PCDC-a56) 10-(4-(((3S,8S,9S,10R,13R,14S,17R)-10,13-Dimethyl-17-((R)-6-methylheptan-2-yl)-2,3,4,7,8,9,10,11,12,13,14,15,16,17-tetradecahydro-1H-cyclopenta[a]phenanthren-3-yloxy)carbonyl)piperazin-1-yl)-3-(4-methoxyphenyl)-13,13-dimethyl-3-(4-morpholinophenyl)-3,13-dihydro-indeno[2',3':3,4]naphtho[1,2-b]pyran;

(PCDC-a57) 6-Methoxy-3-(4-methoxyphenyl)-13,13-dimethyl-3-(4-((S)-2-methylbutoxy)phenyl)-10-(4-(4'-(trans-4-pentylcyclohexyl)biphenyl-4-ylcarboxamido)phenyl)-3,13-dihydro-indeno[2',3':3,4]naphtho[1,2-b]pyran;

(PCDC-a58) 6-Methoxy-3-(4-methoxyphenyl)-13,13-dimethyl-3-(4-((S)-2-methylbutoxy)phenyl)-7-(4'-(trans,trans-4'-pentylbi(cyclohexane-4-)carbonyloxy)biphenylcarbonyloxy)-10-(4-(4'-(trans-4-pentylcyclohexyl)biphenyl-4-ylcarboxamido)phenyl)-3,13-dihydro-indeno[2',3':3,4]naphtho[1,2-b]pyran; and (PCDC-a59) 6-Methoxy-3-(4-methoxyphenyl)-13,13-dimethyl-3-(4-((S)-2-methylbutoxy)phenyl)-10-(4-(((3R,3aS,6S,6aS)-6-(4'-(trans-4-pentylcyclohexyl)biphenylcarbonyloxy)hexahydrofuro[3,2-b]furan-3-yloxy)carbonyl)phenyl)-3,13-dihydro-indeno[2',3':3,4]naphtho[1,2-b]pyran.

With some further embodiments, the photochromic-dichroic compounds of the photochromic-dichroic articles of the present invention, can be chosen from the following:

(PCDC-b1) 3-(4-fluorophenyl)-3-(4-(piperidin-1-yl)phenyl)-13-methoxy-13-ethyl-6-methoxy-7-(4'-((4-(trans-4-pentylcyclohexyl)benzoyl)oxy)-[1,1'-biphenyl]-4-carbonyloxy)-3,13-dihydro-indeno[2',3':3,4]naphtho[1,2-b]pyran;

(PCDC-b2) 3-(4-fluorophenyl)-3-(4-(piperidin-1-yl)phenyl)-13-methoxy-13-ethyl-6-methoxy-7-(4-(4'-(4-(trans-4-pentylcyclohexyl)-[1,1'-biphenyl]-4-carbonyloxy)benzoyloxy))-3,13-dihydro-indeno[2',3':3,4]naphtho[1,2-b]pyran;

(PCDC-b3) 3,3-bis(4-methoxyphenyl)-13-methoxy-13-ethyl-6-methoxy-7-(4'-((4-(trans-4-pentylcyclohexyl)benzoyl)oxy)-[1,1'-biphenyl]-4-carbonyloxy)-3,13-dihydro-indeno[2',3':3,4]naphtho[1,2-b]pyran;

(PCDC-b4) 3,3-bis(4-methoxyphenyl)-13-methoxy-13-ethyl-6-methoxy-7-(4-(4'-(4-(trans-4-pentylcyclohexyl)-[1,1'-biphenyl]-4-carbonyloxy)benzoyloxy))-3,13-dihydro-indeno[2',3':3,4]naphtho[1,2-b]pyran;

(PCDC-b5) 3-(4-fluorophenyl)-3-(4-(piperidin-1-yl)phenyl)-13-methoxy-13-ethyl-6-methoxy-7-(4'-(4-(trans-4-pentylcyclohexyl)-[1,1'-biphenyl]-4-carbonyloxy))-3,13-dihydro-indeno[2',3':3,4]naphtho[1,2-b]pyran;

(PCDC-b6) 3,3-bis(4-methoxyphenyl)-13-methoxy-13-ethyl-6-methoxy-7-((trans,trans)-4'-pentyl-[1,1'-bi(cyclohexane)]-4-carbonyloxy)-3,13-dihydro-indeno[2',3':3,4]naphtho[1,2-b]pyran;

(PCDC-b7) 3,3-bis(4-fluorophenyl)-13-methoxy-13-ethyl-6-methoxy-7-(4'-(4-(trans-4-pentylcyclohexyl)-[1,1'-biphenyl]-4-carbonyloxy)-[1,1'-biphenyl]-4-carbonyloxy)-3,13-dihydro-indeno[2',3':3,4]naphtho[1,2-b]pyran;

(PCDC-b8) 3-(4-methoxyphenyl)-3-(4-(piperidin-1-yl)phenyl)-13-methoxy-13-ethyl-6-methoxy-7-(4'-(4-(trans-4-pentylcyclohexyl)-[1,1'-biphenyl]-4-carbonyloxy)-[1,1'-biphenyl]-4-carbonyloxy)-3,13-dihydro-indeno[2',3':3,4]naphtho[1,2-b]pyran;

(PCDC-b9) 3-(4-methoxyphenyl)-3-(4-morpholinophenyl)-13-methoxy-13-ethyl-6-methoxy-7-(4'-(4'-(trans-4-pentylcyclohexyl)-[1,1'-biphenyl]-4-carbonyloxy)-[1,1'-biphenyl]-4-carbonyloxy)-3,13-dihydro-indeno[2',3':3,4]naphtho[1,2-b]pyran;

(PCDC-b10) 3-(4-(4-methoxyphenyl)piperazin-1-yl)-3-phenyl-13-methoxy-13-ethyl-6-methoxy-7-(4'-(4-(2-hydroxyethoxy)benzoyloxy)-[1,1'-biphenyl]-4-carbonyloxy)-[1,1'-biphenyl]-4-carbonyloxy)-3,13-dihydro-indeno[2',3':3,4]naphtho[1,2-b]pyran;

(PCDC-b11) 3,3-bis(4-methoxyphenyl)-13-methoxy-13-ethyl-6-methoxy-7-(3-phenylpropioloyloxy)-3,13-dihydro-indeno[2',3':3,4]naphtho[1,2-b]pyran;

(PCDC-b12) 3,3-bis(4-methoxyphenyl)-13-methoxy-13-ethyl-6-methoxy-7-(2-methyl-4-(4'-(trans-4-pentylcyclohexyl)-[1,1'-biphenyl]-4-ylcarboxamido)phenyl)-3,13-dihydro-indeno[2',3':3,4]naphtho[1,2-b]pyran;

(PCDC-b13) 3,3-bis(4-methoxyphenyl)-6,13-dimethoxy-7-(4-(4-(trans,trans-4'-pentyl-[1,1'-bi(cyclohexane)]-4-carbonyloxy)phenyl)piperazin-1-yl)-13-trifluoromethyl-3,13-dihydro-indeno[2',3':3,4]naphtho[1,2-b]pyran;

(PCDC-b14) 3,3-bis(4-methoxyphenyl)-6-methoxy-7-(4-(4-(trans,trans-4'-pentyl-[1,1'-bi(cyclohexane)]-4-carbonyloxy)phenyl)piperazin-1-yl)-13-hydroxy-13-trifluoromethyl-3,13-dihydro-indeno[2',3':3,4]naphtho[1,2-b]pyran;

(PCDC-b15) 3,3-bis(4-methoxyphenyl)-6,7-di(4-(4-(trans,trans-4'-pentyl-[1,1'-bi(cyclohexane)]-4-carbonyloxy)phenyl)piperazin-1-yl)-13-methoxy-13-trifluoromethyl-3,13-dihydro-indeno[2',3':3,4]naphtho[1,2-b]pyran;

(PCDC-b16) 3,3-bis(4-methoxyphenyl)-6-methoxy-7-(4-(4-((trans,trans)-4'-pentyl-[1,1'-bi(cyclohexane)]-4-carbonyloxy)phenyl)piperazin-1-yl)-13-fluoro-13-trifluoromethyl-3,13-dihydro-indeno[2',3':3,4]naphtho[1,2-b]pyran;

(PCDC-b17) 3-(4-fluorophenyl)-3-(4-(piperidin-1-yl)phenyl)-7-(2-methyl-4-(4'-(trans-4-pentylcyclohexyl)-[1,1'-biphenyl]-4-ylcarboxamido)phenyl)-11-trifluoromethyl-13,13-dimethyl-3,1,3-dihydro-indeno[2',3':3,4]naphtho[1,2-b]pyran;

(PCDC-b18) 3-(4-butoxyphenyl)-3-(4-methoxyphenyl)-7-(2-methyl-4-(4'-(trans-4-pentylcyclohexyl)-[1,1'-biphenyl]-4-ylcarboxamido)phenyl)-11-trifluoromethyl-13,13-dimethyl-3,13-dihydro-indeno[2',3':3,4]naphtho[1,2-b]pyran;

(PCDC-b19) 3-(4-(N-morpholinyl)phenyl)-3-phenyl-7-(4-(4'-(trans-4-pentylcyclohexyl)-[1,1'-biphenyl]-4-ylcarboxamido)phenyl)-10,12-difluoro-13,13-dimethyl-3,13-dihydro-indeno[2',3':3,4]naphtho[1,2-b]pyran;

(PCDC-b20) 3-(4-fluorophenyl)-3-(4-(piperidin-1-yl)phenyl)-7-(4-(4'-(trans-4-pentylcyclohexyl)-[1,1'-biphenyl]-4-ylcarboxamido)phenyl)-10,12-difluoro-13,13-dimethyl-3,13-dihydro-indeno[2',3':3,4]naphtho[1,2-b]pyran;

(PCDC-b21) 3,3-bis(4-methoxyphenyl)-6-methoxy-7-(2-methyl-4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b22) 3,3-bis(4-methoxyphenyl)-6-methoxy-7-(4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b23) 3,3-bis(4-methoxyphenyl)-6-methoxy-7-(2-methyl-4-(4-(4-(trans-4-pentylcyclohexyl)benzamido)phenyl)phenyl)-10,12-di(trifluoromethyl)-13,13-dimethyl-3,13-dihydro-indeno[2',3':3,4]naphtho[1,2-b]pyran;

(PCDC-b24) 3,3-bis(4-methoxyphenyl)-6-methoxy-7-(2-methyl-4-(4-(4-(trans-4-pentylcyclohexyl)benzamido)benzamido)phenyl)-10,12-di(trifluoromethyl)-13,13-dimethyl-3,13-dihydro-indeno[2',3':3,4]naphtho[1,2-b]pyran;

(PCDC-b25) 3-(4-methoxyphenyl)-3-phenyl-6-methoxy-7-(2-methyl-4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b26) 3-(4-methoxyphenyl)-3-phenyl-6-methoxy-7-(2-methyl-4-(4-(4-(trans-4-pentylcyclohexyl)benzamido)phenyl)phenyl)-10,12-di(trifluoromethyl)-13,13-dimethyl-3,13-dihydro-indeno[2',3':3,4]naphtho[1,2-b]pyran;

(PCDC-b27) 3-(4-methoxyphenyl)-3-phenyl-6-methoxy-7-(2-methyl-4-(4-((trans,trans)-4'-pentyl-[1,1'-bi(cyclohexane)]-4-carboxamido)benzamido)phenyl)-10,12-di(trifluoromethyl)-13,13-dimethyl-3,13-dihydro-indeno[2',3':3,4]naphtho[1,2-b]pyran;

(PCDC-b28) 3-(4-methoxyphenyl)-3-phenyl-6-methoxy-7-(2-methyl-4-(((4'-(trans-4-pentylcyclohexyl)-[1,1'-biphenyl]-4-yl)oxy)carbonyl)cyclohexanecarboxamido)phenyl)-10,12-di(trifluoromethyl)-13,13-dimethyl-3,13-dihydro-indeno[2',3':3,4]naphtho[1,2-b]pyran;

(PCDC-b29) 3-(4-N-morpholinylphenyl)-3-phenyl-6-methoxy-7-(2-methyl-4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b30) 3-(4-N-morpholinophenyl)-3-phenyl-6-methoxy-7-(2-methyl-4-(trans-4-(((4'-(trans-4-pentylcyclohexyl)-[1,1'-biphenyl]-4-yl)oxy)carbonyl)cyclohexanecarboxamido)phenyl)-10,12-di(trifluoromethyl)-13,13-dimethyl-3,13-dihydro-indeno[2',3':3,4]naphtho[1,2-b]pyran;

(PCDC-b31) 3-(4-N-morpholinophenyl)-3-phenyl-6-methoxy-7-(4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b32) 3-(4-N-morpholinophenyl)-3-(4-methoxyphenyl)-6-methoxy-7-(2-methyl-4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b33) 3-(4-N-morpholinophenyl)-3-(4-methoxyphenyl)-6-methoxy-7-(4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b34) 3-phenyl-3-(4-(piperidin-1-yl)phenyl)-6-methoxy-7-(4-(4-(trans-4-pentylcyclohexyl)benzamido)-2-(trifluoromethyl)phenyl)-10,12-di(trifluoromethyl)-13,13-dimethyl-3,13-dihydro-indeno[2',3':3,4]naphtho[1,2-b]pyran;

(PCDC-b35) 3,3-bis(4-fluorophenyl)-6-methoxy-7-(4-(4'-(trans-4-pentylcyclohexyl)-[1,1'-biphenyl]-4-ylcarboxamido)phenyl)-10,12-di(trifluoromethyl)-13,13-dimethyl-3,13-dihydro-indeno[2',3':3,4]naphtho[1,2-b]pyran;

(PCDC-b36) 3,3-bis(4-fluorophenyl)-6-methoxy-7-(trans-4-(4'-(trans-4-pentylcyclohexyl)-[1,1'-biphenyl]-4-yloxycarbonyl)cyclohexanecarbonyloxy)-10,12-di(trifluoromethyl)-13,13-dimethyl-3,13-dihydro-indeno[2',3':3,4]naphtho[1,2-b]pyran;

(PCDC-b37) 3-(4-(piperidin-1-yl)phenyl)-3-phenyl-6-methoxy-7-(trans-4-(4'-(trans-4-pentylcyclohexyl)-[1,1'-biphenyl]-4-yloxycarbonyl)cyclohexanecarbonyloxy)-10,12-di(trifluoromethyl)-13,13-dimethyl-3,13-dihydro-indeno[2',3':3,4]naphtho[1,2-b]pyran;

(PCDC-b38) 3-(4-(N-morpholino)phenyl)-3-phenyl-6-methoxy-7-(trans-4-(4'-(trans-4-pentylcyclohexyl)-[1,1'-biphenyl]-4-yloxycarbonyl)cyclohexanecarbonyloxy)-10,12-di(trifluoromethyl)-13,13-dimethyl-3,13-dihydro-indeno[2',3':3,4]naphtho[1,2-b]pyran;

(PCDC-b39) 3-(4-(N-morpholino)phenyl)-3-phenyl-6-methoxy-7-(4-(4-(((trans,trans)-4'-pentyl-[1,1'-bi(cyclohexane)]-4-carbonyloxy)phenyl)benzoyloxy)-10,12-di(trifluoromethyl)-13,13-dimethyl-3,13-dihydro-indeno[2',3':3,4]naphtho[1,2-b]pyran;

(PCDC-b40) 3,3-bis(4-methoxyphenyl)-6-methoxy-7-(4-(4-((trans,trans)-4'-pentyl-[1,1'-bi(cyclohexane)]-4-carbonyloxy)phenyl)benzoyloxy)-10,12-di(trifluoromethyl)-13,13-dimethyl-3,13-dihydro-indeno[2',3':3,4]naphtho[1,2-b]pyran;

(PCDC-b41) 3-(4-fluorophenyl)-3-(4-(piperidin-1-yl)phenyl)-6-methoxy-7-(4-(4-((trans,trans)-4'-pentyl-[1,1'-bi(cyclohexane)]-4-carbonyloxy)phenyl)benzoyloxy)-10,12-di(trifluoromethyl)-13,13-dimethyl-3,13-dihydro-indeno[2',3':3,4]naphtho[1,2-b]pyran;

(PCDC-b42) 3-(4-fluorophenyl)-3-(4-(piperidin-1-yl)phenyl)-6-methoxy-7-(trans-4-(4'-(trans-4-pentylcyclohexyl)-[1,1'-biphenyl]-4-yloxycarbonyl)cyclohexanecarbonyloxy)-10,12-di(trifluoromethyl)-13,13-dimethyl-3,13-dihydro-indeno[2',3':3,4]naphtho[1,2-b]pyran;

(PCDC-b43) 3,3-bis(4-methoxyphenyl)-6,13-dimethoxy-7-(trans-4-(4'-(trans-4-pentylcyclohexyl)-[1,1'-biphenyl]-4-yloxycarbonyl)cyclohexanecarbonyloxy)-13-ethyl-3,13-dihydro-indeno[2',3':3,4]naphtho[1,2-b]pyran;

(PCDC-b44) 3,3-bis(4-methoxyphenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b45) 3,3-bis(4-hydroxyphenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b46) 3,3-bis(4-fluorophenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b47) 3-(4-methoxyphenyl)-3-(4-N-morpholinophenyl)-6-methoxy-7-(4-(4-(trans,trans-4'-pentyl-[1,1'-bi(cyclohexane)]-4-carbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b48) 3,3-bis(4-methoxyphenyl)-6-methoxy-7-(4-(4-(trans-4-(4'-(trans-4-pentylcyclohexyl)-[1,1'-biphenyl]-4-yloxycarbonyl)cyclohexanecarbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b49) 3,3-bis(4-methoxyphenyl)-6-methoxy-7-(4-(4-(trans-4-(4-(trans-4-pentylcyclohexyl)-phenyloxycarbonyl)-cyclohexanecarbonyloxy)phenyl)piperazin-1-yl)-10,12-di(trifluoromethyl)-13,13-dimethyl-3,13-dihydro-indeno[2',3':3,4]naphtho[1,2-b]pyran;

(PCDC-b50) 3,3-bis(4-methoxyphenyl)-7-(4-(4-(trans-4-pentylcyclohexyl)phenoxycarbonyl)phenyl)-11-methyl-13,13-dimethyl-3,13-dihydro-indeno[2',3':3,4]naphtho[1,2-b]pyran;

(PCDC-b51) 3-(4-fluorophenyl)-3-(4-(piperidin-1-yl)phenyl)-6-methyl-7-(4-(4'-(trans-4-pentylcyclohexyl)-[1,1'-biphenyl]-4-ylcarboxamido)phenyl)-11-trifluoromethyl-13,13-dimethyl-3,13-dihydro-indeno[2',3':3,4]naphtho[1,2-b]pyran;

(PCDC-b52) 3,3-bis(4-hydroxyphenyl)-6-methyl-7-(4-(4'-(trans-4-pentylcyclohexyl)-[1,1'-biphenyl]-4-ylcarboxamido)phenyl)-11-trifluoromethyl-13,13-dimethyl-3,13-dihydro-indeno[2',3':3,4]naphtho[1,2-b]pyran;

(PCDC-b53) 3,3-bis(4-methoxyphenyl)-6-methoxy-7-(4-(4-(trans,trans-4'-pentyl-[1,1'-bi(cyclohexane)]-4-carbonyloxy)phenyl)piperazin-1-yl)-11-trifluoromethyl-13,13-dimethyl-3,13-dihydro-indeno[2',3':3,4]naphtho[1,2-b]pyran;

(PCDC-b54) 3-(4-(4-methoxyphenyl)piperazin-1-yl)-3-phenyl-6-methoxy-7-(4-((4-(trans-4-propylcyclohexyl)phenoxy)carbonyl)phenyloxycarbonyl)-13,13-dimethyl-3,13-dihydro-indeno[2',3':3,4]naphtho[1,2-b]pyran; and (PCDC-b55) 3,3-bis(4-methoxyphenyl)-7-(4-([1,1':4',1"-terphenyl]-4-ylcarbamoyl)piperazin-1-yl)-6,13-dimethoxy-13-trifluoromethyl-3,13-dihydro-indeno[2',3':3,4]naphtho[1,2-b]pyran.

More generally, the photochromic-dichroic compounds of the photochromic-dichroic articles of the present invention include: (a) at least one photochromic group (PC), which can be chosen from, for example, pyrans, oxazines, and fulgides; and (b) at least one lengthening agent or group attached to the photochromic group. Such photochromic-dichroic compounds are described in detail in U.S. Pat. No. 7,342,112 B1 at column 5, line 35 to column 14, line 54; and Table 1, the cited portions of which are incorporated by reference herein. Other suitable photochromic compounds and reaction schemes for their preparation can be found in U.S. Pat. No. 7,342,112 B1 at column 23, line 37 to column 78, line 13, the cited portions of which are incorporated by reference herein.

Non-limiting examples of thermally reversible photochromic pyrans from which the photochromic (PC) group, of the first and/or second photochromic-dichroic compound, can be chosen include benzopyrans, naphthopyrans, e.g., naphtho[1,2-b]pyrans, naphtho[2,1-b]pyrans, indeno-fused naphthopyrans, such as those disclosed in U.S. Pat. No. 5,645,767, and heterocyclic-fused naphthopyrans, such as those disclosed in U.S. Pat. Nos. 5,723,072, 5,698,141, 6,153,126, and 6,022,497, which are hereby incorporated by reference; spirofluoreno[1,2-b]pyrans, such as spiro-9-fluoreno[1,2-b]pyrans; phenanthropyrans; quinopyrans; fluoroanthenopyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans. More specific examples of naphthopyrans and the complementary organic photochromic substances are described in U.S. Pat. No. 5,658,501, which are hereby specifically incorporated by reference herein. Spiro(indoline)pyrans are also described in the text, *Techniques in Chemistry*, Volume III, "Photochromism", Chapter 3, Glenn H. Brown, Editor, John Wiley and Sons, Inc., New York, 1971, which is hereby incorporated by reference.

Non-limiting examples of photochromic oxazines from which the PC group can be chosen include benzoxazines, naphthoxazines, and spiro-oxazines, e.g., spiro(indoline)naphthoxazines, spiro(indoline)pyridobenzoxazines, spiro(benzindoline)pyridobenzoxazines, spiro(benzindoline)naphthoxazines, spiro(indoline)benzoxazines, spiro(indoline)fluoranthenoxazine, and spiro(indoline)quinoxazine. Non-limiting examples of photochromic fulgides from which PC can be chosen include: fulgimides, and the 3-furyl and 3-thienyl fulgides and fulgimides, which are disclosed in U.S. Pat. No. 4,931,220 (which are hereby specifically incorporated by reference) and mixtures of any of the aforementioned photochromic materials/compounds.

In accordance with some embodiments, the first and second photochromic-dichroic compound can each independently include at least two photochromic compounds (PCs), in which case the PCs can be linked to one another via linking group substituents on the individual PCs. For example, the PCs can be polymerizable photochromic groups or photochromic groups that are adapted to be compatible with a host material ("compatibilized photochromic group"). Non-limiting examples of polymerizable photochromic groups from which PC can be chosen and that are useful in conjunction with various non-limiting embodiments disclosed herein are disclosed in U.S. Pat. No. 6,113,814, which is hereby specifically incorporated by reference herein. Non-limiting examples of compatiblized photochromic groups from which PC can be chosen and that are useful in conjunction with various non-limiting embodiments disclosed herein are disclosed in U.S. Pat. No. 6,555,028, which is hereby specifically incorporated by reference herein.

Other suitable photochromic groups and complementary photochromic groups are described in U.S. Pat. Nos. 6,080,338 at column 2, line 21 to column 14, line 43; 6,136,968 at column 2, line 43 to column 20, line 67; 6,296,785 at column 2, line 47 to column 31, line 5; 6,348,604 at column 3, line 26 to column 17, line 15; 6,353,102 at column 1, line 62 to column 11, line 64; and 6,630,597 at column 2, line 16 to column 16, line 23; the disclosures of the aforementioned patents are incorporated herein by reference.

With some embodiments of the present invention, the first photochromic-dichroic compound includes at least one first photochromic moiety (or first PC moiety/group) and the second photochromic-dichroic compound includes at least one second photochromic moiety (or second PC moiety/group), and each first photochromic moiety and each second photochromic moiety are in each case independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

The first and second photochromic-dichroic compounds can be present in the respective first or second photochromic-dichroic layer in amounts (or ratios) such that the photochromic-dichroic article exhibits desired optical properties, such as a desired level of photochromic activity and a desired level of dichroic activity. The particular amounts of the first and second photochromic-dichroic compounds that are present in the respective first and second photochromic-dichroic layers is not critical, with some embodiments, provided that at least a sufficient amount in each case is present so as to produce the desired effect. For purposes of non-limiting illustration, the amounts of first and second photochromic-dichroic compounds that are present in the respective first and second photochromic-dichroic layer can depend on a variety of factors, such as but not limited to, the absorption characteristics of the particular photochromic-dichroic compound, the color and intensity particular photochromic-dichroic compound upon photochromic activation, the level of dichroic activity of the particular photochromic-dichroic compound upon dichroic activation, and the method used to incorporate the particular photochromic-dichroic compound into the particular photochromic-dichroic layer.

The first photochromic-dichroic layer of the photochromic-dichroic articles of the present invention can, with some embodiments, include one or more first photochromic-dichroic compounds, in an amount of from 0.01 to 40 weight percent, or from 0.05 to 15, or from 0.1 to 5 weight percent, based on the weight of the first photochromic-dichroic layer. The second photochromic-dichroic layer of the photochromic-dichroic articles of the present invention can, with some embodiments, include one or more second photochromic-dichroic compounds, in an amount of from 0.01 to 40 weight percent, or from 0.05 to 15, or from 0.1 to 5 weight percent, based on the weight of the second photochromic-dichroic layer.

The first and second photochromic-dichroic compounds of the photochromic-dichroic articles of the present invention can be prepared in accordance with art-recognized methods. With some embodiments, the first and second photochromic-dichroic compounds can each independently prepared in accordance with the description provided at column 35, line 28 through column 66, line 60 of U.S. Pat. No. 7,256,921, which disclosure is incorporated herein by reference.

The first photochromic-dichroic layer, with some embodiments, can include a single layer or multiple layers each including a first photochromic-dichroic compound that can be the same or different. The second photochromic-dichroic layer, with some embodiments, can include a single layer or multiple layers each including a second photochromic-dichroic compound that can be the same or different. The first and second photochromic-dichroic layers can each independently be formed by art-recognized methods including, but not limited to: lamination, such as of one or more plastic sheets or films; in-mold formation, such as in-mold coating; film casting; and coating methods. With some embodiments the first and second photochromic-dichroic layers are each independently formed from a respective first or second photochromic-dichroic coating composition. The first and second photochromic-dichroic coating composition can each independently be a curable photochromic-dichroic coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The first and second photochromic-dichroic layers each typically and independently include an organic matrix, such as a thermoplastic organic matrix and/or a crosslinked organic matrix. At least a portion of the organic matrix of the first and/or second photochromic-dichroic layers can in some embodiments independently include anisotropic materials, such as liquid crystal materials, additives, oligomers, and/or polymers, as will be discussed in further detail herein. Additionally or alternatively to an organic matrix, the first and second photochromic-dichroic layers can each independently include an inorganic matrix, including, for example, silane linkages, siloxane linkages and/or titanate linkages. The organic matrix of the first and second photochromic-dichroic layers can in each case independently include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The first and second photochromic-dichroic layers can each independently have any suitable thickness. With some embodiments, the first and second photochromic-dichroic layers each independently have a thickness of from 0.5 to 50 microns, such as from 1 to 45 microns, or from 2 to 40 microns, or from 5 to 30 microns, or from 10 to 25 microns.

With some embodiments, the first and second photochromic-dichroic layers, of the photochromic-dichroic article, each independently further include a phase-separated polymer that includes: a matrix phase that is at least partially ordered; and a guest phase that is at least partially ordered. The guest phase of the first photochromic-dichroic layer includes the first photochromic-dichroic compound, and the first photochromic-dichroic compound is at least partially aligned with at least a portion of the guest phase of said first photochromic-dichroic layer. The guest phase of the second photochromic-dichroic layer includes the second photochromic-dichroic compound, and the second photochromic-dichroic compound is at least partially aligned with at least a portion of the guest phase of the second photochromic-dichroic layer.

In accordance with further embodiments of the present invention, the first photochromic-dichroic layer and the second photochromic-dichroic layer each independently further include an interpenetrating polymer network that includes: an anisotropic material that is at least partially ordered, and a polymeric material. The anisotropic material of the first photochromic-dichroic layer includes the first photochromic-dichroic compound, and the first photochromic-dichroic compound is at least partially aligned with at least a portion of the anisotropic material of the first photochromic-dichroic layer. The anisotropic material of the second photochromic-dichroic layer includes the second photochromic-dichroic compound, and the second photochromic-dichroic compound is at least partially aligned with at least a portion of the anisotropic material of the second photochromic-dichroic layer.

With some embodiments of the present invention, the first photochromic-dichroic layer and the second photochromic-dichroic layer each independently further include an anisotropic material. As used herein the term "anisotropic" means having at least one property that differs in value when measured in at least one different direction. Accordingly, "anisotropic materials" are materials that have at least one property that differs in value when measured in at least one different direction. Non-limiting examples of anisotropic materials that can be included in the first and/or second photochromic-dichroic layers include, but are not limited to, those liquid crystal materials as described further herein with regard to the optional first and second alignment layers of the photochromic-dichroic articles of the present invention.

With some embodiments, the anisotropic material of the first photochromic-dichroic layer, and the anisotropic material of the second photochromic-dichroic layer, each independently includes a liquid crystal material. Classes of liquid crystal materials include, but are not limited to, liquid crystal oligomers, liquid crystal polymers, mesogenic compounds, and combinations thereof.

With some embodiments, the first and second photochromic-dichroic layers each independently include: (i) liquid crystal oligomers and/or polymers prepared at least in part from the monomeric mesogenic compounds; and/or (ii) the mesogenic compounds, in each case as disclosed in Table 1 of U.S. Pat. No. 7,910,019 B2 at columns 43-90 thereof, which disclosure is incorporated herein by reference.

In accordance with some embodiments of the present invention, the first and second photochromic-dichroic compounds, of the respective first or second photochromic-dichroic layers, can each independently be at least partially aligned by interaction with the anisotropic material of that particular layer, which itself is at least partially ordered. For purposes of non-limiting illustration, at least a portion of the first photochromic-dichroic compound can be aligned such that the long-axis of the first photochromic-dichroic compound in the dichroic state is essentially parallel to the general direction of the anisotropic material of the first photochromic-dichroic layer. Further, although not required, the first and second photochromic-dichroic compounds can each independently be bound to or reacted with at least a portion of the at least partially ordered anisotropic material of the respective first or second photochromic-dichroic layers.

Methods of ordering, or introducing order into, the anisotropic material of the first and/or second photochromic-dichroic layers include, but are not limited to, exposing the anisotropic material to at least one of a magnetic field, an electric field, linearly polarized ultraviolet radiation, linearly polarized infrared radiation, linearly polarized visible radiation, and a shear force. Alternatively or additionally, the anisotropic material can be at least partially ordered by aligning at least a portion of the anisotropic material with another material or structure. For example, the anisotropic material can be at least partially ordered by aligning the anisotropic material with an alignment layer (or an orientation facility) such as, but not limited to, the first and second alignment layers as described in further detail herein below.

By ordering at least a portion of the anisotropic material, it is possible to at least partially align at least a portion of the first and/or second photochromic-dichroic compound that is contained within or otherwise connected to the anisotropic material of the respective first and/or second photochromic-dichroic layer. Although not required, the first and second photochromic-dichroic compounds can each independently be at least partially aligned while in an activated state. With some embodiments, ordering of the anisotropic material and/or aligning the first and/or second photochromic-dichroic compound can each independently occur prior to, during, or after application or formation of the respective first and/or second photochromic-dichroic layers.

The first and second photochromic-dichroic compounds and the related anisotropic material can each independently be aligned and ordered during application or formation of the respective first and/or second photochromic-dichroic layer. For purposes of non-limiting illustration and with reference to the first photochromic-dichroic layer, the first photochromic-dichroic layer can be applied using a coating technique that introduces a shear force to the anisotropic material during application, such that the anisotropic material becomes at least partially ordered generally parallel to the direction of the applied shear force. For purposes of further non-limiting illustration, a solution or mixture (optionally in a solvent or carrier) including, for example, the first photochromic-dichroic compound and the anisotropic material can be coated over the substrate, such that shear forces are introduced to the materials being applied due to relative movement of the surface of the substrate with respect to the materials being applied. An example of a coating process that can introduce at least sufficient shear forces is a curtain coating process. The shear forces can cause at least a portion of the anisotropic material to be ordered in a general direction that is substantially parallel to the direction of the movement of the surface. As discussed above, by ordering at least a portion of the anisotropic material in this manner, at least a portion of the first and/or second photochromic-dichroic compound can be aligned. In addition, and optionally, by exposing at least a portion of the first and/or second photochromic-dichroic compound to actinic radiation during the curtain coating process, so as to convert the first and/or second photochromic-dichroic compound to an activated state, at least partial alignment of the first and/or second photochromic-dichroic compound while in the activated state can also be achieved.

The first and/or second photochromic-dichroic compound and the anisotropic material can be aligned and ordered after application of the respective first and/or second photochromic-dichroic layer. For purposes of non-limiting illustration and with reference to the first photochromic-dichroic layer, a solution or mixture of the first photochromic-dichroic compound and the anisotropic material (optionally in a solvent or carrier) can be spin-coated over at least a portion of the substrate. Thereafter, at least a portion of the anisotropic material can be ordered, for example, by exposing the anisotropic material to a magnetic field, an electric field, linearly polarized ultraviolet radiation, linearly polarized infrared radiation, linearly polarized visible radiation, and/or a shear force. Alternatively or additionally, the anisotropic material can be at least partially ordered by alignment thereof with another material or structure, such as an alignment layer.

The first and second photochromic-dichroic compounds and the related anisotropic material can each independently be aligned and ordered prior to application of the respective first or second photochromic-dichroic layer. For purposes of non-limiting illustration and with reference to the first photochromic-dichroic layer, a solution or mixture (optionally in a solvent or carrier) of the first photochromic-dichroic compound and the anisotropic material can be applied over an ordered polymeric sheet to form a layer thereover. Thereafter, at least a portion of the anisotropic material can be allowed to align with the underlying ordered polymeric sheet. The polymeric sheet can be subsequently applied over the substrate of the photochromic-dichroic article by, for example, art-recognized laminating or bonding methods. Alternatively, the ordered first and second photochromic-dichroic layer can each independently be transferred from the respective polymeric sheet to/over an underlying structure (such as, the substrate or the first photochromic-dichroic layer) by art-recognized method, such as hot stamping.

With some embodiments, the first photochromic-dichroic layer and the second photochromic-dichroic layer can each independently include a phase-separated polymer that includes: a matrix phase; and a guest phase distributed in the matrix phase. Each matrix phase can independently include an at least partially ordered liquid crystal polymer. Each guest phase can independently include the at least partially ordered anisotropic material and at least a portion of the first or second photochromic-dichroic compound as the case may be, which can be at least partially aligned. The at least partially aligned first and second photochromic-dichroic compounds can each independently be at least partially aligned by interaction with the respective at least partially ordered anisotropic material.

For purposes of non-limiting illustration and with reference to the first photochromic-dichroic layer, with some embodiments, a phase-separating polymer system including, a matrix phase forming material that includes a liquid crystal material, and a guest phase forming material that includes the anisotropic material and the first photochromic-dichroic compound, is applied over the substrate. After applying the phase-separating polymer system, at least portion of the liquid crystal material of the matrix phase and at least a portion of the anisotropic material of the guest phase are at least partially ordered, such that at least a portion of the first photochromic-dichroic compound is aligned with at least a portion of the at least partially ordered anisotropic material of the guest phase. Methods of ordering the matrix phase forming material and the guest phase forming material of the phase-separating polymer system include, but are not limited to, exposing the applied layer to at least one of: a magnetic field, an electric field, linearly polarized infrared radiation, linearly polarized ultraviolet radiation, linearly polarized visible radiation, and a shear force. Alternatively or additionally, ordering the matrix phase forming material and the guest phase forming material can include alignment thereof by interaction with an underlying alignment layer, as described in further detail herein. The above non-limiting illustration is also applicable to the second photochromic-dichroic layer.

After ordering the matrix phase forming material and the guest phase forming material, the guest phase forming material can be separated from the matrix phase forming material by polymerization induced phase separation and/or solvent induced phase separation. Although the separation of the matrix and guest phase forming materials is described herein in relation to the guest phase forming material separating from the matrix phase forming material, it should be appreciated that this language is intended to cover any separation between the two phase forming materials. That is, this language is intended to cover separation of the guest phase forming material from the matrix phase forming material, and separation of the matrix phase forming material from the guest phase forming material, as well as, simultaneous separation of both phase forming materials, and any combination thereof.

According to some embodiments, each matrix phase forming material can independently include a liquid crystal material chosen form liquid crystal monomers, liquid crystal prepolymers, and liquid crystal polymers. Each guest phase forming material can, with some embodiments, independently include a liquid crystal material chosen from liquid crystal mesogens, liquid crystal monomers, and liquid crystal polymers and pre-polymers. Examples of such materials include, but are not limited to, those described above, and further herein with regard to the optional first and second alignment layers.

With some embodiments, each phase-separating polymer system can independently include, a mixture of a matrix phase forming material that includes a liquid crystal monomer, a guest phase forming material that includes liquid crystal mesogens and the first or second photochromic-dichroic compound as the case may be. With such non-limiting embodiments, causing the guest phase forming material to separate from the matrix phase forming material can include polymerization induced phase-separation. Typically, the liquid crystal monomer of the matrix phase can be polymerized and thereby separated from at least a portion of the liquid crystal mesogens of the guest phase forming material. Examples of polymerization methods include, but are not limited to, photo-induced polymerization and thermally-induced polymerization.

With some further embodiments, each phase-separating polymer system can independently include, a mixture of a matrix phase forming material that includes a liquid crystal monomer, a guest phase forming material that includes a low viscosity liquid crystal monomer having a different functionality from the liquid crystal monomer of the matrix phase, and the first or second photochromic-dichroic compound as the case may be. As used herein, the term "low viscosity liquid crystal monomer," refers to a liquid crystal monomer mixture or solution that is freely flowing at room temperature. Typically, causing the guest phase forming material to separate from the matrix phase forming material includes polymerization induced phase-separation. For example, at least a portion of the liquid crystal monomer of the matrix phase can be polymerized under conditions that do not cause the liquid crystal monomer of the guest phase to polymerize. During polymerization of the matrix phase forming material, the guest phase forming material typically separates from the matrix phase forming material. Thereafter, the liquid crystal monomer of the guest phase forming material can be polymerized in a separate polymerization process.

Each phase-separating polymer system can independently include, with some embodiments, a solution in at least one common solvent of a matrix phase forming material that includes a liquid crystal polymer, a guest phase forming material that includes a liquid crystal polymer that is different from the liquid crystal polymer of the matrix phase forming material, and the first or second photochromic-dichroic compound as the case may be. Causing the guest phase forming material to separate from the matrix phase forming material typically includes solvent induced phase-separation. Typically, at least a portion of the common solvent is evaporated from the mixture of liquid crystal polymers, thereby causing the two phases to separate from each other.

With further embodiments, the first and second photochromic-dichroic layers can each independently include an interpenetrating polymer network. The at least partially ordered anisotropic material and a polymeric material can form an interpenetrating polymer network, in which at least a portion of the polymeric material interpenetrates with at least a portion of the at least partially ordered anisotropic material. As used herein the term "interpenetrating polymer network" means an entangled combination of polymers, at least one of which is cross-linked, that are not bonded to each other. Thus, as used herein, the term interpenetrating polymer network includes semi-interpenetrating polymer networks. For example, see L. H. Sperling, *Introduction to Physical Polymer Science*, John Wiley & Sons, New York (1986) at page 46. In addition, at least a portion of the at least one at least partially aligned first or second photochromic-dichroic compound can be at least partially aligned with the respective at least partially ordered anisotropic material. Still further, the polymeric material can be isotropic or anisotropic, provided that, on the whole, the first or second photochromic-dichroic layer, as the case may be, is anisotropic. Methods of forming such first and second photochromic-dichroic layers are described in more detail herein below.

According to some embodiments, each anisotropic material can independently be adapted to allow the respective first or second photochromic-dichroic compound to switch from a first state to a second state at a desired rate. In general, conventional photochromic compounds can undergo a transformation from one isomeric form to another in response to actinic radiation, with each isomeric form having a characteristic absorption spectrum. The first and second photochromic-dichroic compounds of the photochromic-dichroic articles of the present invention can each independently undergo a similar isomeric transformation. Without intending to be bound by any theory, the rate or speed at which this isomeric transformation (and the reverse transformation) occurs depends, in part, upon the properties of the local environment surrounding the particular photochromic-dichroic compound (which can be referred to as the "host"). Although not limiting herein, it is believed based on the evidence at hand that the rate of transformation of the first and/or second photochromic-dichroic compound depends, in part, upon the flexibility of the chain segments of the respective host, and more particularly on the mobility or viscosity of the chain segments of the respective host. Correspondingly it is believed, without intending to be bound by any theory, that the rate of transformation of the first and/or second photochromic-dichroic compound is generally faster in hosts having flexible chain segments, than in hosts having stiff or rigid chain segments. As such, and in accordance with some embodiments, when the anisotropic material is a host, the anisotropic material can be adapted to allow the first and/or second photochromic-dichroic compound to transform between various isomeric states at desired rates. For example, the anisotropic material can be adapted by adjusting the molecular weight and/or the crosslink density of the anisotropic material.

With some embodiments, the first and second photochromic-dichroic layers each independently include a phase-separated polymer that includes a matrix phase including a liquid crystal polymer, and guest phase distributed within the matrix phase. The guest phase can include the anisotropic material. Typically, a majority of the first or second photochromic-dichroic compound can be contained within the respective guest phase of the respective phase-separated polymer. As previously discussed, because the transformation rate of a photochromic-dichroic compound depends, in part, on the host in which it is contained or resides, the rate of transformation of the first and/or second photochromic-dichroic compounds depends, substantially, on the properties of the respective guest phase, with some embodiments.

With some embodiments, and as discussed in further detail herein, the photochromic-dichroic articles of the present invention can include a first alignment layer and/or a second alignment layer (also referred to as an alignment or orientation facility). With some further embodiments, the photochromic-dichroic article can include: a first alignment layer interposed between the substrate and the first photochromic-dichroic layer, in which the first alignment layer and the first photochromic-dichroic layer at least partially abut (or contact) each other; and/or a second alignment layer interposed between the second photochromic-dichroic layer and the first photochromic-dichroic layer, in which the second alignment layer and second photochromic-dichroic layer at least partially abut (or contact) each other. The first and second alignment layers can also be referred to herein as first and second orientation facilities. The first photochromic-dichroic compound of the first photochromic-dichroic layer can be at least partially aligned by interaction with the underlying first alignment layer. The second photochromic-dichroic compound of the second photochromic-dichroic layer can be at least partially aligned by interaction with the underlying second alignment layer.

Figure 3:
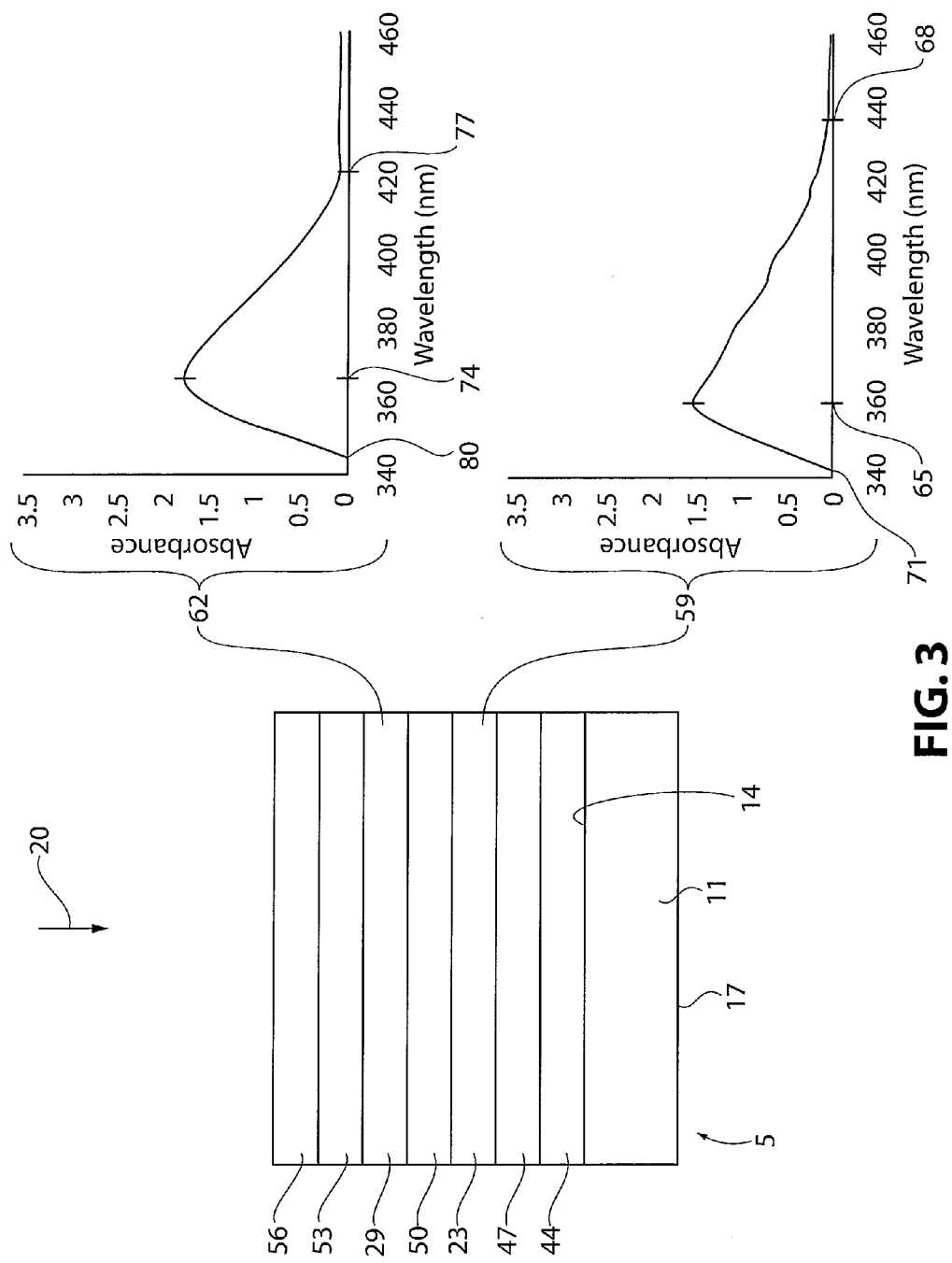
FIG. 3 is a representative side elevation sectional view of a photochromic-dichroic article according to some embodiments of the present invention, which includes representative graphical representations of plots of absorbance vs. wavelength for the first photochromic-dichroic compound of the first photochromic-dichroic layer, and the second photochromic-dichroic compound of the second photochromic-dichroic layer.

With reference to FIG. 3, photochromic-dichroic article 5 includes a first alignment layer 47 that is interposed between substrate 11 and the first photochromic-dichroic layer 23. The first alignment layer 47 and the overlying first photochromic-dichroic layer 23 at least partially abut each other. With further reference to FIG. 3, photochromic-dichroic article 5 also includes a second alignment layer 50 that is interposed between the second photochromic-dichroic layer 29 and the first photochromic-dichroic layer 23. The second alignment layer 50 and overlying second photochromic-dichroic layer 29 at least partially abut each other. As depicted in FIG. 3, the first photochromic-dichroic layer 23 and the second alignment layer 50 abut each other. With some embodiments, one or more additional layers (not shown) can be interposed between first photochromic-dichroic layer 23 and second alignment layer 50.

Photochromic-dichroic article 5 of FIG. 3 also includes a primer layer 44 that is interposed between substrate 11 and first alignment layer 47. Photochromic-dichroic article 5 of FIG. 3 also includes a topcoat layer 53 that resides over second photochromic-dichroic layer 29. With some embodiments, one or more further layers (not shown) can be interposed between topcoat layer 53 and second photochromic-dichroic layer 29.

As used herein the term "alignment layer" means a layer that can facilitate the positioning of one or more other structures that are exposed, directly and/or indirectly, to at least a portion thereof. As used herein the term "order" means bring into a suitable arrangement or position, such as aligning with another structure or material, or by some other force or effect. Thus, as used herein the term "order" encompasses both contact methods of ordering a material, such as by aligning with another structure or material, and non-contact methods of ordering a material, such as by exposure to an external force or effect. The term order also encompasses combinations of contact and non-contact methods.

For example, a photochromic-dichroic compound that is at least partially aligned by interaction with an alignment layer can be at least partially aligned such that the long-axis of the photochromic-dichroic compound in the activated state is essentially parallel to at least the first general direction of the alignment layer. With some embodiments, a photochromic-dichroic compound that is at least partially aligned by interaction with an alignment layer is bound to or reacted with the alignment layer. As used herein with reference to order or alignment of a material or structure, the term "general direction" refers to the predominant arrangement or orientation of the material, compound or structure. Further, it will be appreciated by those skilled in the art that a material, compound or structure can have a general direction even though there is some variation within the arrangement of the material, compound or structure, provided that the material, compound or structure has at least one predominate arrangement.

Each alignment layer can, with some embodiments, independently have at least a first general direction. For example, an alignment layer can include a first ordered region having a first general direction and at least one second ordered region adjacent the first ordered region having a second general direction that is different from the first general direction. Further, an alignment layer can have a plurality of regions, each of which has a general direction that is the same or different from the remaining regions so as to form a desired pattern or design. An alignment layer can include, for example, a coating including an at least partially ordered alignment medium, an at least partially ordered polymer sheet, an at least partially treated surface, Langmuir-Blodgett films, and combinations thereof.

An alignment layer can include, with some embodiments, a coating that includes an at least partially ordered alignment medium. Examples of suitable alignment media that can be used in conjunction with the first and second alignment layers include, but are not limited to, photo-orientation materials, rubbed-orientation materials, and liquid crystal materials. Methods of ordering at least a portion of the alignment medium are described herein below in further detail.

The alignment medium of an alignment layer can be a liquid crystal material, and the alignment layer can be referred to as a liquid crystal alignment layer. Liquid crystal materials, because of their structure, are generally capable of being ordered or aligned so as to take on a general direction. More specifically, because liquid crystal molecules have rod- or disc-like structures, a rigid long axis, and strong dipoles, liquid crystal molecules can be ordered or aligned by interaction with an external force or another structure such that the long axis of the molecules takes on an orientation that is generally parallel to a common axis. For example, it is possible to align the molecules of a liquid crystal material with a magnetic field, an electric field, linearly polarized infrared radiation, linearly polarized ultraviolet radiation, linearly polarized visible radiation, or shear forces. It is also possible to align liquid crystal molecules with an oriented surface. For example, liquid crystal molecules can be applied to a surface that has been oriented, for example by rubbing, grooving, or photo-alignment methods, and subsequently aligned such that the long axis of each of the liquid crystal molecules takes on an orientation that is generally parallel to the general direction of orientation of the surface. Examples of liquid crystal materials suitable for use as alignment media include, but are not limited to, liquid crystal polymers, liquid crystal pre-polymers, liquid crystal monomers, and liquid crystal mesogens. As used herein the term "pre-polymer" means partially polymerized materials.

Classes of liquid crystal monomers that are suitable for use in conjunction with the first and second alignment layers independently include, but are not limited to, mono- as well as multi-functional liquid crystal monomers. The liquid crystal monomers can, with some embodiments, be selected from cross-linkable liquid crystal monomers, such as photocross-linkable liquid crystal monomers. As used herein the term "photocross-linkable" means a material, such as a monomer, a pre-polymer or a polymer, that can be cross-linked on exposure to actinic radiation. For example, photocross-linkable liquid crystal monomers include, but are not limited to, those liquid crystal monomers that are cross-linkable on exposure to ultraviolet radiation and/or visible radiation, either with or without the use of polymerization initiators.

Examples of cross-linkable liquid crystal monomers, that can be independently included in the first and second alignment layers, include, but are not limited to, liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers and blends thereof. Examples of photocross-linkable liquid crystal monomers, that can be independently included in the first and second alignment layers, include, but are not limited to, liquid crystal monomers having functional groups chosen from acrylates, methacrylates, alkynes, epoxides, thiols, and blends thereof.

Liquid crystal polymers and pre-polymers, that can be independently included in the first and second alignment layers, include, but are not limited to, main-chain liquid crystal polymers and pre-polymers and side-chain liquid crystal polymers and pre-polymers. With main-chain liquid crystal polymers and pre-polymers, rod- or disc-like liquid crystal mesogens are primarily located within the polymer backbone. With side-chain liquid crystal polymers and pre-polymers, the rod- or disc-like liquid crystal mesogens primarily are located within the side chains of the polymer. Additionally, the liquid crystal polymer or pre-polymer can be cross-linkable, and further can be photocross-linkable.

Examples of liquid crystal polymers and pre-polymers, that can be independently included in the first and second alignment layers, include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Examples of photocross-linkable liquid crystal polymers and pre-polymers, that can be independently included in the first and second alignment layers, include, but are not limited to, those polymers and pre-polymers having functional groups chosen from acrylates, methacrylates, alkynes, epoxides, thiols, and blends thereof.

Liquid crystal mesogens, that can be independently included in the first and second alignment layers, include, but are not limited to, thermotropic liquid crystal mesogens and lyotropic liquid crystal mesogens. Additional classes of liquid crystal mesogens, that can be independently included in the first and second alignment layers, include, but are not limited to, columatic (or rod-like) liquid crystal mesogens and discotic (or disc-like) liquid crystal mesogens.

Examples of photo-orientation materials, that can be independently included in the first and second alignment layers, include, but are not limited to, photo-orientable polymer networks. More specific examples of photo-orientable polymer networks include, but are not limited to, azobenzene derivatives, cinnamic acid derivatives, coumarine derivatives, ferulic acid derivatives, and polyimides. With some embodiments, the first and second alignment layers can each independently include an at least partially ordered photo-orientable polymer network chosen from azobenzene derivatives, cinnamic acid derivatives, coumarine derivatives, ferulic acid derivatives, and/or polyimides. Examples of cinnamic acid derivatives, that can be independently included in the first and second alignment layers, include, but are not limited to, polyvinyl cinnamate and polyvinyl esters of paramethoxy-cinnamic acid.

As used herein the term "rubbed-orientation material" means a material that can be at least partially ordered by rubbing at least a portion of a surface of the material with another suitably textured material. For example, the rubbed-orientation material can be rubbed with a suitably textured cloth or a velvet brush. Examples of rubbed-orientation materials, that can be independently included in the first and second alignment layers, include, but are not limited to, (poly) imides, (poly)siloxanes, (poly)acrylates, and (poly) coumarines. With some embodiments, the first and second alignment layers can independently include a polyimide, and the first and/or second alignment layer can be rubbed with a velvet or a cotton cloth so as to at least partially order at least a portion of the surface of the rubbed alignment layer.

With some embodiments, the first and second alignment layers can each independently include an at least partially ordered polymer sheet. For example, a sheet of polyvinyl alcohol can be at least partially ordered by stretching (e.g., uniaxially stretching) the sheet, and there-after the stretched sheet can be bonded to or over at least a portion a surface of the substrate to form the orientation facility. Alternatively, the ordered polymer sheet can be made by a method that at least partially orders the polymer chains during fabrication, for example, by extrusion. Further, the at least partially ordered polymer sheet can be formed by casting or otherwise forming a sheet of a liquid crystal material and thereafter at least partially ordering the sheet for example, but exposing the sheet to a magnetic field, an electric field, and/or a shear force. Still further, the at least partially ordered polymer sheet can be made using photo-orientation methods. For example, a sheet of a photo-orientation material can be formed, for example by casting, and thereafter at least partially ordered by exposure to linearly polarized ultraviolet radiation.

The first and second alignment layers of the photochromic-dichroic articles of the present invention can each independently include an at least partially treated surface. As used herein, the term "treated surface" refers to at least a portion of a surface that has been physically altered to create at least one ordered region on least a portion of the surface. Examples of treated surfaces include, but are not limited to, rubbed surfaces, etched surfaces, and embossed surfaces. Further, the treated surfaces can be patterned, for example using a photolithographic or an interferographic process. With some embodiments, the surface of the alignment layer can be a treated surface selected from, for example, chemically etched surfaces, plasma etched surfaces, nanoetched surfaces (such as surfaces etched using a scanning tunneling microscope or an atomic force microscope), laser etched surfaces, and/or electron-beam etched surfaces.

In accordance with some embodiments, when the first and/or second alignment layer includes a treated surface, the treated surface can be formed by depositing a metal salt (such as a metal oxide or metal fluoride) onto at least a portion of a surface (e.g., a surface of the alignment layer itself, or a surface of the primer layer), and thereafter etching the deposit to form the treated surface. Art-recognized methods of depositing a metal salt include, but are not limited to, plasma vapor deposition, chemical vapor deposition, and sputtering. Etching can be undertaken in accordance with art-recognized methods, such as those described previously herein.

As used herein the term "Langmuir-Blodgett films" means one or more at least partially ordered molecular films on a surface. Langmuir-Blodgett films can be formed, for example, by dipping a substrate into a liquid one or more times so that it is at least partially covered by a molecular film and then removing the substrate from the liquid such that, due to the relative surface tensions of the liquid and the substrate, the molecules of the molecular film are at least partially ordered in substantially one (or a single) general direction. As used herein, the term molecular film refers to monomolecular films (which can be referred to herein as monolayers) as well as films comprising more than one monolayer.

With some embodiments, the phase-separated polymer of a particular photochromic-dichroic layer, can include a matrix phase, at least a portion of which is at least partially aligned with the underlying alignment layer, and a guest phase including an anisotropic material, in which the guest phase is dispersed within the matrix phase. At least a portion of the anisotropic material of the guest phase can be at least partially aligned with at least portion of the underlying alignment layer, and the particular photochromic-dichroic compound can be at least partially aligned with at least a portion of the anisotropic material. In addition, the matrix phase of the phase-separated polymer can include a liquid crystal polymer, and the anisotropic material of the guest phase can be chosen from liquid crystal polymers and liquid crystal mesogens. Non-limiting examples of such materials are set forth in detail above. When including a phase-separate polymer as described, the first and/or second photochromic-dichroic layer can be substantially haze-free. Haze is defined as the percentage of transmitted light that deviates from the incident beam by more than 2.5 degrees on average according to ASTM D 1003 Standard Test Method of Haze and Luminous Transmittance of Transparent Plastics. An example of an instrument on which haze measurements according to ASTM D 1003 can be made is Haze-Gard Plus™ made by BYK-Gardener.

The photochromic-dichroic articles of the present invention can, with some embodiments, further include an alignment transfer material interposed between the first alignment layer and the first photochromic-dichroic layer, and/or interposed between the second alignment layer and the second photochromic-dichroic layer. The alignment transfer material can be aligned by interaction with the alignment layer, and correspondingly the first or second photochromic-dichroic compound can be aligned by interaction with the respective alignment transfer material. The alignment transfer material can, with some embodiments, facilitate the propagation or transfer of a suitable arrangement or position from an alignment layer to the photochromic-dichroic compound of the overlying photochromic-dichroic layer.

Examples of alignment transfer materials include, but are not limited to, those liquid crystal materials described above in connection with the alignment media disclosed herein. It is possible to align the molecules of a liquid crystal material with an oriented surface. For example, a liquid crystal material can be applied to a surface that has been oriented and subsequently aligned such that the long axis of the liquid crystal molecules adopts an orientation that is generally parallel to the same general direction of orientation of the surface. The liquid crystal material of the alignment transfer material can be at least partially ordered by alignment with the alignment layer, such that the long axis of the molecules of the liquid crystal material are generally parallel to, for example, a first general direction of the orientation facility. In this manner, the general direction of the alignment layer can be transferred to the liquid crystal material, which in turn can transfer the general direction to another structure or material. Further, if the alignment layer includes a plurality of regions having general directions that together form a design or pattern, that design or pattern can be transferred to the liquid crystal material by aligning the liquid crystal material with the various regions of the alignment layer. Additionally, although not required, according to various non-limiting embodiments disclosed herein, at least a portion of the liquid crystal material of the alignment transfer material can be exposed to at least one of, a magnetic field, an electric field, linearly polarized infrared radiation, linearly polarized ultraviolet radiation, and linearly polarized visible radiation while being at least partially aligned with at least a portion of the alignment layer.

In accordance with some embodiments, the first and second photochromic-dichroic compounds can each independently be encapsulated or overcoated with an anisotropic material having relatively flexible chain segments, such as a liquid crystal material, and thereafter dispersed or distributed in another material having relatively rigid chain segments. The encapsulating anisotropic material can be at least partially ordered. For example, the encapsulated photochromic-dichroic compound can be dispersed or distributed in a liquid crystal polymer having relatively rigid chain segments and thereafter the mixture can be applied so as to form the particular photochromic-dichroic layer.

With further embodiments: the first photochromic-dichroic layer is defined by a first polymeric sheet, the first polymeric sheet includes the first photochromic-dichroic compound, the first polymeric sheet is laterally aligned along a first lateral direction, and the photochromic-dichroic compound is substantially laterally aligned along the first lateral direction; and/or the second photochromic-dichroic layer is defined by a second polymeric sheet, the second polymeric sheet includes the second photochromic-dichroic compound, the second polymeric sheet is laterally aligned along a second lateral direction, and the second photochromic-dichroic compound is substantially laterally aligned along the second lateral direction. The first and second polymeric sheets can each independently be uniaxially stretched, with some embodiments. Stretching of the polymeric sheet typically results in alignment and ordering of the photochromic-dichroic material therein. The first photochromic-dichroic layer can, with some embodiments, include two or more polymeric sheets each containing a first photochromic-dichroic compound, in which each polymeric sheet can be stretched in the same direction. The second photochromic-dichroic layer can, with some embodiments, include two or more polymeric sheets each containing a second photochromic-dichroic compound, in which each polymeric sheet can be stretched in the same direction.

Examples of polymeric sheets that can be used as or to form the first and second photochromic-dichroic layers include, but are not limited to: stretched (such as uniaxially stretched) polymer sheets; ordered liquid crystal polymer sheets; and photo-oriented polymer sheets. Examples of polymeric materials, other than liquid crystal materials and photo-orientation materials that can be used in forming polymeric sheets of the first and/or second photochromic-dichroic layers include, but are not limited to: polyvinyl alcohol, polyvinyl chloride, polyurethane, polyacrylate, and polycaprolactam. Non-limiting examples of methods of at least partially ordering polymeric sheets are described below in more detail.

In accordance with some embodiments, each photochromic-dichroic layer of the photochromic-dichroic articles of the present invention, can independently be formed by applying at least one anisotropic material, imbibing the photochromic-dichroic compound into the previously applied anisotropic material, ordering the anisotropic material, and aligning the photochromic-dichroic compound with at least a portion of the ordered anisotropic material. The anisotropic material can be ordered before, during or after imbibition with the photochromic-dichroic compound. The photochromic-dichroic compound can be aligned while in an activated state, with some embodiments.

Imbibing a photochromic-dichroic compound into a previously applied anisotropic material can involve, with some embodiments, applying a solution or mixture of the photochromic-dichroic compound in a carrier to the previously applied anisotropic material, and allowing the photochromic-dichroic compound to diffuse into the anisotropic material, for example with or without heating. The previously applied anisotropic material can, with some embodiments, be part of a phase-separated polymer coating, as describe above.

The photochromic-dichroic articles of the present invention can with some embodiments include a topcoat layer, that optionally includes an ultraviolet light absorber. With reference to FIG. 3, topcoat layer 53 resides over second photochromic-dichroic layer 29. The topcoat layer can include a single layer or multiple layers at least one of which optionally includes an ultraviolet light absorber. The topcoat layer typically includes an organic matrix, such as a thermoplastic organic matrix and/or a crosslinked organic matrix. Additionally or alternatively to an organic matrix, the topcoat layer can include an inorganic matrix, including, for example, silane linkages, siloxane linkages and/or titanate linkages. The organic matrix can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The topcoat layer can be formed by art-recognized methods including, but not limited to: lamination, such as of one or more plastic sheets or films; in-mold formation, such as in-mold coating; film casting; and coating methods. Typically, the topcoat layer is formed from a topcoat coating composition. The topcoat coating composition can be a curable topcoat coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The topcoat layer can have any suitable thickness. With some embodiments, the topcoat has a thickness of from 0.5 microns to 10 microns, such as from 1 to 8 microns, or from 2 to 5 microns, inclusive of the recited values.

With some embodiments, the topcoat layer includes an organic matrix formed from a radiation-cured acrylate-based composition, and correspondingly, the topcoat layer can be described as an acrylate-based topcoat layer.

The acrylate-based topcoat layer can be prepared using (meth)acrylate monomers and/or (meth)acrylic acid monomers. The (meth)acrylate monomers can include one, two, three, four, or five (meth)acrylate groups. Additional co-polymerizable monomers, such as epoxy monomers, e.g., monomers containing a epoxy (or oxirane) functionality, monomers containing both (meth)acrylate and epoxy functionalities, etc., can also be present in the formulation used to prepare the (meth)acrylate-based topcoat layer. The monomers used to prepare the (meth)acrylate-based topcoat layer include a plurality, e.g., a major amount, i.e., more than 50 weight percent, of (meth)acrylate monomers; hence the designation "(meth)acrylate-based topcoat layer." The formulations used to prepare the (meth)acrylate-based topcoat layer can also contain components having at least one isocyanate (—NCO) group, e.g., organic monoisocyanates, organic diisocyanates, and organic triisocyanates, whereby urethane linkages can be incorporated into the topcoat layer.

The (meth)acrylate-based topcoat layer typically possesses physical properties including, for example, transparency, adherence to the underlying second photochromic-dichroic layer, resistance to removal by aqueous alkali metal hydroxide, compatibility with an optional abrasion-resistant coating, such as a hardcoat layer, applied to its surface, and scratch resistance. With some embodiments, the (meth)acrylate-based topcoat layer has a hardness that is greater than that of the second photochromic-dichroic layer.

Radiation curing of (meth)acrylate-based polymeric systems can be achieved with, for example, electron beam curing (EB) and/or ultraviolet light (UV) radiation. Ultraviolet curing typically requires the presence of at least one photoinitiator, whereas curing by EB techniques does not require a photoinitiator. With the exception of the presence or absence of the photoinitiator, the (meth)acrylate-based formulations, which are cured by either UV or EB radiation technology, can otherwise be identical.

Radiation-curable (meth)acrylate-based polymeric systems are well known in the polymeric art, and any such system can be used to produce the (meth)acrylate-based topcoat layer of the photochromic-dichroic article of the present invention. In accordance with some embodiments, the (meth)acrylate-based topcoat layer is formed from a composition that includes a combination or miscible blend of one or more free-radical initiated (meth)acrylate monomers and/or (meth)acrylate oligomers, and one or more cationic initiated epoxy monomers. When this blend of monomers is cured, a (meth)acrylate-based topcoat layer, in the form of a polymerizate, is formed and includes an interpenetrating network of polymer components.

Examples of (meth)acrylate monomers that can be included in compositions from which the (meth)acrylate-based topcoat layer can be formed, include, but are not limited to, polyfunctional (meth)acrylates having, for example, 1, 2, 3, 4, or 5 (meth)acrylate groups, and monofunctional (meth)acrylates, e.g., a monomer containing a single (meth)acrylate group, hydroxy-substituted (meth)acrylates and alkoxysilyl alkylacrylates, such as trialkoxysilylpropylmethacrylate. Other reactive monomers/diluents, such as monomers containing an ethylenic functional group (other than the (meth)acrylate monomers) can also be present.

Compositions from which the (meth)acrylate-based topcoat layer can be formed, and methods of applying and curing such compositions, are disclosed at column 16, line 14 through column 25, line 3 of U.S. Pat. No. 7,452,611B2, which disclosure is incorporated herein by reference.

Compositions from which the topcoat layer is formed can include one or more additives, including, but not limited to, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

With some embodiments, the compositions from which the (meth)acrylate-based topcoat layer can be formed, can further include an adhesion promoter. The adhesion promoter can be selected from, for example, organo-silanes, such as aminoorganosilanes, organic titanate coupling agents, organic zirconate coupling agents, and combinations thereof. Examples of adhesion promoters, which can be included in the compositions from which the acrylate-based topcoat layer can be formed, include, but are not limited to, those disclosed at column 5, line 52 through column 8, line 19 of U.S. Pat. No. 7,410,691B2, which disclosure is incorporated herein by reference.

The topcoat layer, with some embodiments, includes an ultraviolet light absorber. The ultraviolet light absorber can be selected from one or more art-recognized classes of ultraviolet light absorbers, including, but not limited to: hindered amines, which can include, for example, one or more 2,2,6,6-tetramethyl N-substituted piperidine groups; benzophenones; and/or benzotriazoles. The ultraviolet light absorber is typically present in at least an effective amount, such as from 0.1 to 10 percent by weight, or 0.2 to 5 percent by weight, or from 0.3 to 3 percent by weight, based on the total solids weight of the coating composition from which the topcoat layer is prepared.

The photochromic-dichroic articles of the present invention can, with some embodiments, include a hard coat layer that resides over the topcoat layer. With reference to FIG. 3, photochromic-dichroic article 5 includes a hard coat layer 56 that resides over topcoat layer 53. The hard coat layer can include a single layer or multiple layers.

The hard coat layer can be selected from abrasion-resistant coatings including organo silanes, abrasion-resistant coatings including radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. With some embodiments, the hard coat layer can include a first coating of a radiation-cured acrylate-based thin film and a second coating including an organo-silane. Non-limiting examples of commercial hard coating products include SILVUE® 124 and HI-GARD® coatings, available from SDC Coatings, Inc. and PPG Industries, Inc., respectively.

The hard coat layer can be selected from art-recognized hard coat materials, such as organo-silane abrasion-resistant coatings. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134,191, 5,231,156 and International Patent Publication WO 94/20581 for disclosures of organo-silane hard coatings, which disclosures are also incorporated herein by reference. The hard coat layer can be applied by art-recognized methods, such as spin coating.

Other coatings that can be used to form the hard coat layer, include, but are not limited to, polyfunctional acrylic hard coatings, melamine-based hard coatings, urethane-based hard coatings, alkyd-based coatings, silica sol-based hard coatings or other organic or inorganic/organic hybrid hard coatings.

The hard coat layer, with some embodiments, is selected from organo-silane type hard coatings. Organo-silane type hard coatings from which the hard coat layer of the photochromic-dichroic articles of the present invention can be selected include, but are not limited to, those disclosed at column 24, line 46 through column 28, line 11 of U.S. Pat. No. 7,465,414 B2, which disclosure is incorporated herein by reference.

With some embodiments, the photochromic-dichroic articles of the present invention include a primer layer. With some embodiments, the primer layer is interposed between the first surface of the substrate and the first photochromic-dichroic layer. For purposes of non-limiting illustration and with reference to FIG. 3, primer layer 44 is interposed between first surface 14 of substrate 11 and first photochromic-dichroic layer 23, and more particularly, primer layer 44 abuts first surface 14 and abuts first alignment layer 47.

The primer layer can include a single layer or multiple layers that can be the same or different. The primer layer typically includes an organic matrix, such as a thermoplastic organic matrix and/or a crosslinked organic matrix. Additionally or alternatively to an organic matrix, the primer layer can include an inorganic matrix, including, for example, silane linkages, siloxane linkages and/or titanate linkages. The organic matrix can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The primer layer can be formed by art-recognized methods including, but not limited to: lamination, such as of one or more plastic sheets or films; in-mold formation, such as in-mold coating; film casting; and coating methods. Typically, the primer layer is formed from a primer coating composition. The primer coating composition can be a curable primer coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The primer layer can have any suitable thickness. With some embodiments, the primer has a thickness of from 0.5 microns to 20 microns, such as from 1 to 10 microns, or from 2 to 8 microns, or from 3 to 5 microns, inclusive of the recited values.

With some embodiments, the primer layer includes an organic matrix that includes urethane linkages. In accordance with some embodiments, the primer layer containing urethane linkages is formed from a curable coating composition that includes: a (meth)acrylate copolymer having active hydrogen functionality selected from hydroxyl, thiol, primary amine, secondary amine, and combinations thereof; blocked isocyanate, such as diisocyanate and/or triisocyanate blocked with a suitable blocking or leaving group, such as, 3,5-dimethylpyrazole; and one or more additives, including, but not limited to, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

Examples of (meth)acrylate monomers from which the active hydrogen functional (meth)acrylate copolymer can be prepared include, but are not limited to, $C_1$-$C_{20}$ (meth)acrylates, $C_1$-$C_{20}$ (meth)acrylates having at least one active hydrogen group selected from hydroxyl, thiol, primary amine, and secondary amine. The $C_1$-$C_{20}$ groups of the (meth)acrylates can be selected from, for example, $C_1$-$C_{20}$ linear alkyl, $C_3$-$C_{20}$ branched alkyl, $C_3$-$C_{20}$ cycloalkyl, $C_3$-$C_{20}$ fused ring polycycloalkyl, $C_5$-$C_{20}$ aryl, and $C_{10}$-$C_{20}$ fused ring aryl.

Additional polyols that can be used in the primer coating compositions from which the primer layer is prepared include, but are not limited to, art-recognized materials, such as described in U.S. Pat. No. 7,465,414 at column 15, line 22 through column 16, line 62, which disclosure is incorporated herein by reference. Isocyanates that can be used in the primer coating compositions from which the primer layer is prepared include, but are not limited to, art-recognized materials, such as described in U.S. Pat. No. 7,465,414 at column 16, line 63 through column 17, line 38, which disclosure is incorporated herein by reference. Catalysts that can be used in the primer coating compositions from which the primer layer is prepared include, but are not limited to, art-recognized materials, such as described in U.S. Pat. No. 7,465,414 at column 17, lines 39-62, which disclosure is incorporated herein by reference.

The primer layer can include one or more additives. Such additives can include, but are not limited to, ultraviolet light absorbers, stabilizers, such as hindered amine light stabilizers (HALS), antioxidants, e.g., polyphenolic antioxidants, asymmetric diaryloxalamide (oxanilide) compounds, singlet oxygen quenchers, e.g., a nickel ion complex with an organic ligand, and mixtures and/or combinations of such photochromic performance enhancing additive materials.

The primer layer can be applied over the substrate by art-recognized methods including, but not limited to, spray application, spin coating, doctor (or draw-down) blade application, and curtain application.

The primer layer can include at least partial hydrolysates of coupling agents, and mixtures thereof. As used herein "coupling agent" means a material having at least one group capable of reacting, binding and/or associating with a group on at least one surface. With some embodiments, a coupling agent can serve as a molecular bridge at the interface of at least two surfaces that can be similar or dissimilar surfaces. Coupling agents, with further embodiments, can be monomers, oligomers, pre-polymers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed.

In addition or alternatively to coupling agents and/or hydrolysates of coupling agents, the primer layer can include other adhesion enhancing ingredients. For example, although not limiting herein, the primer layer can further include an adhesion-enhancing amount of an epoxy-containing material. Adhesion-enhancing amounts of an epoxy-containing materials when included in the primer layer, can improve the adhesion of a subsequently applied coating or layer. A class of an epoxy (or oxirane) functional adhesion promoters that can be included in compositions from which the primer layer is formed include, but are not limited to, oxirane-functional-alkyl-trialkoxysilanes, such as gamma-glycidoxypropyltrimethoxysilane, and beta-(3,4-epoxycyclohexyl)ethyltrimethoxysilane.

The photochromic-dichroic articles of the present invention can include additional coatings, such as antireflective coatings. With some embodiments, an antireflective coating can be applied over the hard coat layer. Examples of antireflective coatings are described in U.S. Pat. No. 6,175,450 and International Patent Publication WO 00/33111, the disclosures of which are incorporated herein by reference.

With some embodiments of the present invention, the first and second photochromic-dichroic compounds are each selected such that activation of the first and second photochromic-dichroic compounds is in each case substantially maximized. This can be achieved, with some embodiments, by selecting the first and second photochromic-dichroic compounds such that the absorbance spectrums thereof, such as unactivated state absorbance spectrums, do not fully overlap, and more particularly the absorbance spectrum of the second photochromic-dichroic compound does not absorb all the incident actinic radiation, thus allowing some incident actinic radiation to reach and activate the underlying first photochromic-dichroic compound.

In accordance with some embodiments of the present invention: the first photochromic-dichroic compound has a first unactivated state absorbance of greater than 0 at all wavelengths from 340 nm to 380 nm, and a first unactivated state terminal minimum absorbance wavelength of greater than 380 nm; and the second photochromic-dichroic compound has a second unactivated state absorbance of greater than 0 over at least a portion of wavelengths from 340 nm to 380 nm, and a second unactivated state terminal minimum absorbance wavelength of greater than 340 nm. In addition and in accordance with some embodiments, the second unactivated state terminal minimum absorbance wavelength is less than or equal to the first unactivated state terminal minimum absorbance wavelength.

For purposes of non-limiting illustration and with reference to FIG. 3, the first photochromic-dichroic compound of the first photochromic-dichroic layer 23 has absorbance properties represented by graph 59, which is a representative plot of absorbance vs. wavelength for the first photochromic-dichroic compound in an unactivated state. The absorbance properties represented by graphs 59 and 62 of FIG. 3 are provided for purposes of illustration, and were not obtained by actual analysis of first and second photochromic-dichroic compounds.

Absorbance properties for a first photochromic-dichroic compound, such as represented by graph 59, can be obtained by analysis of a first photochromic-dichroic layer applied directly to a substrate in the absence of other underlying or overlying layers. Similarly, absorbance properties for a second photochromic-dichroic compound, such as represented by graph 62, can be obtained by analysis of a second photochromic-dichroic layer applied directly to a substrate in the absence of other underlying or overlying layers.

With reference to graph 59 of FIG. 3, the first photochromic-dichroic compound has a first unactivated state peak absorbance wavelength 65, a first unactivated state terminal minimum absorbance wavelength 68, and a first unactivated state initial minimum absorbance wavelength 71. The first unactivated state terminal minimum absorbance wavelength 68 of the first photochromic-dichroic compound is at higher wavelength than the first unactivated state peak absorbance wavelength 65 thereof. The first unactivated state initial minimum absorbance wavelength 71 is at lower wavelength than the first unactivated state peak absorbance wavelength 65.

For purposes of non-limiting illustration, and with further reference to graph 59 of FIG. 3, the first unactivated state peak absorbance wavelength 65 of the first photochromic-dichroic compound of first photochromic-dichroic layer 23 is about 360 nm, the first unactivated state terminal minimum absorbance wavelength 68 is about 437 nm, and the first unactivated state initial minimum absorbance wavelength 71 is about 342 nm.

The unactivated state terminal minimum absorbance wavelength values of the first and second photochromic-dichroic compounds of the photochromic-dichroic articles of the present invention can be determined in accordance with art-recognized methods. In some embodiments, the unactivated state absorbance of a photochromic-dichroic compound clearly drops to zero, and the wavelength at the zero point is recorded. In other embodiments, the unactivated state absorbance of a photochromic-dichroic compound drops to a minimum plateau value, which may not reach a measured absorbance of zero. In the case of a minimum plateau value, the unactivated state terminal minimum absorbance wavelength values are typically estimated. With some embodiments, an unactivated state terminal minimum absorbance wavelength, such as first unactivated state terminal minimum absorbance wavelength 68 of the first photochromic-dichroic compound, can be estimated by extending a line from a linear portion of the absorbance vs. wavelength trace that resides to the left of (i.e., at lower wavelength relative to) the inflection point of the trace. The point at which the extended line intersects the x-axis is recorded as the unactivated state terminal minimum absorbance wavelength value. The estimated unactivated state terminal minimum absorbance wavelength points and values can be determined by calculation (typically with the use of a computer graphing program) or manually (e.g., using a ruler). Unless otherwise indicated, the estimated unactivated state terminal minimum absorbance wavelength points and values depicted and discussed with reference to FIG. 3 were determined manually.

The unactivated state initial minimum absorbance wavelength values can be estimated in accordance with a method similar to that described with regard to the terminal minimum absorbance wavelength values. A line can be extended from a linear portion of the absorbance vs. wavelength trace that resides to the right of (i.e., at higher wavelength relative to) the lower inflection point of the trace. With some embodiments, the unactivated state initial minimum absorbance clearly occurs at a value of zero absorbance along the x-axis, and as such does not have to be estimated.

Second photochromic-dichroic layer 29 of photochromic-dichroic article 5 includes a second photochromic-dichroic compound having absorbance properties represented by graph 62, which is a representative plot of absorbance vs. wavelength for the second photochromic-dichroic compound. With some embodiments, absorbance properties of the second photochromic-dichroic compound, such as represented by graph 62, can be obtained from analysis of second photochromic-dichroic layer 29 applied to substrate 11 in the absence of other underlying or overlying layers. With reference to graph 62 of FIG. 3, the second photochromic-dichroic compound has a second unactivated state peak absorbance wavelength 74, a second unactivated state terminal minimum absorbance wavelength 77, and a second unactivated state initial minimum absorbance 80. The unactivated state second terminal minimum absorbance wavelength 77 of the second photochromic-dichroic compound is at higher wavelength than the second peak absorbance wavelength 74 thereof. The unactivated state second initial minimum absorbance wavelength 80 of the second photochromic-dichroic compound is at lower wavelength than the second peak absorbance wavelength 74.

For purposes of non-limiting illustration, and with further reference to graph 62 of FIG. 3, the second unactivated state peak absorbance wavelength 74 of the second photochromic-dichroic compound of second photochromic-dichroic layer 29 is about 365 nm, the second unactivated state terminal minimum absorbance wavelength 77 is about 423 nm, and the second unactivated state initial minimum absorbance wavelength 80 is about 345 nm.

Graphs 59 and 62 of FIG. 3, are each representative depictions of absorbance as a function of wavelength from 340 nm to 460 nm. As recited previously herein, FIG. 3, including graphs 59 and 62, is referenced for purposes of non-limiting illustration. As such, absorbance as a function of wavelength of the first and second photochromic-dichroic compounds in each case is not limited to that depicted in FIG. 3.

The first photochromic-dichroic compound of the first photochromic-dichroic layer has a first unactivated state absorbance of greater than 0 at all wavelengths from 340 nm to 380 nm, and the first unactivated state terminal minimum absorbance wavelength is greater than 380 nm. With some embodiments, the first photochromic-dichroic compound of the first photochromic-dichroic layer has a first unactivated state absorbance of greater than 0 at all wavelengths from 340 nm to 400 nm, and the first unactivated state terminal minimum absorbance wavelength is greater than 400 nm. With some additional embodiments, the first photochromic-dichroic compound of the first photochromic-dichroic layer has a first unactivated state absorbance of greater than 0 at all wavelengths from 340 nm to 410 nm, and the first unactivated state terminal minimum absorbance wavelength is greater than 410 nm. For purposes of non-limiting illustration and with reference to graph 59 of FIG. 3, the first photochromic-dichroic compound of the first photochromic-dichroic layer 23 has a first unactivated state absorbance of greater than 0 at all wavelengths from 340 nm to 380 nm, and a first unactivated state terminal minimum absorbance wavelength that is greater than 380 nm. As discussed previously herein, the first unactivated state terminal minimum absorbance wavelength of the first photochromic-dichroic compound of the first photochromic-dichroic layer 23 of photochromic-dichroic article 5 of FIG. 3 is about 437 nm.

The second photochromic-dichroic compound of the second photochromic-dichroic layer has a second unactivated state absorbance of greater than 0 over at least a portion of wavelengths from 340 nm to 380 nm, and a second unactivated state terminal minimum absorbance wavelength that is greater than 340 nm. For purposes of non-limiting illustration, the second photochromic-dichroic compound can, with some embodiments, have: a second unactivated state absorbance of greater than 0 over all wavelengths from 340 nm to 370 nm, and a second unactivated state terminal minimum absorbance wavelength that is greater than 370 nm; or a second unactivated state absorbance of greater than 0 over all wavelengths from 350 nm to 380 nm, and a second unactivated state terminal minimum absorbance wavelength that is greater than 380 nm.

With some embodiments, the second photochromic-dichroic compound of the second photochromic-dichroic coating layer has a second unactivated state absorbance of greater than 0 over at least a portion of wavelengths from 340 nm to 380 nm, and a second unactivated state terminal minimum absorbance wavelength that is greater than 380 nm.

With some additional embodiments, the second photochromic-dichroic compound of the second photochromic-dichroic coating layer has a second unactivated state absorbance of greater than 0 at all (or, over all) wavelengths from 340 nm to 380 nm, and a second unactivated state terminal minimum absorbance wavelength that is greater than 380 nm.

In accordance with some embodiments of the present invention, the first unactivated state terminal minimum absorbance wavelength is greater than 380 nm and less than or equal to 450 nm, such as less than or equal to 440 nm, or less than or equal to 430 nm. With additional embodiments, the second unactivated state terminal minimum absorbance wavelength is greater than 340 nm and less than or equal to 450 nm, such as less than or equal to 440 nm, or less than or equal to 430 nm.

The second unactivated state terminal minimum absorbance wavelength, with some embodiments of the present invention, is less than the first unactivated state terminal minimum absorbance wavelength.

The second photochromic-dichroic compound of second photochromic-dichroic layer 29 and the first photochromic-dichroic compound of the underlying first photochromic-dichroic layer 23 are each selected so as to have the absorbance properties as described above. According to some embodiments of the present invention, the first and second photochromic-dichroic compounds are each selected such that the photochromic-dichroic article has an unactivated state percent transmittance of less than 5% at all wavelengths from 340 nm to 380 nm. The unactivated state percent transmittance at all wavelengths from 340 nm to 380 nm can, with some embodiments, be less than 4%, or less than 3%, or less than 2%, or less than 1%, or less than 0.5%. With some embodiments, the unactivated state percent transmittance is substantially 0% at all wavelengths from 340 nm to 380 nm. Reducing and minimizing the percent transmittance of electromagnetic radiation through the photochromic-dichroic articles of the present invention at all wavelengths from 340 nm to 380 nm is desirable for reasons including, but not limited to, protecting objects behind the photochromic-dichroic article, such as a human eye, from exposure to electromagnetic radiation having wavelengths from 340 nm to 380 nm. Percent transmittance over the recited wavelength range or ranges is determined in accordance with art-recognized methods using art-recognized and commercially available analytical equipment.

With some additional embodiments, the photochromic-dichroic article of the present invention has an unactivated state percent transmittance of less than 5% at all wavelengths from 340 nm to 400 nm. The unactivated state percent transmittance at all wavelengths from 340 nm to 400 nm can, with some embodiments, be less than 4%, or less than 3%, or less than 2%, or less than 1%, or less than 0.5%. With some embodiments, the unactivated state percent transmittance is substantially 0% at all wavelengths from 340 nm to 400 nm. As discussed above with regard to 340 nm to 380 nm, reducing and minimizing the percent transmittance of electromagnetic radiation through the photochromic-dichroic articles of the present invention at all wavelengths from 340 nm to 400 nm is desirable for reasons including, but not limited to, protecting objects behind the photochromic-dichroic article, such as a human eye, from exposure to electromagnetic radiation having wavelengths from 340 nm to 400 nm.

The photochromic-dichroic article with some embodiments of the present invention has an activated state optical density that is greater than a control activated state optical density of a control photochromic-dichroic article that includes the substrate and one of the first photochromic-dichroic layer or the second photochromic-dichroic layer. The substrate of the photochromic-dichroic article and the control photochromic-dichroic article is in each case substantially the same, and has substantially the same properties and thickness. The coating layers of the photochromic-dichroic article and the control photochromic-dichroic article are in each case substantially the same, and have substantially the same properties and thickness.

Correspondingly, with the increased optical density, photochromic-dichroic articles according to the present invention are typically darker, in an activated state, when exposed to the same level of incident actinic radiation as comparative photochromic-dichroic articles, in an activated state, having, for example, only one of the first photochromic-dichroic layer or the second photochromic-dichroic layer, as described above.

The activated state optical density of the and the control activated state optical density are each typically determined over at least a portion of the visible light spectrum. With some embodiments, the activated state optical density and the control activated state optical density are each determined from 410 nm to 800 nm. Optical density is determined in accordance with art-recognized methods using art-recognized and commercially available equipment.

With some embodiments of the photochromic-dichroic articles of the present invention, the unactivated state peak absorbance wavelength values of the first and second photochromic-dichroic compounds are not equivalent to each other. More particularly, the first unactivated state peak absorbance wavelength (of the first photochromic-dichroic compound of the first photochromic-dichroic layer), and the second unactivated state peak absorbance wavelength (of the second photochromic-dichroic compound of the second photochromic-dichroic layer) are not equivalent to each other.

Selecting the first and second photochromic-dichroic compounds such that the unactivated state peak absorbance wavelength values thereof are not equivalent to each other is desirable, with some embodiments, for reasons including, but not limited to, increasing the total amount of incident radiation (having wavelengths from 340 nm to 380 nm or from 340 nm to 400 nm) that is absorbed by the photochromic-dichroic article. When the unactivated state peak absorbance wavelength values are not equivalent to each other, the amount of incident radiation (having wavelengths from 340 nm to 380 nm or from 340 nm to 400 nm) that is absorbed by each of the first and second photochromic-dichroic compounds can be increased or optimized as the incident radiation passes down through the second photochromic-dichroic layer (29) and the first photochromic-dichroic layer (23). Increasing and/or optimizing the amount of incident radiation (having wavelengths from 340 nm to 380 nm or from 340 nm to 400 nm) absorbed by each of the first and second photochromic-dichroic compounds can increase and/or optimize the photochromic-dichroic response of the recited compounds, and correspondingly improve the photochromic-dichroic response and properties of the photochromic-dichroic articles of the present invention. Alternatively or in addition thereto, the percent transmittance of incident radiation having wavelengths from 340 nm to 380 nm or from 340 nm to 400 nm through the photochromic-dichroic articles of the present invention can be minimized when the first and, second unactivated state peak wavelengths are non-equivalent and offset as described above and further herein.

In accordance with some embodiments, the absolute value of the difference between the second unactivated state peak absorbance wavelength and the first unactivated state peak absorbance wavelength is greater than or equal to 0.5 nm and less than or equal to 20 nm, or greater than or equal to 1 nm and less than or equal to 15 nm, or greater than or equal to 2 nm and less than or equal to 10 nm, or greater than or equal to 2 nm and less than or equal to 7 nm, or any combination of these recited upper and lower wavelength values.

The second unactivated state peak absorbance wavelength can be greater than or less than the first unactivated state peak absorbance wavelength. Correspondingly, the first unactivated state peak absorbance wavelength can be greater than or less than the second unactivated state peak absorbance wavelength. With some embodiments, the second unactivated state peak absorbance wavelength is greater than the first unactivated state peak absorbance wavelength, and correspondingly, the first unactivated state peak absorbance wavelength is less than the second unactivated state peak absorbance wavelength.

Figure 2:
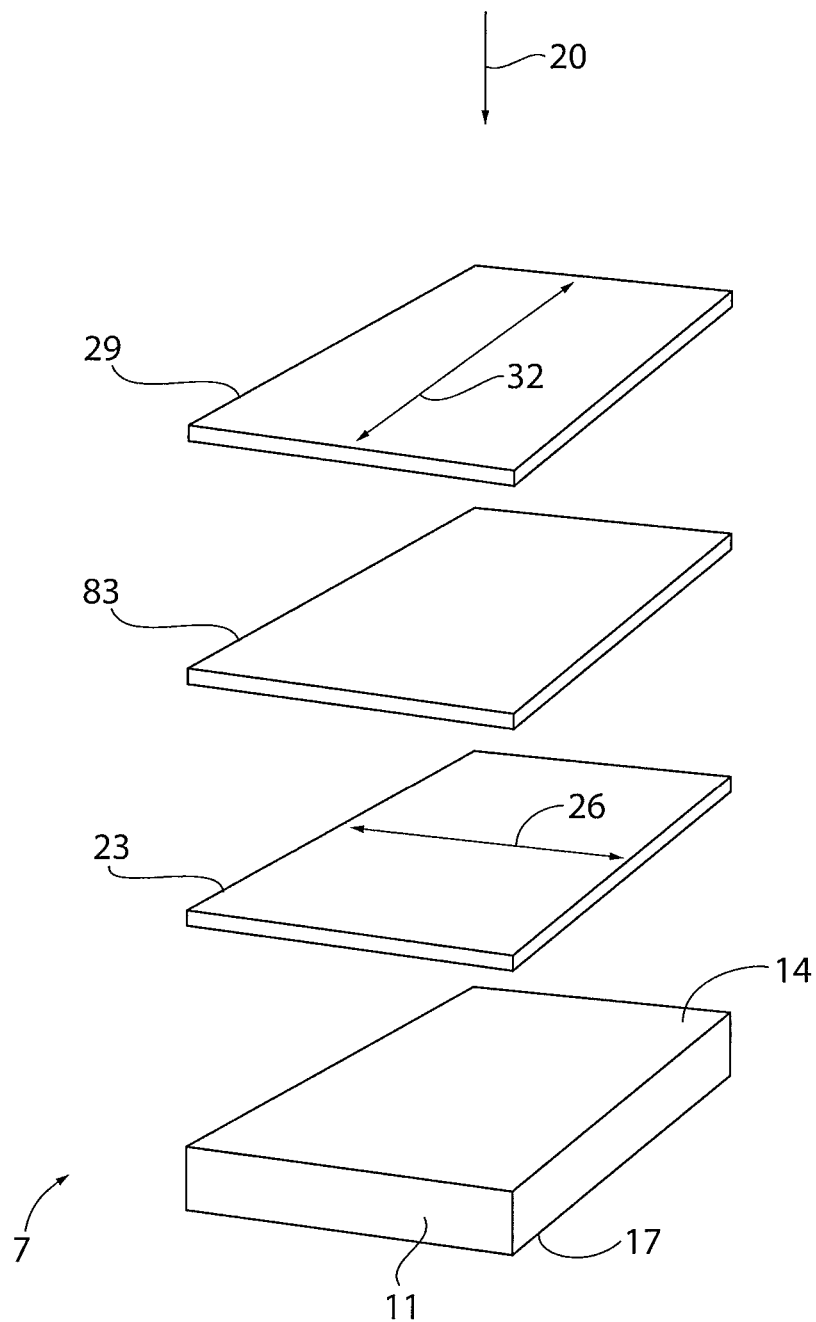
FIG. 2 is a representative exploded perspective view of a photochromic-dichroic article according to some embodiments of the present invention that includes a birefringent layer interposed between the first and second photochromic-dichroic layers thereof.

With some embodiments of the present invention, the photochromic-dichroic article further includes a birefringent layer that includes a polymer. The birefringent layer is interposed between the first photochromic-dichroic layer and the second photochromic-dichroic layer. With reference to FIG. 2, photochromic-dichroic article 7 includes a birefringent layer 83 that is interposed between first photochromic-dichroic layer 23 and second photochromic-dichroic layer 29. The birefringent layer can also be referred to herein as a compensation layer or a retardation layer. The birefringent layer can be composed of a single layer or multiple layers. When the birefringent layer is composed of multiple layers, each layer can be the same, or at least two layers of the multiple layers can be different. The birefringent layer can be formed from one or more polymeric sheets, one or more coating compositions, and combinations thereof.

With some embodiments, the birefringent layer is included for purposes of providing the photochromic-dichroic articles of the present invention with color enhancing properties and/or spectral filtering properties. In accordance with some embodiments, the properties of the birefringent layer, such as the degree of color enhancement, spectral filtering, circular polarization, and/or elliptical polarization provided thereby, can be selected by modifying one or more of the thickness, refractive index, and level of anisotropic order of the birefringent layer. The level of anisotropic order of the birefringent layer can, with some embodiments, be adjusted by unilateral stretching of the birefringent layer and/or anisotropically ordering one or more liquid crystal materials within the birefringent layer, in accordance with art-recognized methods.

In accordance with some embodiments of the present invention, the birefringent layer is operable to circularly polarize transmitted radiation or elliptically polarize transmitted radiation. As used herein, and with some embodiments, the term "transmitted radiation" with regard to the birefringent layer means the radiation that is transmitted through the birefringent layer. With some embodiments, the birefringent layer includes a quarter-wave plate or layer. In accordance with some further embodiments, the birefringent layer defines a quarter-wave plate.

The birefringent layer, with some embodiments, includes a first ordered region having a first general direction, and at least one second ordered region adjacent the first ordered region having a second general direction that is the same or different from the first general direction so as to form a desired pattern in the birefringent layer. Desired patterns include, but are not limited to, indicia, such as alpha-numerics, and designs.

Materials from which the birefringent layer can be prepared, with some embodiments, include birefringent materials that are known in the art. For example, a polymer film, a liquid crystal film, self-assembling materials, or a film in which a liquid crystal material is aligned can be used as or to form the birefringent layer. Examples of birefringent layers include, but are not limited to, those described in U.S. Pat. No. 6,864,932 at column 3, line 60 to column 4, line 64; U.S. Pat. No. 5,550,661 at column 4, line 30 to column 7, line 2; U.S. Pat. No. 5,948,487 at column 7, line 1 to column 10, line 10, the cited disclosures of which, in each case, is incorporated herein by reference.

With some embodiments, the birefringent layer includes a polymeric coating (or is formed from polymeric coating composition). With some further embodiments, the polymer coating (or polymer coating composition) can include self-assembling materials and/or film-forming materials.

Examples of commercially available birefringent films or sheets from which the birefringent layer can be formed include: film Model No. NRF-140, a positively birefringent, uniaxial film available from Nitto Corporation, Japan, or Nitto Denko America, Inc., New Brunswick, N.J.; and OPTI-GRAFIX circular polarizer films; available from GRAFIX Plastics, a division of GRAFIX, Inc., Cleveland, Ohio.

The birefringent layer includes one or more polymers. Examples of polymers that can be included in the birefringent layer, and/or from which the birefringent layer can be prepared, include, but are not limited to, polyacrylates, polymethacrylates, poly($C_1$-$C_{12}$)alkyl methacrylates, polyoxy (alkylene methacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), poly(vinylpyrrolidone), poly((meth)acrylamide), poly(dimethyl acrylamide), poly(hydroxyethyl methacrylate), poly((meth)acrylic acid), thermoplastic polycarbonates, polyesters, polyurethanes, polythiourethanes, poly(ethylene terephthalate), polystyrene, poly(alpha methylstyrene), copoly(styrene-methylmethacrylate), copoly(styrene-acrylonitrile), polyvinylbutyral and polymers of members of the group consisting of polyol(allyl carbonate) monomers, mono-functional acrylate monomers, mono-functional methacrylate monomers, polyfunctional acrylate monomers, polyfunctional methacrylate monomers, diethylene glycol dimethacrylate monomers, diisopropenyl benzene monomers, alkoxylated polyhydric alcohol monomers and diallylidene pentaerythritol monomers; and in particular self-assembling materials, polycarbonate, polyamide, polyimide, poly(meth)acrylate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, polyalkene, polyalkylene-vinyl acetate, poly(vinylacetate), poly(vinyl alcohol), poly(vinyl chloride), poly(vinylformal), poly(vinylacetal), poly(vinylidene chloride), poly(ethylene terephthalate), polyester, polysulfone, polyolefin, copolymers thereof, and/or mixtures thereof. With some embodiments, the birefringent layer is formed from one or more polymer sheets that each include one or more polymers, such as, but not limited to, those examples recited with regard to the polymer that can be included in the birefringent layer, and/or from which the birefringent layer can be prepared.

In accordance with some embodiments, the birefringent layer includes a polymeric sheet comprising, self-assembling materials, polycarbonate, polyamide, polyimide, poly(meth)acrylate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, polyalkene, polyalkylene-vinyl acetate, poly(vinylacetate), poly(vinyl alcohol), poly(vinyl chloride), poly(vinylformal), poly(vinylacetal), poly(vinylidene chloride), poly(ethylene terephthalate), polyester, polysulfone, polyolefin, copolymers thereof, and/or mixtures thereof.

The birefringent layer can, with some embodiments, be positioned in such a way that a slow axis direction (direction where a refractive index is largest in a plane) of the birefringent layer is oriented with respect to an alignment direction of the first photochromic-dichroic layer and/or the second photochromic-dichroic layer so as to yield the desired resultant polarization, such as circular polarization or elliptical polarization. For example, a quarter-wave plate, with some embodiments, would be oriented at an angle of 45°±/–5° or 45°±/–3° with respect to an alignment direction of the first photochromic-dichroic compound of the first photochromic-dichroic layer or the second photochromic-dichroic compound of the second photochromic-dichroic layer.

In accordance with further embodiments, the photochromic-dichroic articles of the present invention can be selected from ophthalmic articles or elements, display articles or elements, windows, mirrors, packaging material such as shrink-wrap, and active and passive liquid crystal cell articles or elements.

Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, protective lenses, and visors, such as protective visors.

Examples of display articles, elements and devices include, but are not limited to, screens, monitors, and security elements, including without limitation, security marks and authentication marks.

Examples of windows include, but are not limited to, automotive and aircraft transparencies, filters, shutters, and optical switches.

With some embodiments, the photochromic-dichroic article can be a security element. Examples of security elements include, but are not limited to, security marks and authentication marks that are connected to at least a portion of a substrate, such as: access cards and passes, e.g., tickets, badges, identification or membership cards, debit cards, etc.; negotiable instruments and non-negotiable instruments e.g., drafts, checks, bonds, notes, certificates of deposit, stock certificates, etc.; government documents, e.g., currency, licenses, identification cards, benefit cards, visas, passports, official certificates, deeds etc.; consumer goods, e.g., software, compact discs ("CDs"), digital-video discs ("DVDs"), appliances, consumer electronics, sporting goods, cars, etc.; credit cards; and merchandise tags, labels and packaging.

With further embodiments, the security element can be connected to at least a portion of a substrate chosen from a transparent substrate and a reflective substrate. Alternatively, according to further embodiments in which a reflective substrate is required, if the substrate is not reflective or sufficiently reflective for the intended application, a reflective material can be first applied to at least a portion of the substrate before the security mark is applied thereto. For example, a reflective aluminum coating can be applied to the at least a portion of the substrate prior to forming the security element thereon. Additionally or alternatively, the security element can be connected to at least a portion of a substrate chosen from untinted substrates, tinted substrates, photochromic substrates, tinted-photochromic substrates, linearly polarizing, circularly polarizing substrates, and elliptically polarizing substrates.

Furthermore, security elements according to the aforementioned embodiments can further include one or more other coatings or films or sheets to form a multi-layer reflective security element with viewing angle dependent characteristics, such as described in U.S. Pat. No. 6,641,874.

The present invention is more particularly described in the following examples, which are intended to be illustrative only, since numerous modifications and variations therein will be apparent to those skilled in the art. Unless otherwise specified, all parts and all percentages are by weight.

EXAMPLES

Preparation of the coating solution used as the First and Second Coatings is described in Part 1. The cleaning procedure for the substrates is described in Part 2 and the coating procedures for the two photoalignment layers as well as the two coating layers are described in Parts 3 to 6. The preparation of the Transitional coating solution (Topcoat) and the coating application procedure are described in Part 7. The preparation of the Protective coating (Hardcoat) and the coating application procedure are described in Part 8. Photochromic-dichroic performance testing is described in Part 9. Results for Examples 1, 1A & 1B to 3, 3A & 3B and Comparative Example 1, 1A and 1B are included in Table 1.

Part 1: Preparation of the Coating Solution of Anisotropic Materials and Photochromic/Dichroic Materials To a suitable flask containing a mixture of anisole (3.990 g) and BYK®-322 additive 0.004 g, was added RM-257 (1.500 g), RM-105 (1.500 g), and RM-82 (1.500 g). RM-257 is reported to have the molecular formula of $C_{33}H_{32}O_{10}$; RM-105 is reported to have the molecular formula of $C_{23}H_{26}O_6$; and RM-82 is reported to have the molecular formula of $C_{39}H_{44}O_{10}$, all available from EMD Chemicals, Inc. Subsequently, LCM-1 (1.500 g) described below, Grey photochromic-dichroic dye combination (0.720 grams of the following weight percent mixture of dyes: 20% Photochromic-Dichroic #1, an indenonaphthopyran that demonstrates a yellowish brown activated color; 15% Photochromic-Dichroic #2, an indenonaphthopyran that demonstrates a greenish blue activated color; and 65% Photochromic-Dichroic #3, an indenonaphthopyran that demonstrates a cyan activated color; that was heated to 80° C. for 60 minutes and then cooled to about 26° C.), 4-methoxyphenol (0.006 g), and IRGACURE® 819 (0.090 g). The resulting mixture was stirred for 2 hours at 60° C. and cooled to about 26° C.

LCM-1 is 1-(6-(6-(6-(6-(6-(6-(6-(6-(8-(4-(4-(4-(8-acryloyloxyhexyloxy)benzoyloxy)phenyloxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexan-1-ol which was prepared according to the procedures described in Example 17 of U.S. Patent Publication 2009/0323011, which liquid crystal monomer disclosure is incorporated herein by reference.

Part 2: Substrate Cleaning

Square substrates measuring 5.08 cm by 5.08 cm by 0.318 cm (2 inches (in.) by 2 in. by 0.125 in.) prepared from CR-39® monomer were obtained from Homalite, Inc. Each substrate was cleaned by wiping with a tissue soaked with acetone, dried with a stream of air and corona treated by passing on a conveyor belt in Tantec EST Systems Serial No. 020270 Power Generator HV 2000 series corona treatment equipment with a high voltage transformer. The substrates were exposed to corona generated by 53.99 KV, 500 Watts while traveling on a conveyor at a belt speed 3 ft/min.

Part 3: Coating Procedure for the First Photoalignment Layer

The photoalignment material, Staralign™ 2200 CP2, from Vantico, Inc., was applied to the test substrates by spin-coating on a portion of the surface of the test substrate by dispensing approximately 1.0 mL of the solution and spinning the substrates at 800 revolutions per minute (rpm) for 3 seconds, followed by 1,000 rpm for 7 seconds, followed by 2500 rpm for 4 seconds. A spin processor from Laurell Technologies Corp. (WS-400B-6NPP/LITE) was used for spin coating. Afterwards, the coated substrates were placed in an oven maintained at 120° C. for 30 minutes. The coated substrates were cooled to about 26° C.

The dried photoalignment layer on each of the substrates was at least partially ordered by exposure to linearly polarized ultraviolet radiation using a DYMAX® UVC-6 UV/conveyor system by DYMAX Corp. having a 400 Watt power supply. The light source was oriented such that the radiation was linearly polarized in a plane perpendicular to the surface of the substrate. The amount of ultraviolet radiation that each photoalignment layer was exposed to was measured using a UV Power Puck™ High energy radiometer from EIT Inc (Serial No. 2066) and was as follows: UVA $0.126 W/cm^2$ and $5.962 J/cm^2$; UVB $0.017 W/cm^2$ and $0.078 J/cm^2$; UVC 0 $W/cm^2$ and 0 $J/cm^2$; and UVV $0.046 W/cm^2$ and $2.150 J/cm^2$. After ordering at least a portion of the photo-orientable polymer network, the substrates were cooled to about 26° C. and kept covered.

Part 4: Coating Procedure for the First Coating

The first coating was applied by dispensing the Coating of Part 1 (approximately 2.0 mL) to each substrate by spin coating at a rate of 2000 revolutions per minute (rpm) for 10 seconds onto the at least partially ordered photoalignment materials. Each coated substrate was placed in an oven at 60° C. for 30 minutes. Afterwards, the substrates were cured under two ultraviolet lamps in the UV Curing Oven Machine designed and built by Belcan Engineering in a nitrogen atmosphere while running on a conveyor belt at 2 ft/min speed at peak intensity of $0.445 Watts/cm^2$ of UVA and $0.179 Watts/cm^2$ of UVV and UV dosage of $2.753 Joules/cm^2$ of UVA and $1.191 Joules/cm^2$ of UVV. Each of the cured layers was exposed to corona generated by 53.00 KV, 500 Watts while traveling on a conveyor at a belt speed 3 ft/min.

Part 5: Coating Procedure for Second Photoalignment Layer

A second application of photoalignment material was applied following the procedure of Part 3. The second photoalignment layer was dried and at least partially ordered at a 0°, 30°, 60° or 90° orientation to the first alignment layer by rotating the substrate to the appropriate angle and exposing it to linearly polarized ultraviolet radiation as described in Part 3.

Part 6: Coating Procedure for the Second Coating

The second coating was applied by dispensing the Coating of Part 1 (approximately 2.0 mL) onto the at least partially ordered photoalignment layer prepared in Part 5 by spin coating at a rate 2000 revolutions per minute (rpm) for 10 seconds. Each coated substrate was placed in an oven at 60° C. for 30 minutes. Afterwards the substrates were cured under two ultraviolet lamps in the UV Curing Oven Machine designed and built by Belcan Engineering in nitrogen atmosphere as described in Part 4. The cured layer were exposed to corona generated by 53.00 KV, 500 Watts while traveling on a conveyor at a belt speed 3 ft/min, if a subsequent coating layer was to be applied. Otherwise, the samples were post-baked for 3 hrs at 105° C. The substrates having Coating #2 at 30° orientation to Coating 1 were Example 1; Coating #2 at 60° orientation to Coating #1 were Example 2; Coating #2 at 90° orientation to Coating #1 were Example 3; Coating #2 at 0° orientation to Coating 1 were Comparative Example (CE) 1.

Part 7: Coating Procedure for Transitional Coating (TC)

The Transitional coating solution was prepared as follows: In a 50 mL amber glass bottle equipped with a magnetic stir-bar following materials were added:

Hydroxy methacrylate (1.242 g) from Sigma-Aldrich;
Neopentyl glycol diacrylate (13.7175 g) SR247 from Sartomer;
Trimethylolpropane trimethacrylate (2.5825 g) SR350 from Sartomer;
DESMODUR® PL 340 (5.02 g) from Bayer Material Science;
IRGACURE®-819 (0.0628 g) from Ciba Speciality Chemicals;
DAROCUR® TPO (0.0628 g; from Ciba Speciality Chemicals,
Polybutyl acrylate (0.125 g),
3-Aminopropylpropyltrimethoxysilane (1.4570 g) A-1100 from Momentive Performance Materials;
200 proof absolute anhydrous Ethanol (1.4570 g) from Pharmaco-Aaper; and stirred at room temperature for 2 hours.

The Transitional coating (approximately 4.0 mL) was spin coated at a rate of 1,400 revolutions per minute (rpm) for 7 seconds onto the cured coated substrates. Afterwards the substrates were cured under two ultraviolet lamps in the UV Curing Oven Machine designed and built by Belcan Engineering in nitrogen atmosphere while running on a conveyor belt at 6 ft/min speed at peak intensity of $1.887 Watts/cm^2$ of UVA and $0.694 Watts/cm^2$ of UVV and UV dosage of $4.699 Joules/cm^2$ of UVA and $1.787 Joules/cm^2$ of UVV. The cured transitional layers were exposed to corona generated by 53.00 KV, 500 Watts while traveling on a conveyor at a belt speed 3 ft/min.

Part 8: Coating Procedure for the Protective Coating (PC)

The Protective coating was prepared as follows: Charge 1 was added to a clean dry beaker and placed in an ice bath at 5° C. with stirring. Charge 2 was added and an exotherm raised the temperature of the reaction mixture to 50° C. The temperature of the resulting reaction mixture was cooled to 20-25° C. and Charge 3 was added with stirring. Charge 4 was added to adjust the pH from about 3 to about 5.5. Charge 5 was added and the solution was mixed for half an hour. The resulting solution was filtered through a nominal 0.45 micron capsule filter and stored at 4° C. until use.

Charge 1
Glycidoxypropyltrimethoxysilane 32.4 grams
Methyltrimethoxysilane 345.5 grams
Charge 2
Solution of deionized water (DI) with nitric acid (nitric acid 1 g/7000 g) 292 grams
Charge 3
DOWANOL® PM solvent 228 grams
Charge 4
TMAOH (25% tetramethylamonium hydroxide in methanol) 0.45 grams
Charge 5
BYK®-306 surfactant 2.0 grams The resulting Protective coating solution (approximately 4.0 mL) was spin coated at a rate of 2,000 revolutions per minute (rpm) for 10 seconds onto the cured transitional layer coated substrates. Post curing of the coated substrates was completed at 105° C. for 3 hours.

Part 9: Photochromic-Dichroic Performance Testing

Each of the coated substrates prepared above were tested in duplicate for photochromic-dichroic response on the Bench for Measuring Photochromics ("BMP") optical bench made by Essilor, Ltd. France. The optical bench was maintained at a constant temperature of 73.4° F. (23° C.) during testing.

Prior to testing on the optical bench, each of the coated substrates were exposed to 365-nanometer ultraviolet light for about 10 minutes at a distance of about 14 centimeters to activate the photochromic-dichroic materials. The UVA (315 to 380 nm) irradiance at the substrate was measured with a LICOR® Model Li-1800 spectroradiometer and found to be 22.2 watts per square meter. The substrate was then placed under a 500 watt, high intensity halogen lamp for about 10 minutes at a distance of about 36 centimeters to bleach (inactivate) the photochromic-dichroic materials. The illuminance at the substrate was measured with the LICOR® spectroradiometer and found to be 21.4 Klux. The substrates were then kept in a dark environment at room temperature (from 70 to 75° F., or 21 to 24° C.) for at least 1 hour prior to testing on an optical bench. Prior to optical bench measurement, the substrates were measured for ultraviolet absorbance at 390 nanometers.

The BMP optical bench was fitted with two 150-watt ORIEL® Model #66057 Xenon arc lamps at right angles to each other. The light path from Lamp 1 was directed through a 3 mm SCHOTT® KG-2 band-pass filter and appropriate neutral density filters that contributed to the required UV and partial visible light irradiance level. The light path from Lamp 2 was directed through a 3 mm SCHOTT® KG-2 band-pass filter, a SCHOTT® short band 400 nm cutoff filter and appropriate neutral density filters in order to provide supplemental visible light illuminance. A 2 inch×2 inch 50% polka dot beam splitter, at 45° to each lamp is used to mix the two beams. The combination of neutral density filters and voltage control of the Xenon arc lamp were used to adjust the intensity of the irradiance. Proprietary software was used on the BMP to control timing, irradiance, air cell and sample temperature, shuttering, filter selection and response measurement. A ZEISS® spectrophotometer, Model MCS 501, with fiber optic cables for light delivery through the substrate was used for response and color measurement. Photopic response measurements, as well as the response at four select wavelengths, were collected on each substrate.

The power output of the optical bench, i.e., the dosage of light that the substrate was exposed to, was adjusted to 6.7 Watts per square meter (W/m$^2$) UVA, integrated from 315-380 nm and 50 Klux illuminance, integrated from 380-780 nm. Measurement of the power output was made using the optometer and software contained within the BMP.

Response measurements, in terms of a change in optical density ($\Delta$OD) from the unactivated or bleached state to the activated or colored state were determined by establishing the initial unactivated transmittance, opening the shutter from the Xenon lamp(s) and measuring the transmittance through activation at selected intervals of time. Change in optical density was determined according to the formula: $\Delta$OD=log (10)(% Tb/% Ta), where % Tb is the percent transmittance in the bleached state, % Ta is the percent transmittance in the activated state. Optical density measurements were based on photopic optical density.

The results of this testing are presented below in Table 1, wherein the $\Delta$OD at saturation is after 15 minutes of activation and the Fade Half Life ("T ½") value is the time interval in seconds for the $\Delta$OD of the activated form of the photochromic/dichroic material in the coating to reach one half the fifteen-minute $\Delta$OD at 73.4° F. (23° C.), after removal of the activating light source. Results reported are an arithmetic average of duplicate test substrates for each Example and Comparative Example.

In Table 1, Example 1 has the Second Coating at a 30° orientation to the First Coating; Example 1A has a Transitional Coating (TC) applied to Example 1; and Example 1B has a Protective Coating (PC) applied to Example 1A; Example 2 has the Second Coating at a 60° orientation to the First Coating; Example 2A has a TC applied to Example 2; and Example 2B has a PC applied to Example 2A; Example 3 has the Second Coating at a 90° orientation to the First Coating; Example 3A has a TC applied to Example 3; and Example 3B has a PC applied to Example 3A; Comparative Example (CE) 1 has the Second Coating at a 0° orientation to the First Coating; CE 1A has a TC applied to CE 1; and CE 1B has a PC applied to CE 1A.

TABLE 1

Photochromic-Dichroic Performance of Examples and Comparative Example

| Example # | % Ta | $\Delta$OD at saturation | T ½ secs. |
|---|---|---|---|
| 1 | 11.8 | 0.66 | 119 |
| 1A | 13.6 | 0.60 | 130 |
| 1B | 14.1 | 0.59 | 132 |
| 2 | 11.4 | 0.69 | 112 |
| 2A | 13.2 | 0.60 | 121 |
| 2B | 13.4 | 0.59 | 125 |
| 3 | 11.8 | 0.70 | 118 |
| 3A | 13.6 | 0.65 | 127 |
| 3B | 14.0 | 0.64 | 131 |
| CE-1 | 13.3 | 0.64 | 118 |
| CE-1A | 15.2 | 0.59 | 130 |
| CE-1B | 15.6 | 0.58 | 133 |

The present invention has been described with reference to specific details of particular embodiments thereof. It is not intended that such details be regarded as limitations upon the scope of the invention except insofar as and to the extent that they are included in the accompanying claims.

We claim:

1. A photochromic-dichroic article comprising:
    (a) a substrate having a first surface and a second surface;
    (b) a first photochromic-dichroic layer positioned over said first surface of said substrate, said first photochromic-dichroic layer comprising a first photochromic-dichroic compound, said first photochromic-dichroic compound being laterally aligned within said first photochromic-dichroic layer and defining a first polarization axis of said first photochromic-dichroic layer; and
    (c) a second photochromic-dichroic layer positioned over said first photochromic-dichroic layer, said second photochromic-dichroic layer comprising a second photochromic-dichroic compound, said second photochromic-dichroic compound being laterally aligned within said second photochromic-dichroic layer and defining a second polarization axis of said second photochromic-dichroic layer,
    wherein said first polarization axis and said second polarization axis are oriented relative to each other at an angle of greater than 0° and less than or equal to 90°.

2. The photochromic-dichroic article of claim 1, wherein said first photochromic-dichroic layer and said second photochromic-dichroic layer each independently further comprise an anisotropic material.

3. The photochromic-dichroic article of claim 2, wherein said anisotropic material of said first photochromic-dichroic layer, and said anisotropic material of said second photochromic-dichroic layer, each independently comprises a liquid crystal material.

4. The photochromic-dichroic article of claim 1, wherein at least one of,
- said first photochromic-dichroic layer is defined by a first polymeric sheet, said first polymeric sheet comprising said first photochromic-dichroic compound, said first polymeric sheet being laterally aligned along a first lateral direction, and said first photochromic-dichroic compound being substantially laterally aligned along said first lateral direction, and
- said second photochromic-dichroic layer is defined by a second polymeric sheet, said second polymeric sheet comprising said second photochromic-dichroic compound, said second polymeric sheet being laterally aligned along a second lateral direction, and said second photochromic-dichroic compound being substantially laterally aligned along said second lateral direction.

5. The photochromic-dichroic article of claim 1, wherein said first photochromic-dichroic layer and said second photochromic-dichroic layer each independently further comprise a phase-separated polymer comprising,
- a matrix phase that is at least partially ordered, and
- a guest phase that is at least partially ordered,
- wherein said guest phase of said first photochromic-dichroic layer comprises said first photochromic-dichroic compound, and said first photochromic-dichroic compound is at least partially aligned with at least a portion of said guest phase of said first photochromic-dichroic layer, and
- wherein said guest phase of said second photochromic-dichroic layer comprises said second photochromic-dichroic compound, and said second photochromic-dichroic compound is at least partially aligned with at least a portion of said guest phase of said second photochromic-dichroic layer.

6. The photochromic-dichroic article of claim 1, wherein said first photochromic-dichroic layer and said second photochromic-dichroic layer each independently further comprise an interpenetrating polymer network comprising,
- an anisotropic material that is at least partially ordered, and
- a polymeric material,
- wherein said anisotropic material of said first photochromic-dichroic layer comprises said first photochromic-dichroic compound, and said first photochromic-dichroic compound is at least partially aligned with at least a portion of said anisotropic material of said first photochromic-dichroic layer, and
- wherein said anisotropic material of said second photochromic-dichroic layer comprises said second photochromic-dichroic compound, and said second photochromic-dichroic compound is at least partially aligned with at least a portion of said anisotropic material of said second photochromic-dichroic layer.

7. The photochromic-dichroic article of claim 1, wherein said first photochromic-dichroic layer and said second photochromic-dichroic layer each independently further comprise at least one additive selected from dyes, alignment promoters, horizontal alignment agents, kinetic enhancing additives, photoinitiators, thermal initiators, polymerization inhibitors, solvents, light stabilizers, heat stabilizers, mold release agents, rheology control agents, leveling agents, free radical scavengers, and adhesion promoters.

8. The photochromic-dichroic article of claim 1, wherein said first photochromic-dichroic layer and said second photochromic-dichroic layer each independently further comprise at least one dichroic material chosen from azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, iodine and iodides.

9. The photochromic-dichroic article of claim 1, wherein said first photochromic-dichroic compound comprises at least one first photochromic moiety, and said second photochromic-dichroic compound comprises at least one second photochromic moiety, and each first photochromic moiety and each second photochromic moiety are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof.

10. The photochromic-dichroic article of claim 1 further comprising,
- a first alignment layer interposed between said substrate and said first photochromic-dichroic layer, wherein said first alignment layer and said first photochromic-dichroic layer at least partially abut each other, and
- a second alignment layer interposed between said second photochromic-dichroic layer and said first photochromic-dichroic layer, wherein said second alignment layer and said second photochromic-dichroic layer at least partially abut each other.

11. The photochromic-dichroic article of claim 1 further comprising a topcoat layer comprising an ultraviolet light absorber, wherein said topcoat layer resides over said second photochromic-dichroic layer.

12. The photochromic-dichroic article of claim 11, further comprising a hard coat layer, wherein said hard coat layer resides over said topcoat layer.

13. The photochromic-dichroic article of claim 1 wherein,
- said first photochromic-dichroic compound has a first unactivated state absorbance of greater than 0 at all wavelengths from 340 nm to 380 nm, and a first unactivated state terminal minimum absorbance wavelength of greater than 380 nm, and
- said second photochromic-dichroic compound has a second unactivated state absorbance of greater than 0 over at least a portion of wavelengths from 340 nm to 380 nm, and a second unactivated state terminal minimum absorbance wavelength of greater than 340 nm,
- wherein said second unactivated state terminal minimum absorbance wavelength is less than or equal to said first unactivated state terminal minimum absorbance wavelength.

14. The photochromic-dichroic article of claim 13, wherein said second unactivated state terminal minimum absorbance wavelength is greater than 380 nm.

15. The photochromic-dichroic article of claim 13, wherein said second unactivated state absorbance of greater than 0 is at all wavelengths from 340 nm to 380 nm, and said second unactivated state terminal minimum absorbance wavelength is greater than 380 nm.

16. The photochromic-dichroic article of claim 13, wherein said first unactivated state terminal minimum absorbance wavelength is greater than 380 nm and less than or equal to 450 nm, and said second unactivated state terminal minimum absorbance wavelength is greater than 340 nm and less than or equal to 450 nm.

17. The photochromic-dichroic article of claim 13, wherein said second unactivated state terminal minimum absorbance wavelength is less than said first unactivated state terminal minimum absorbance wavelength.

18. The photochromic-dichroic article of claim 13, wherein said photochromic-dichroic article has an unactivated state percent transmittance of less than 5% at all wavelengths from 340 nm to 380 nm.

19. The photochromic-dichroic article of claim 1 further comprising a birefringent layer comprising a polymer, said birefringent layer being interposed between said first photochromic-dichroic layer and said second photochromic-dichroic layer.

20. The photochromic-dichroic article of claim 19, wherein said birefringent layer is operable to circularly polarize transmitted radiation or elliptically polarize transmitted radiation.

21. The photochromic-dichroic article of claim 19, wherein said birefringent layer comprises a first ordered region having a first general direction, and at least one second ordered region adjacent the first ordered region having a second general direction that is the same or different from the first general direction so as to form a desired pattern in said birefringent layer.

22. The photochromic-dichroic article of claim 19, wherein said birefringent layer comprises a polymeric coating comprising self-assembling materials or film-forming materials.

23. The photochromic-dichroic article of claim 19, wherein said birefringent layer comprises a polymeric sheet comprising, self-assembling materials, polycarbonate, polyamide, polyimide, poly(meth)acrylate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, polyalkene, polyalkylene-vinyl acetate, poly(vinylacetate), poly(vinyl alcohol), poly(vinyl chloride), poly(vinylformal), poly(vinylacetal), poly(vinylidene chloride), poly(ethylene terephthalate), polyester, polysulfone, polyolefin, copolymers thereof, and/or mixtures thereof.

24. The photochromic-dichroic article of claim 19, wherein the birefringent layer defines a quarter-wave plate.

25. The photochromic-dichroic article of claim 1, wherein said photochromic-dichroic article is selected from ophthalmic articles, display articles, windows, mirrors, and active liquid crystal cell articles, and passive liquid crystal cell articles.

26. The photochromic-dichroic article of claim 25, wherein said photochromic-dichroic article is selected from ophthalmic article, the ophthalmic articles being selected from corrective lenses, non-corrective lenses, contact lenses, intra-ocular lenses, magnifying lenses, protective lenses, and visors.

27. The photochromic-dichroic article of claim 25, wherein said photochromic-dichroic article is selected from display articles, the display articles being selected from screens, monitors, and security elements.

28. The photochromic-dichroic article of claim 1, wherein the substrate is selected from untinted substrates, tinted substrates, photochromic substrates, tinted-photochromic substrates, and linearly polarizing substrates.

* * * * *